United States Patent
Masuda et al.

(10) Patent No.: US 12,447,662 B2
(45) Date of Patent: Oct. 21, 2025

(54) LCP EXTRUDED FILM AND METHOD FOR MANUFACTURING THE SAME, LCP EXTRUDED FILM FOR STRETCH TREATMENT, LCP STRETCHED FILM, HEAT-SHRINKABLE LCP STRETCHED FILM, INSULATING MATERIAL FOR CIRCUIT SUBSTRATE, AND METAL FOIL-CLAD LAMINATE

(71) Applicant: Denka Company Limited, Tokyo (JP)

(72) Inventors: Yusuke Masuda, Tokyo (JP); Naoki Ogawa, Tokyo (JP)

(73) Assignee: Denka Company Limited, Tokyo (JP)

( * ) Notice: Subject to any disclaimer, the term of this patent is extended or adjusted under 35 U.S.C. 154(b) by 151 days.

(21) Appl. No.: 18/375,798

(22) Filed: Oct. 2, 2023

(65) Prior Publication Data

US 2024/0025102 A1 Jan. 25, 2024

Related U.S. Application Data

(62) Division of application No. 18/266,228, filed as application No. PCT/JP2021/044969 on Dec. 7, 2021.

(30) Foreign Application Priority Data

Dec. 9, 2020 (JP) ................. 2020-204271
Dec. 9, 2020 (JP) ................. 2020-204305
(Continued)

(51) Int. Cl.
B29C 48/23 (2019.01)
B29C 48/00 (2019.01)
(Continued)

(52) U.S. Cl.
CPC ............ *B29C 48/23* (2019.02); *B29C 48/022* (2019.02); *B29C 48/08* (2019.02); *B29C 48/146* (2019.02);
(Continued)

(58) Field of Classification Search
CPC ..... B29C 48/022; B29C 48/08; B29C 48/146; B29C 48/23; B29C 48/78; B32B 27/36
See application file for complete search history.

(56) References Cited

U.S. PATENT DOCUMENTS

| | | | |
|---|---|---|---|
| 5,529,740 A | 6/1996 | Jester et al. | |
| 5,744,204 A | * 4/1998 | Jester | G02B 5/3016 428/480 |

(Continued)

FOREIGN PATENT DOCUMENTS

| | | |
|---|---|---|
| JP | 02-178016 A | 7/1990 |
| JP | H08-090570 A | 4/1996 |

(Continued)

*Primary Examiner* — Zachary M Davis
(74) *Attorney, Agent, or Firm* — Foley & Lardner LLP

(57) ABSTRACT

The present invention provides an LCP extruded film comprising a thermoplastic liquid crystal polymer and having a thickness of 15 μm or more and 300 μm or less, wherein coefficients of linear thermal expansion in a MD direction and a TD direction at 23 to 200° C. as measured by a TMA method according to JIS K7197 are each within a range of −30 to 55 ppm/K, and the following conditions (A) and/or (B) are satisfied, and a method for manufacturing the same, an LCP extruded film for stretch treatment, an LCP stretched film, a heat-shrinkable LCP stretched film, an insulating material for a circuit substrate, and a metal foil-clad laminate:

(A) a degree of orientation α1 (%) of a film surface S1 exposed and a degree of orientation α2 (%) of a film surface S2 located at a depth of 5 μm from the film surface S1 satisfy a relationship of −4.0≤[(α2−α1)/α1]×100≤0.0;

(Continued)

(B) a hardness H1 at a point of a depth of 1 μm located at a position of 1 μm from a film surface in a thickness direction and a hardness H2 at a thickness center point, as measured by subjecting a film cross section in parallel with a MD direction to a nanoindentation method, satisfy $-10.0 \leq 100 \times (H2-H1)/H1 \leq 0.0$.

17 Claims, 8 Drawing Sheets

(30) Foreign Application Priority Data

| Dec. 9, 2020 | (JP) | 2020-204317 |
|---|---|---|
| Dec. 9, 2020 | (JP) | 2020-204359 |
| Nov. 9, 2021 | (JP) | 2021-182534 |
| Nov. 9, 2021 | (JP) | 2021-182543 |
| Nov. 9, 2021 | (JP) | 2021-182583 |

(51) Int. Cl.

| B29C 48/08 | (2019.01) |
|---|---|
| B29C 48/14 | (2019.01) |
| B29C 48/78 | (2019.01) |
| B32B 5/02 | (2006.01) |
| B32B 15/08 | (2006.01) |
| B32B 15/14 | (2006.01) |
| B32B 27/12 | (2006.01) |
| C08J 5/18 | (2006.01) |
| C09K 19/38 | (2006.01) |
| H05K 1/03 | (2006.01) |
| B29C 48/21 | (2019.01) |
| B29C 48/305 | (2019.01) |
| B29K 105/00 | (2006.01) |
| B29K 105/16 | (2006.01) |
| B29K 509/00 | (2006.01) |
| B29L 31/34 | (2006.01) |

(52) U.S. Cl.
CPC .............. *B29C 48/78* (2019.02); *B32B 5/024* (2013.01); *B32B 15/08* (2013.01); *B32B 15/14* (2013.01); *B32B 27/12* (2013.01); *C08J 5/18* (2013.01); *C09K 19/3809* (2013.01); *H05K 1/0366* (2013.01); *B29C 48/0021* (2019.02); *B29C 48/21* (2019.02); *B29C 48/305* (2019.02); *B29K 2105/0079* (2013.01); *B29K 2105/16* (2013.01); *B29K 2509/00* (2013.01); *B29K 2995/0012* (2013.01); *B29K 2995/005* (2013.01); *B29K 2995/007* (2013.01); *B29K 2995/0097* (2013.01); *B29L 2031/3425* (2013.01); *B32B 2250/03* (2013.01); *B32B 2305/55* (2013.01); *B32B 2307/30* (2013.01); *B32B 2307/536* (2013.01); *B32B 2307/7376* (2023.05); *B32B 2457/08* (2013.01); *C08J 2367/04* (2013.01); *C09K 2219/03* (2013.01); *H05K 2201/0125* (2013.01); *H05K 2201/0129* (2013.01); *H05K 2201/0141* (2013.01); *H05K 2201/029* (2013.01)

(56) References Cited

U.S. PATENT DOCUMENTS

| 2009/0050842 | A1 | 2/2009 | Shelby et al. | |
|---|---|---|---|---|
| 2009/0101408 | A1 | 4/2009 | Koyama et al. | |
| 2011/0212302 | A1 | 9/2011 | Nitta et al. | |
| 2014/0265010 | A1* | 9/2014 | Park | B29D 7/01 |
| | | | | 264/173.14 |
| 2015/0004527 | A1 | 1/2015 | Mokrini et al. | |
| 2021/0268695 | A1 | 9/2021 | Uchiyama et al. | |
| 2022/0153937 | A1 | 5/2022 | Azami et al. | |

FOREIGN PATENT DOCUMENTS

| JP | 10-034742 A | 2/1998 |
|---|---|---|
| JP | 63-031729 A | 2/1998 |
| JP | 2003-181904 A | 7/2003 |
| JP | 2008-052170 A | 3/2008 |
| JP | 2010-536994 A | 12/2010 |
| JP | 2014-116593 A | 6/2014 |
| JP | 2015-507551 A | 3/2015 |
| JP | 2017-101200 A | 6/2017 |
| WO | WO-2010/053212 A1 | 5/2010 |
| WO | WO-2020/013106 A1 | 1/2020 |
| WO | WO-2020/166644 A1 | 8/2020 |
| WO | WO-2021/251265 A1 | 12/2021 |

* cited by examiner

[Figure 1]
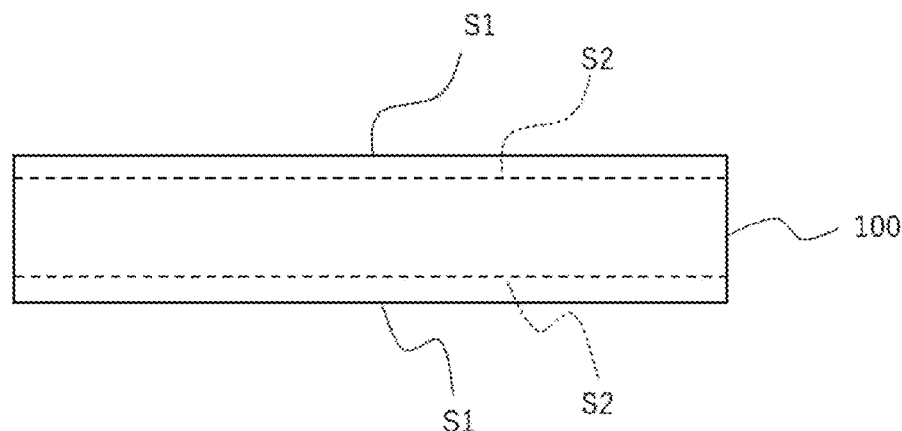
[Figure 2]
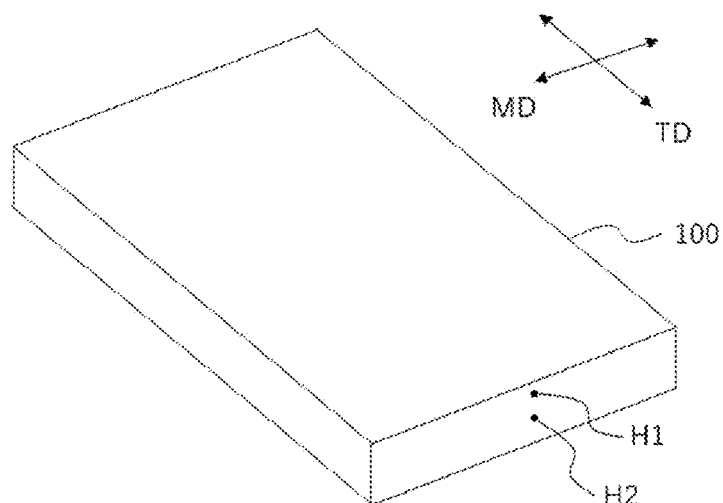
[Figure 3]
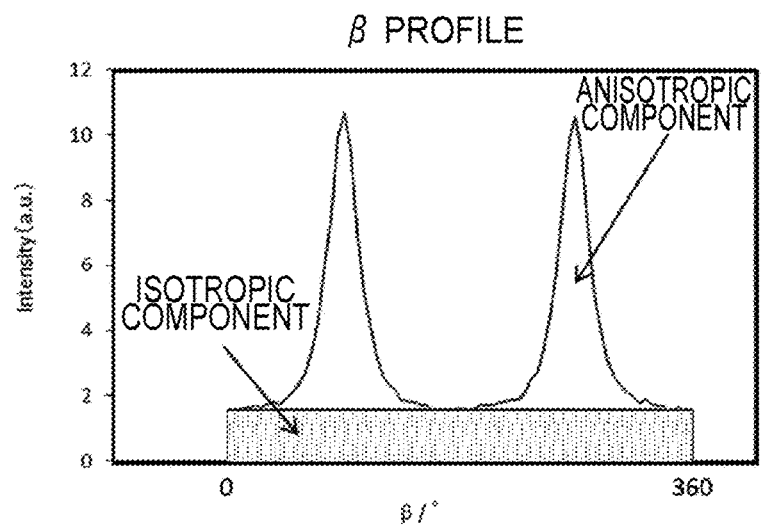

[Figure 4]
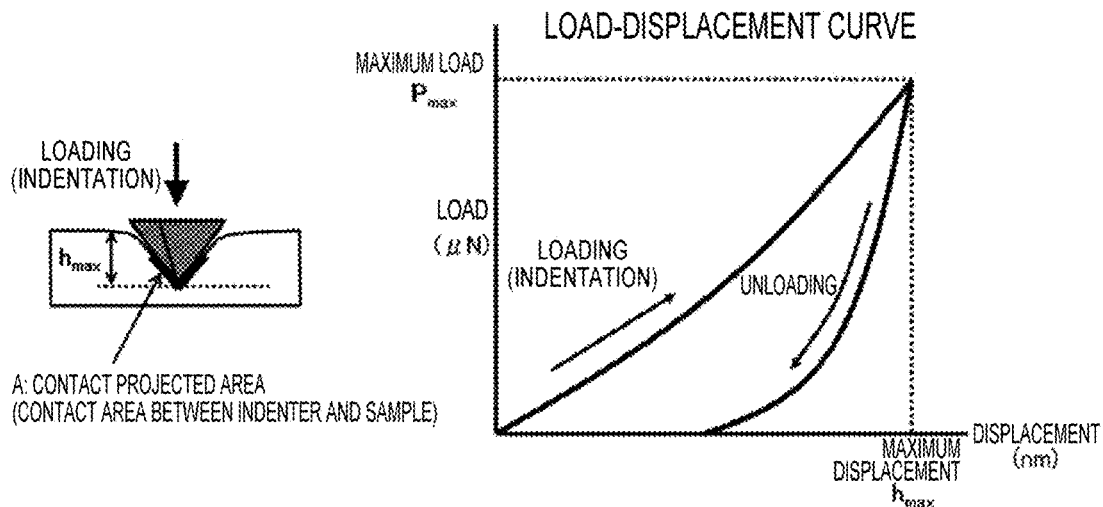
[Figure 5]
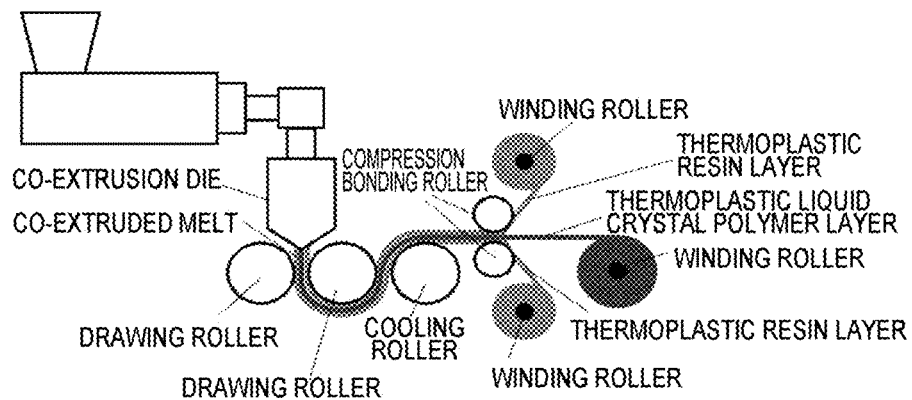
[Figure 6]
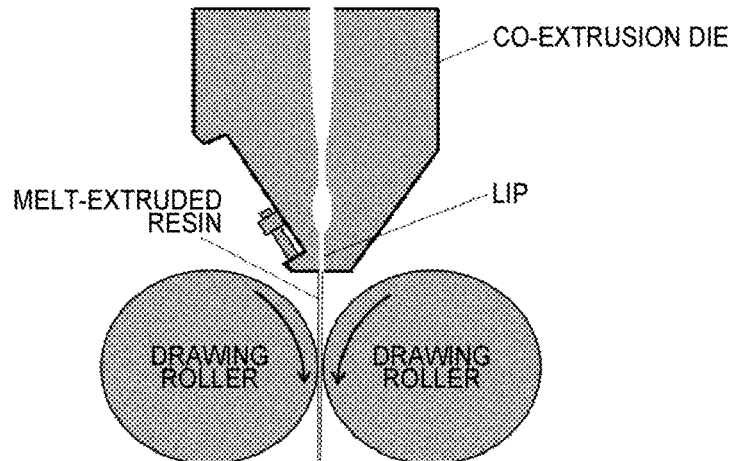

[Figure 7]
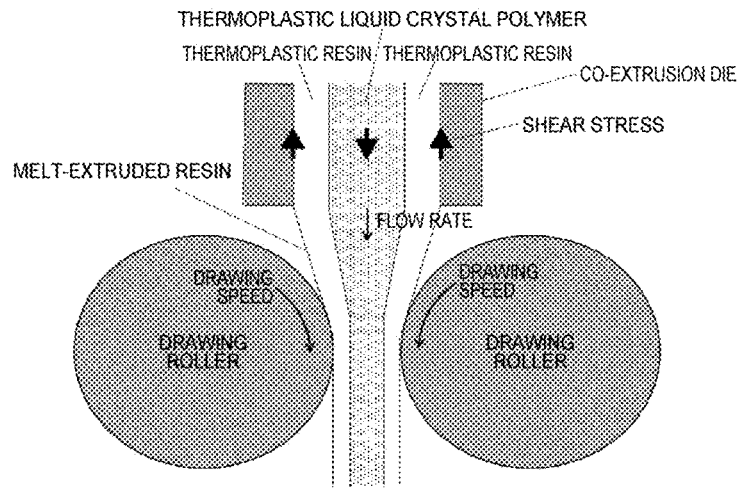
[Figure 8]
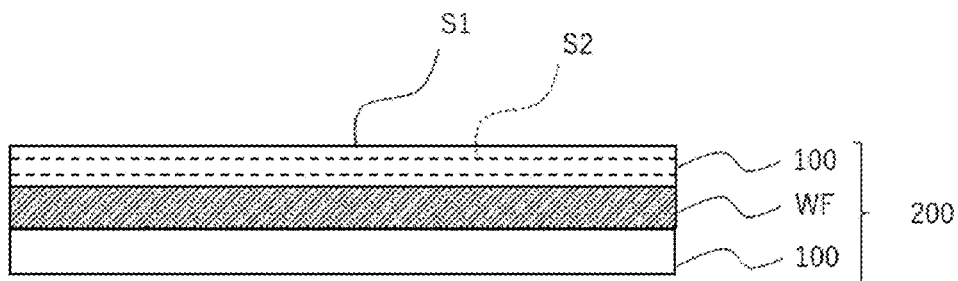
[Figure 9]
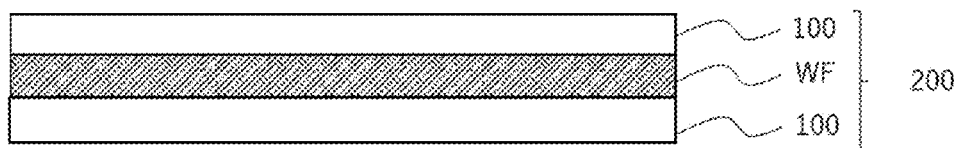
[Figure 10]
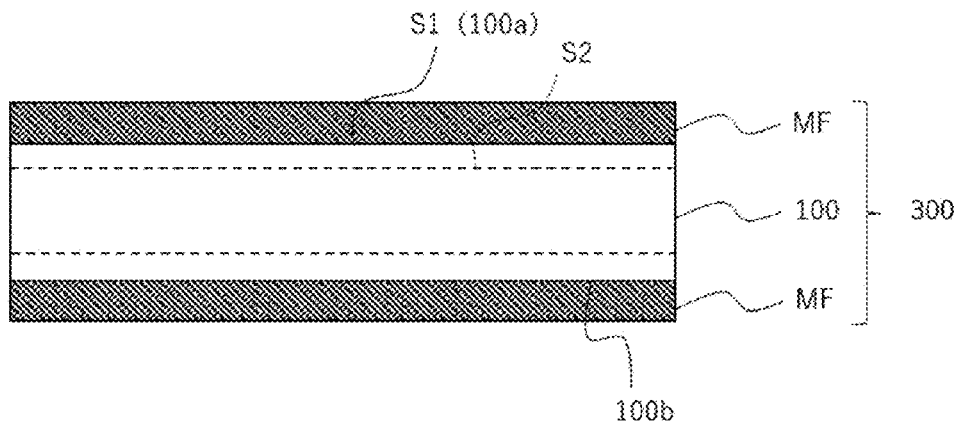

[Figure 11]
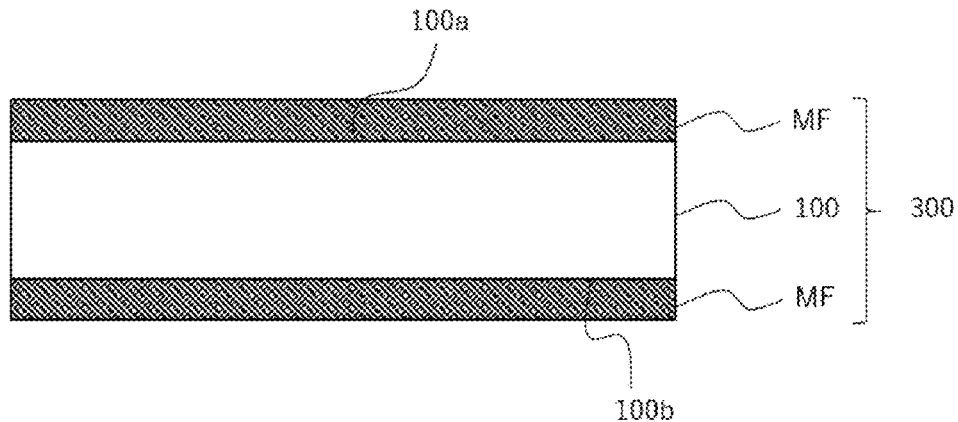
[Figure 12]
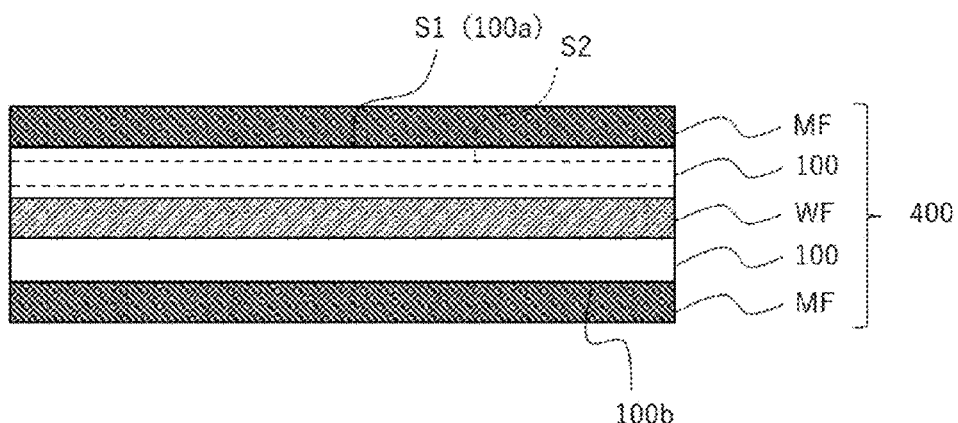
[Figure 13]
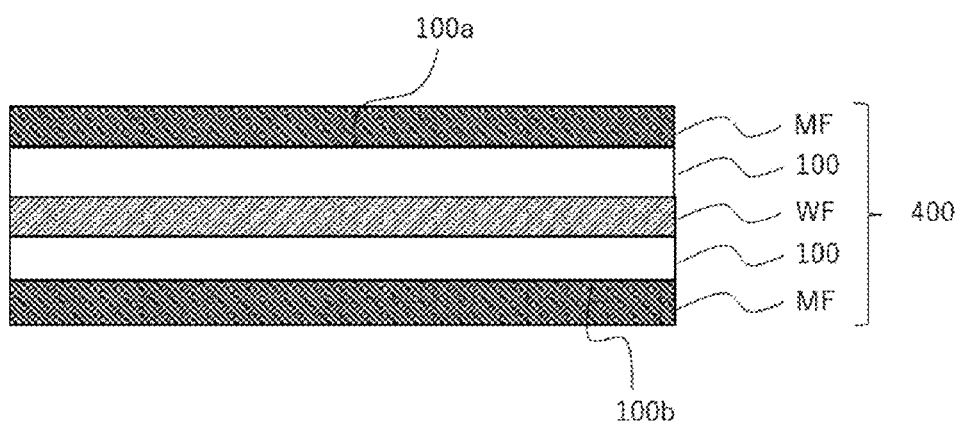

[Figure 14]
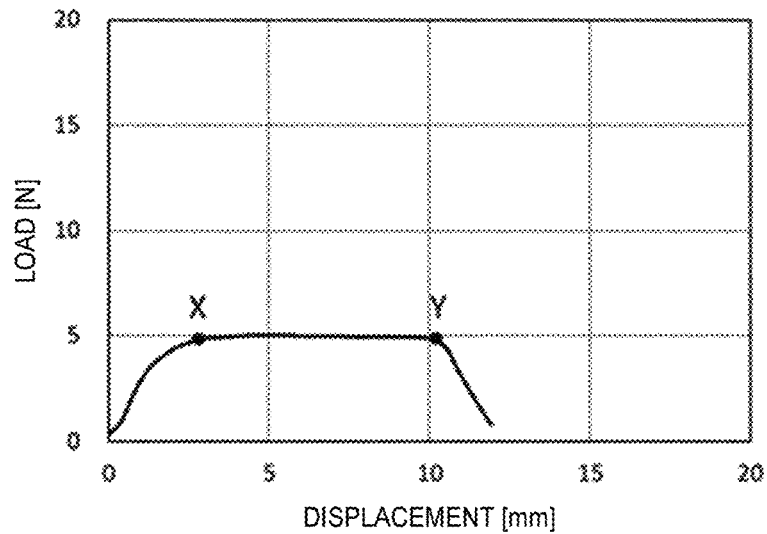
[Figure 15]
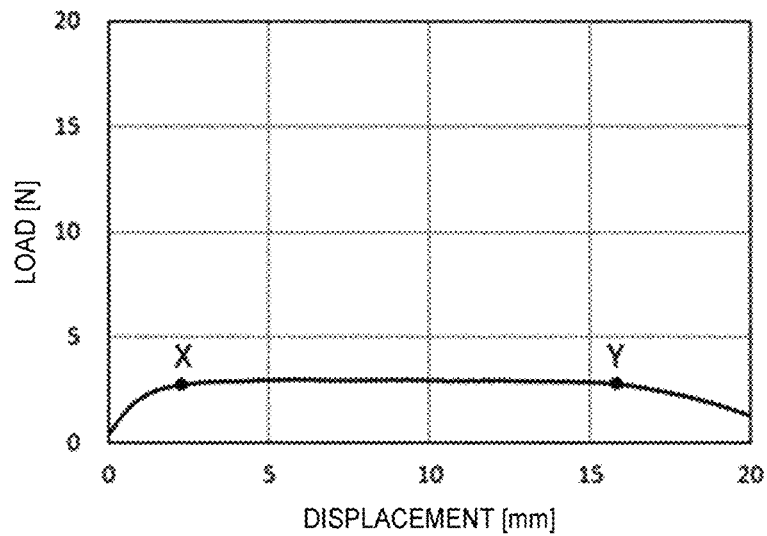

[Figure 16]
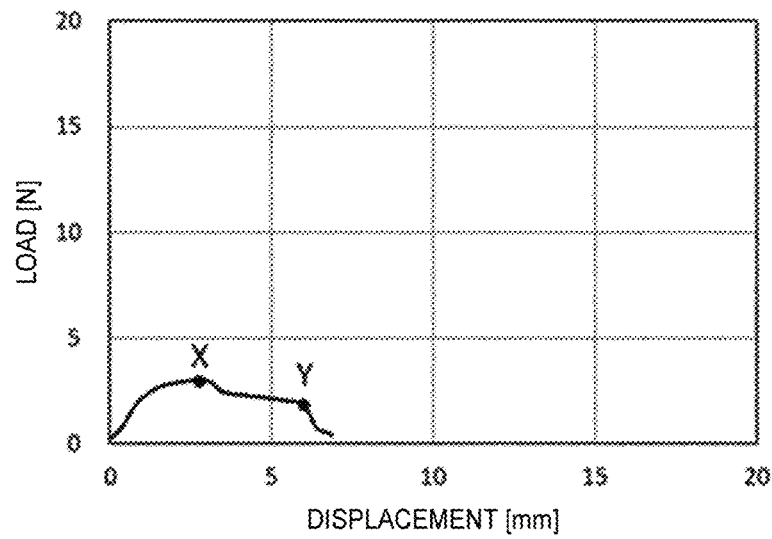
[Figure 17]
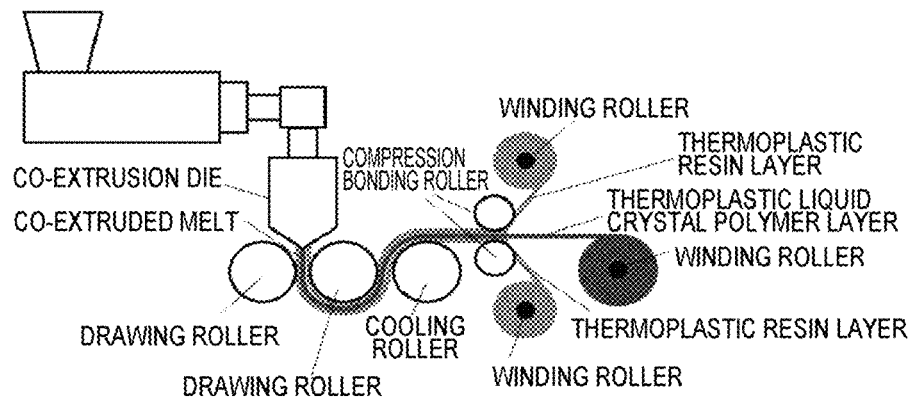
[Figure 18]
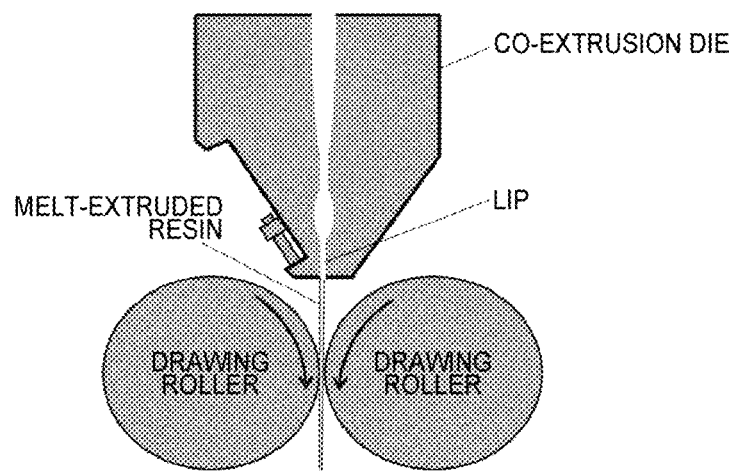

[Figure 19]
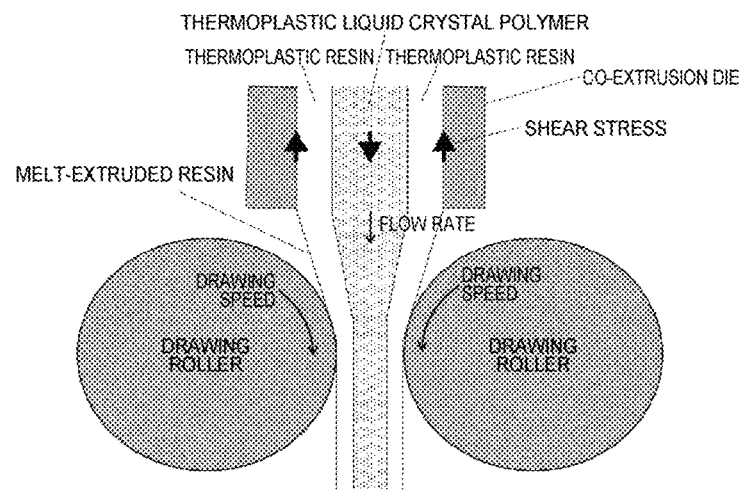
[Figure 20]
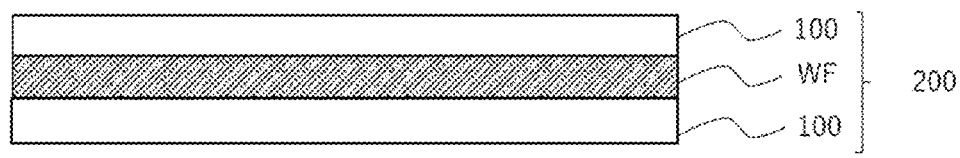
[Figure 21]
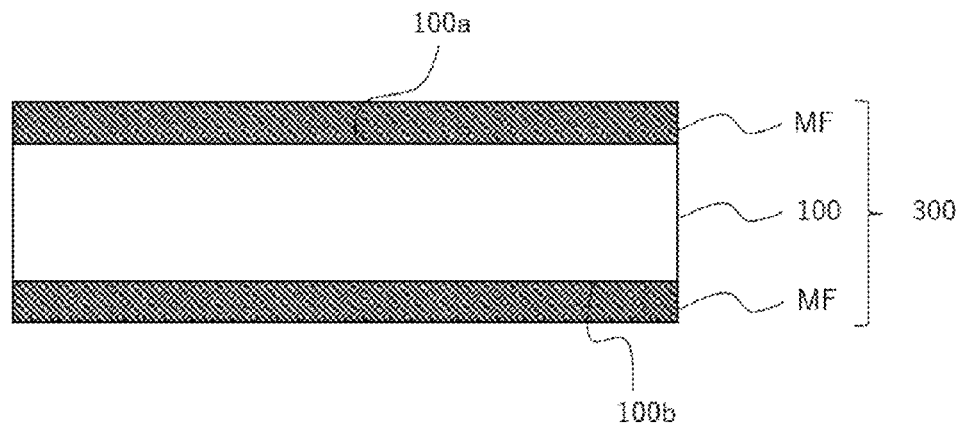

[Figure 22]
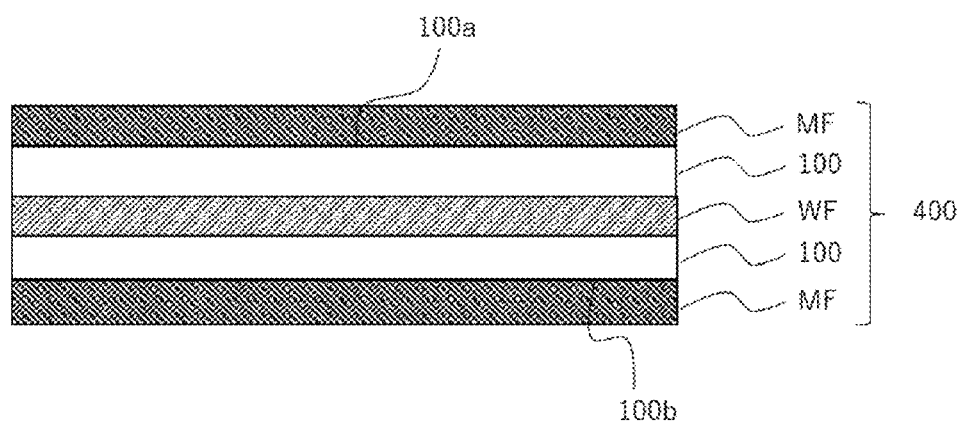

LCP EXTRUDED FILM AND METHOD FOR MANUFACTURING THE SAME, LCP EXTRUDED FILM FOR STRETCH TREATMENT, LCP STRETCHED FILM, HEAT-SHRINKABLE LCP STRETCHED FILM, INSULATING MATERIAL FOR CIRCUIT SUBSTRATE, AND METAL FOIL-CLAD LAMINATE

CROSS-REFERENCE TO RELATED APPLICATIONS

This application is a Divisional of U.S. application Ser. No. 18/266,228, which is the U.S. National Stage of PCT/JP2021/044969, filed Dec. 7, 2021, which claims priority to JP 2020-204271, filed Dec. 9, 2020, JP 2020-204305, filed Dec. 9, 2020, JP 2020-204359, filed Dec. 9, 2020, JP 2020-204317, filed Dec. 9, 2020, JP 2021-182543, filed Nov. 9, 2021, JP 2021-182583, filed Nov. 9, 2021, and JP 2021-182534, filed Nov. 9, 2021.

TECHNICAL FIELD

The present invention relates to an LCP extruded film and a method for manufacturing the same, an LCP extruded film for stretch treatment, an LCP stretched film, a heat-shrinkable LCP stretched film, an insulating material for a circuit substrate, and a metal foil-clad laminate.

BACKGROUND ART

A composite impregnated with varnish has been conventionally known as an insulating material for a circuit substrate, the composite being formed by impregnating a glass cloth with a varnish comprising a thermosetting resin such as an epoxy resin and an inorganic filler and then subjecting the resultant to heat press molding. However, such a procedure is poor in process tolerance during manufacturing and inferior in productivity from the viewpoint of, for example, resin fluidity during impregnation with varnish and curing ability during heat press molding. A thermosetting resin easily absorbs moisture, and is changed in dimension along with such moisture absorption, and the obtained composite impregnated with varnish is inferior in dimensional accuracy (heating dimensional accuracy).

Liquid crystal polymers (LCP) are polymers that exhibit liquid crystallinity in a molten state or a solution state. Especially, thermotropic liquid crystal polymers that exhibit liquid crystallinity in a molten state can be extruded and have excellent properties such as high gas barrier properties, high film strength, high heat resistance, high insulation properties, low water absorption, and low dielectric characteristics in a high frequency area. Therefore, films using thermoplastic liquid crystal polymers are studied to come into practical use in gas barrier film material applications, electronic material applications, and electrically insulating material applications.

However, it has been found that, when single layer extrusion is actually performed, a thermoplastic liquid crystal polymer film high in industrial availability, namely, a thermoplastic liquid crystal polymer film excellent in thickness accuracy and favorable in appearance and surface flatness is difficult to obtain due to a high degree of liquid crystal orientation of a thermoplastic liquid crystal polymer.

For example, Patent Literature 1 has disclosed a thermoplastic liquid crystal polymer film excellent in thickness accuracy and favorable in appearance and surface flatness, obtained by using a three layer co-extrusion die instead of a single layer extrusion die to thereby co-extrude a wholly aromatic polyester-based thermotropic liquid crystal polymer for an intermediate layer and a polyolefin-based resin or a polycarbonate resin for both outer layers and thus form a three layer laminated film in which an intermediate layer is a thermoplastic liquid crystal polymer layer and both outer layers are thermoplastic resin layers, and releasing the thermoplastic resin layers of such both outer layers to thereby take the intermediate layer as a film.

For example, Patent Literature 2 has found that the strength in the MD direction (Machine Direction) to that in the TD direction (Transverse Direction) of the thermoplastic liquid crystal polymer film described in Patent Literature 1 cannot withstand practical use, and has disclosed relaxation of anisotropies of the strengths in the TD direction and MD direction (Machine Direction) of the resulting thermoplastic liquid crystal polymer film, by use of a feed block type three layer co-extrusion die instead of a multi-manifold type co-extrusion die.

CITATION LIST

Patent Literature

Patent Literature 1: Japanese Patent Laid-Open No. 63-31729
Patent Literature 2: Japanese Patent Laid-Open No. 02-178016

SUMMARY OF INVENTION

Technical Problem

An insulating material for a circuit substrate using a liquid crystal polymer has excellent high frequency characteristics and low dielectric properties, and therefore has been spotlighted in recent years as an insulating material for a circuit substrate such as flexible printed wiring boards (FPC), flexible printed wiring board laminates, and fiber reinforced flexible laminates in the fifth-generation mobile communication system (5G), millimeter wave radar, and the like that will be developed in the future.

It is considered that the techniques described in Patent Literatures 1 and 2 can realize a thermoplastic liquid crystal polymer film excellent in thickness accuracy and favorable in appearance and surface flatness. However, in fact, each of the thermoplastic liquid crystal polymer films described in Patent Literature 1 and 2, although capable of suppressing the occurrences of peeling of a skin layer and peeling of a fibrillated fiber, generated by high molecular orientation of the thermoplastic liquid crystal polymer in a film surface, has still exhibited high molecular orientation of the thermoplastic liquid crystal polymer as a whole of the film and has been incapable of withstanding practical use as an insulating material of a circuit substrate.

Specifically, such a thermoplastic liquid crystal polymer film, which is provided with metal foil such as copper foil by thermocompression bonding on one surface and/or both surfaces of the film, may be used as a metal foil-clad laminate in an application of an insulating material of a circuit substrate. This metal foil can be subjected to pattern etching or the like and thus be in the form of micro wiring or the like, and therefore, a metal foil-clad laminate can be used as, for example, a material of a circuit substrate such as an electronic circuit substrate or a multilayer substrate. Thus, a thermoplastic liquid crystal polymer film supporting metal foil is required to have high dimensional stability. However, the thermoplastic liquid crystal polymer films described in Patent Literature 1 and 2 have been still large in difference between the rates of dimensional change in the TD direction and the MD direction after etching, and have been incapable of meeting a demand of application to recent ultrafine processing.

The present invention has been made in view of the above problems. An object of one aspect of the present invention is to provide a novel LCP extruded film sufficiently reduced in molecular orientation of a thermoplastic liquid crystal polymer, internal strain, and the like, and considerably reduced in anisotropy of the dimensional rate of change as compared with conventional one, and an LCP stretched film, an insulating material for a circuit substrate and a metal foil-clad laminate each using the LCP extruded film.

Another object of one aspect of the present invention is to provide a novel method for manufacturing an LCP extruded film, which can allow for a considerable reduction in high orientation of a thermoplastic liquid crystal polymer, hardly avoided by conventional extrusion.

Another object of one aspect of the present invention is to provide a novel manufacturing method which can obtain an LCP extruded film relaxed in molecular orientation of a thermoplastic liquid crystal polymer, internal strain, and the like not only in a film surface, but also in a film interior, in a simple manner with good reproducibility.

Meanwhile, an object of another aspect of the present invention is to provide an LCP extruded film for stretch treatment, which is excellent in stretch ability in stretch treatment and thus can allow for realization of a heat-shrinkable LCP stretched film small in anisotropy of the dimensional rate of change and small in absolute value of the dimensional rate of change. Another object of another aspect of the present invention is to provide a heat-shrinkable LCP stretched film small in anisotropy of the dimensional rate of change and small in absolute value of the dimensional rate of change, and an insulating material for a circuit substrate, and a metal foil-clad laminate each using the heat-shrinkable LCP stretched film.

Solution to Problem

The present inventors have intensively studied to solve the above problems, and as a result, have newly produced an LCP extruded film which is relaxed in molecular orientation of a thermoplastic liquid crystal polymer, internal strain, and the like not only in a film surface, but also in a film interior, and which is small in difference between a degree of orientation $\alpha 1$ of a film surface S1 exposed and a degree of orientation $\alpha 2$ of a film surface S2 exposed by etching treatment in a thickness direction of the film surface S1 and located at a depth of 5 μm from the film surface S1, and low in coefficient of linear thermal expansion, and furthermore have found that the LCP extruded film is reduced in anisotropy of the dimensional rate of change as compared with conventional one, thereby completing one aspect of the present invention.

That is, one aspect of the present invention provides the various specific aspects shown below.
  (1) An LCP extruded film comprising a thermoplastic liquid crystal polymer and having a thickness of 15 μm or more and 300 μm or less, wherein
    the following conditions (A) and/or (B) are satisfied:
    (A) a degree of orientation $\alpha 1(\%)$ of a film surface S1 exposed and a degree of orientation $\alpha 2(\%)$ of a film surface S2 exposed by etching treatment in a thickness direction of the film surface S1 and located at a depth of 5 μm from the film surface S1 satisfy a relationship of $-4.0 \leq [(\alpha 2 - \alpha 1)/\alpha 1] \times 100 \leq 0.0$, and coefficients of linear thermal expansion in a MD direction and a TD direction at 23 to 200° C. as measured by a TMA method according to JIS K7197 are each within a range of −30 to 55 ppm/K;
    (B) a hardness H1 at a point of a depth of 1 μm located at a position of 1 μm from a film surface in a thickness direction and a hardness H2 at a thickness center point, as measured by subjecting a film cross section in parallel with a MD direction to a nanoindentation method, satisfy $-10.0 \leq 100 \times (H2-H1)/H1 \leq 0.0$, and coefficients of linear thermal expansion in a MD direction and a TD direction at 23 to 200° C. as measured by a TMA method according to JIS K7197 are each within a range of −30 to 55 ppm/K.
  (2) The LCP extruded film according to (1), wherein the coefficient of linear thermal expansion in the TD direction is 0 to 55 ppm/K.
  (3) The LCP extruded film according to (1) or (2), wherein the film is an intermediate layer obtained by removing both outer layers from a laminated extruded film having the outer layer, the intermediate layer, and the outer layer.
  (4) The LCP extruded film according to any one of (1) to (3), wherein the film surface S1 does not have any skin layer that is peelable by a tape in an adhesiveness test by a cross-cutting method according to JIS K5600-5-6.
  (5) The LCP extruded film according to any one of (1) to (4), wherein the degree of orientation $\alpha 2$ of the surface S2 in the conditions (A) is 37.7(%) or less.
  (6) The LCP extruded film according to any one of (1) to (5), wherein the degree of orientation $\alpha 1$ of the film surface S1 in the conditions (A) is 39.0(%) or less.
  (7) The LCP extruded film according to any one of (1) to (6), wherein the hardness H2 at the thickness center point in the conditions (B) is 0.240 (GPa) or more.
  (8) The LCP extruded film according to any one of (1) to (7), wherein the hardness H1 at the point of a depth of 1 in the conditions (B) is 0.250 (GPa) or more.
  (9) The LCP extruded film according to any one of (1) to (8), further containing an inorganic filler.
  (10) The LCP extruded film according to any one of (1) to (9), wherein the LCP extruded film is a T-die extruded film.
  (11) An insulating material for a circuit substrate, comprising a laminate having at least the LCP extruded film according to any one of (1) to (10) and a woven fabric provided on one surface and/or both surfaces of the LCP extruded film.
  (12) A metal foil-clad laminate comprising the LCP extruded film according to any one of (1) to (10) and metal foil provided on one surface and/or both surfaces of the LCP extruded film.
  (13) A metal foil-clad laminate comprising a laminate having at least the LCP extruded film according to any one of (1) to (10) and a woven fabric, and metal foil provided on one surface and/or both surfaces of the laminate.
  (14) An LCP stretched film comprising a stretched product of the LCP extruded film according to any one of (1) to (10).
  (15) The LCP stretched film according to (14), wherein the stretched product has a total stretch ratio (MD direction×TD direction) to the LCP extruded film, of 1.3 to 2.5 times.

(16) An insulating material for a circuit substrate, comprising a laminate having at least the LCP stretched film according to (14) or (15) and a woven fabric provided on at least one surface of the LCP stretched film.

(17) A metal foil-clad laminate comprising the LCP stretched film according to (14) or (15) and metal foil provided on one surface and/or both surfaces of the LCP stretched film.

(18) A metal foil-clad laminate comprising a laminate having at least the LCP stretched film according to (14) or (15) and a woven fabric, and metal foil provided on one surface and/or both surfaces of the laminate.

The present inventors have made intensive studies about various extrusions of a single layer film and a multilayer film to solve the above problems, and as a result, have found that high orientation of a thermoplastic liquid crystal polymer, hardly avoided by conventional extrusion, can be considerably reduced by a predetermined two-kind three layer co-extrusion method, thereby completing one aspect of the present invention.

That is, one aspect of the present invention further provides the various specific aspects shown below.

(19) A method for manufacturing an LCP extruded film, comprising a step of respectively preparing a resin composition A for a first surface layer comprising a thermoplastic resin, a resin composition B for an intermediate layer comprising a thermoplastic liquid crystal polymer, and a resin composition C of a second surface layer comprising a thermoplastic resin, a step of co-extruding the resin composition A, the resin composition B and the resin composition C in conditions of a shear stress of 40 kPa or less and a drawdown ratio of 3.5 or less, from a two-kind three layer extruder, to form a two-kind three layer film having the first surface layer, the intermediate layer, and the second surface layer at least in the listed order, and a step of removing the first and second surface layers from the two-kind three layer film to obtain an LCP extruded film having a thickness of 15 μm or more and 300 μm or less.

(20) The method for manufacturing an LCP extruded film according to (19), wherein the LCP extruded film is obtained in which a hardness H1 at a point of a depth of 1 μm located at a position of 1 μm from a film surface in a thickness direction and a hardness H2 at a thickness center point, as measured by subjecting a film cross section in parallel with a MD direction to a nanoindentation method, satisfy $-10.0 \leq 100 \times (H2-H1)/H1 \leq 0.0$, and coefficients of linear thermal expansion in a MD direction and a TD direction at 23 to 200° C. as measured by a TMA method according to JIS K7197 are each within a range of −30 to 55 ppm/K.

(21) The method for manufacturing an LCP extruded film according to (19) or (20), wherein the thermoplastic liquid crystal polymer comprises a (wholly) aromatic polyester resin.

(22) The method for manufacturing an LCP extruded film according to any one of (19) to (21), wherein the thermoplastic resin comprises one selected from the group consisting of a polyolefin-based resin, an acrylic resin, a polyamide resin, an acrylonitrile-butadiene-styrene copolymer, polystyrene, polyvinyl chloride, polybutylene terephthalate, polyethylene terephthalate, polycarbonate, polyether ether ketone, and polyphenyl sulfide.

(23) The method for manufacturing an LCP extruded film according to any one of (19) to (22), wherein the resin composition B further contains an inorganic filler.

(24) The method for manufacturing an LCP extruded film according to any one of (19) to (23), wherein the resin composition A, the resin composition B and the resin composition C are co-extruded from a T-die.

(25) The method for manufacturing an LCP extruded film according to any one of (19) to (24), wherein the LCP extruded film is obtained which has a coefficient of linear thermal expansion in a TD direction, of 55 ppm/K or less.

(26) The method for manufacturing an LCP extruded film according to any one of (19) to (25), wherein the LCP extruded film obtained is subjected to heating and pressurizing treatment under a condition of 200 to 360° C.

(27) The method for manufacturing an LCP extruded film according to any one of (19) to (26), wherein the LCP extruded film not having any skin layer that is peelable by a tape in an adhesiveness test by a cross-cutting method according to JIS K5600-5-6, on the film surface, is obtained.

The present inventors further have intensively studied to solve the above problems, and as a result, have found a novel manufacturing method which can obtain an LCP extruded film relaxed in molecular orientation of a thermoplastic liquid crystal polymer, internal strain, and the like not only in a film surface, but also in a film interior, in a simple manner with good reproducibility, thereby completing one aspect of the present invention.

That is, one aspect of the present invention further provides the various specific aspects shown below.

(28) A method for manufacturing an LCP extruded film, comprising a step of respectively preparing a resin composition A for a first surface layer comprising a thermoplastic resin, a resin composition B for an intermediate layer comprising a thermoplastic liquid crystal polymer, and a resin composition C of a second surface layer comprising a thermoplastic resin, a step of co-extruding the resin composition A, the resin composition B and the resin composition C in conditions of a shear stress of 40 kPa or less and a drawdown ratio of 3.5 or less, from a two-kind three layer extruder, to form a two-kind three layer film having the first surface layer, the intermediate layer, and the second surface layer at least in the listed order, and a step of removing the first and second surface layers from the two-kind three layer film to obtain an LCP extruded film having a thickness of 15 μm or more and 300 μm or less, wherein a degree of orientation $\alpha 1(\%)$ of a film surface S1 exposed and a degree of orientation $\alpha 2(\%)$ of a film surface S2 exposed by etching treatment in a thickness direction of the film surface S1 and located at a depth of 5 μm from the film surface S1 satisfy a relationship of $-4.0 \leq \{(\alpha 2 - \alpha 1)/\alpha 1\} \times 100 \leq 0.0$, and coefficients of linear thermal expansion in a MD direction and a TD direction at 23 to 200° C. as measured by a TMA method according to JIS K7197 are each within a range of −30 to 55 ppm/K.

(29) The method for manufacturing an LCP extruded film according to (28), wherein the thermoplastic liquid crystal polymer comprises a (wholly) aromatic polyester resin.

(30) The method for manufacturing an LCP extruded film according to (28) or (29), wherein the thermoplastic resin comprises one selected from the group consisting of a polyolefin-based resin, an acrylic resin, a polyamide resin, an acrylonitrile-butadiene-styrene copolymer, polystyrene, polyvinyl chloride, polybutylene terephthalate, polyethylene terephthalate, polycarbonate, polyether ether ketone, and polyphenyl sulfide.

(31) The method for manufacturing an LCP extruded film according to any one of (28) to (30), wherein the resin composition B further contains an inorganic filler.

(32) The method for manufacturing an LCP extruded film according to any one of (28) to (31), wherein the resin composition A, the resin composition B and the resin composition C are co-extruded from a T-die.

(33) The method for manufacturing an LCP extruded film according to any one of (28) to (32), wherein the LCP extruded film is obtained which has a coefficient of linear thermal expansion in a TD direction, of 55 ppm/K or less.

(34) The method for manufacturing an LCP extruded film according to any one of (28) to (33), wherein the LCP extruded film obtained is subjected to heating and pressurizing treatment under a condition of 200 to 360° C.

(35) The method for manufacturing an LCP extruded film according to any one of (28) to (34), wherein the LCP extruded film not having any skin layer that is peelable by a tape in an adhesiveness test by a cross-cutting method according to JIS K5600-5-6, on the film surface S1, is obtained.

The present inventors have intensively studied to solve the above problems, and as a result, have found that not only an LCP extruded film having predetermined tensile characteristics is excellent in stretch ability in stretch treatment, but also this film can be stretched to thereby realize a heat-shrinkable LCP stretched film small in anisotropy of the dimensional rate of change and small in absolute value of the dimensional rate of change, thereby completing another aspect of the present invention.

That is, another aspect of the present invention provides the various specific aspects shown below.

(35) An LCP extruded film for stretch treatment, comprising a thermoplastic liquid crystal polymer, wherein a yield point strength X (MPa) and a fracture point strength Y (MPa) in a TD direction of the LCP extruded film for stretch treatment, in a stress-strain curve measured by a thermostatic tensile test (according to JIS K7161-1:2014, 200° C., tensile speed 200 mm/min), satisfy the following expression (I):

$$0.75 \leq \text{fracture point strength } Y/\text{yield point strength } X \leq 1.50 \quad (I).$$

(36) The LCP extruded film for stretch treatment, according to (35), wherein a coefficient of linear thermal expansion in the TD direction of the LCP extruded film for stretch treatment is 5 to 55 ppm/K.

(37) The LCP extruded film for stretch treatment, according to (35) or (36), wherein the LCP extruded film for stretch treatment is a T-die extruded film.

(38) The LCP extruded film for stretch treatment according to any one of (35) to (37), wherein the LCP extruded film for stretch treatment is an intermediate layer obtained by removing both outer layers from a laminated extruded film having the outer layer, the intermediate layer, and the outer layer.

(39) The LCP extruded film for stretch treatment according to any one of (35) to (38), wherein the LCP extruded film for stretch treatment does not have any skin layer that is peelable by a tape in an adhesiveness test by a cross-cutting method according to JIS K5600-5-6, on the film surface.

(40) The LCP extruded film for stretch treatment according to any one of (35) to (39), wherein the LCP extruded film for stretch treatment has a thickness of 15 μm or more and 300 μm or less.

(41) The LCP extruded film for stretch treatment according to any one of (35) to (40), wherein the LCP extruded film for stretch treatment further contains an inorganic filler.

(42) A heat-shrinkable LCP stretched film comprising a stretched product of the LCP extruded film for stretch treatment according to any one of (35) to (41), wherein a coefficient of linear thermal expansion in a TD direction of the stretched product is within a range of −20 ppm/K or more and less than 0 ppm/K, and a coefficient of linear thermal expansion in a MD direction of the stretched product is within a range of −20 ppm/K or more and less than 0 ppm/K.

(43) The heat-shrinkable LCP stretched film according to (42), wherein the stretched product has a stretch ratio of 1.3 to 2.5 times in a TD direction to the LCP extruded film for stretch treatment.

(44) An insulating material for a circuit substrate, comprising a laminate having at least the heat-shrinkable LCP stretched film according to (42) or (43) and a woven fabric provided on at least one surface of the heat-shrinkable LCP stretched film.

(45) A metal foil-clad laminate comprising the heat-shrinkable LCP stretched film according to (42) or (43) and metal foil provided on one surface and/or both surfaces of the heat-shrinkable LCP stretched film.

(46) A metal foil-clad laminate comprising a laminate having at least the heat-shrinkable LCP stretched film according to (42) or (43) and a woven fabric, and metal foil provided on one surface and/or both surfaces of the laminate.

Advantageous Effects of Invention

One aspect of the present invention can realize novel LCP extruded film, LCP stretched film, insulating material for a circuit substrate, metal foil-clad laminate, and the like, which are reduced in anisotropy of the dimensional rate of change as compared with conventional one. One aspect of the present invention can realize novel LCP extruded film, LCP stretched film, insulating material for a circuit substrate, metal foil-clad laminate, and the like, in which the dimensional rates of change, by themselves, in a MD direction and a TD direction are small. Accordingly, various aspects of the present invention can realize a highly reliable product adaptable to recent ultrafine processing.

One aspect of the present invention can provide a novel method for manufacturing an LCP extruded film, which can allow for a considerable reduction in high orientation of a thermoplastic liquid crystal polymer, hardly avoided by conventional extrusion.

Furthermore, one aspect of the present invention can provide a novel manufacturing method which can obtain an LCP extruded film relaxed in molecular orientation of a thermoplastic liquid crystal polymer, internal strain, and the like not only in a film surface, but also in a film interior, in a simple manner with good reproducibility.

Meanwhile, another aspect of the present invention can provide an LCP extruded film for stretch treatment, which is excellent in stretch ability in stretch treatment and thus can allow for realization of a heat-shrinkable LCP stretched film small in anisotropy of the dimensional rate of change and small in absolute value of the dimensional rate of change.

Another aspect of the present invention can provide a novel heat-shrinkable LCP stretched film small in anisotropy of the dimensional rate of change and small in absolute value of the dimensional rate of change, and an insulating material for a circuit substrate, and a metal foil-clad laminate each using the heat-shrinkable LCP stretched film. Accordingly, various aspects of the present invention can realize a highly reliable product adaptable to recent ultrafine processing.

BRIEF DESCRIPTION OF DRAWINGS

FIG. 1 is a schematic cross-sectional view of an LCP extruded film as one example of one aspect.

FIG. 2 is a schematic perspective view of an LCP extruded film as another example of one aspect.

FIG. 3 is a conceptual diagram of a calculation principle of the degree of orientation based on the orientation peak area ratio.

FIG. 4 illustrates a calculation method in hardness measurement according to a nanoindentation method.

FIG. 5 illustrates a co-extrusion method of an LCP extruded film of one aspect.

FIG. 6 illustrates a co-extrusion method of an LCP extruded film of one aspect.

FIG. 7 illustrates a co-extrusion method of an LCP extruded film of one aspect.

FIG. 8 is a schematic cross-sectional view of an insulating material for a circuit substrate, as one example of one aspect.

FIG. 9 is a schematic cross-sectional view of an insulating material for a circuit substrate, as another example of one aspect.

FIG. 10 is a schematic cross-sectional view of a metal foil-clad laminate as one example of one aspect.

FIG. 11 is a schematic cross-sectional view of a metal foil-clad laminate as another example of one aspect.

FIG. 12 is a schematic cross-sectional view of a metal foil-clad laminate as one example of one aspect.

FIG. 13 is a schematic cross-sectional view of a metal foil-clad laminate as another example of one aspect.

FIG. 14 is a graph representing one example of a stress-strain curve in a TD direction of an LCP extruded film for stretch treatment of another aspect.

FIG. 15 is a graph representing one example of a stress-strain curve in a TD direction of an LCP extruded film for stretch treatment of another aspect.

FIG. 16 is a graph representing one example of a stress-strain curve in a TD direction of an LCP extruded film for stretch treatment of a conventional technique.

FIG. 17 illustrates a co-extrusion method of an LCP extruded film for stretch treatment of another aspect.

FIG. 18 illustrates a co-extrusion method of an LCP extruded film for stretch treatment of another aspect.

FIG. 19 illustrates a co-extrusion method of an LCP extruded film for stretch treatment of another aspect.

FIG. 20 is a schematic cross-sectional view of an insulating material for a circuit substrate, of another aspect.

FIG. 21 is a schematic cross-sectional view of a metal foil-clad laminate of another aspect.

FIG. 22 is a schematic cross-sectional view of a metal foil-clad laminate of another aspect.

DESCRIPTION OF EMBODIMENTS

Hereinafter, the embodiments of the present invention will be described in detail with reference to the drawings. Unless otherwise indicated, the positional relationship, such as top, bottom, left, and right is based on the positional relationship shown in the drawings. Also, the dimensional ratios of the drawings are not limited to those illustrated in the drawings. It should be noted that the following embodiments are merely examples for explaining the present invention, and the present invention is not limited thereto. That is, the present invention can be appropriately modified and implemented within a range not departing from the gist of the present invention. As used herein, for example, the description of the numerical value range "1 to 100" includes both the lower limit value "1" and the upper limit value "100". Also, the same applies to the description of other numerical value ranges.

(LCP Extruded Film)

FIG. 1 is a schematic cross-sectional view of a main portion of an LCP extruded film 100 of one aspect of the present embodiment, and FIG. 2 is a schematic cross-sectional view of a main portion of an LCP extruded film 100 of another aspect of the present embodiment. The LCP extruded film 100 of such each aspect of the present embodiment is obtained by extruding a resin composition containing a thermoplastic liquid crystal polymer, into a film having a thickness of 15 µm or more and 300 µm or less, and satisfies the following conditions (A) and/or (B):

(A) a degree of orientation $\alpha1(\%)$ of a film surface S1 exposed and a degree of orientation $\alpha2(\%)$ of a film surface S2 exposed by etching treatment in a thickness direction of the film surface S1 and located at a depth of 5 µm from the film surface S1 satisfy a relationship of $-4.0 \leq [(\alpha2-\alpha1)/\alpha1] \times 100 \leq 0.0$, and coefficients of linear thermal expansion in a MD direction and a TD direction at 23 to 200° C. as measured by a TMA method according to JIS K7197 are each within a range of −30 to 55 ppm/K;

(B) a hardness H1 at a point of a depth of 1 µm located at a position of 1 µm from a film surface in a thickness direction and a hardness H2 at a thickness center point, as measured by subjecting a film cross section in parallel with a MD direction to a nanoindentation method, satisfy $-10.0 \leq 100 \times (H2-H1)/H1 \leq 0.0$, and coefficients of linear thermal expansion in a MD direction and a TD direction at 23 to 200° C. as measured by a TMA method according to JIS K7197 are each within a range of −30 to 55 ppm/K.

As described above, an LCP extruded film as a conventional technique has been one having a film surface (film surface S1) in which a thermoplastic liquid crystal polymer is extremely molecularly oriented, for example, peeling of a skin layer and/or peeling of a fibrillated fiber occur(s). It has been presumed that shear stress is applied from an apparatus side surface in extrusion to result in high orientation of the thermoplastic liquid crystal polymer in the surface of an extruded product. Although it has been confirmed that such extreme molecular orientation of the thermoplastic liquid crystal polymer in the film surface is relaxed due to improvements as in Patent Literatures 1 and 2, it has been simultaneously found by findings of the present inventors that one capable of withstanding the desired performance of an insulating material of a circuit substrate cannot be realized by only control of the molecular orientation of the thermoplastic liquid crystal polymer in the film surface. In other words, it is necessary for realization of an LCP extruded film reduced in anisotropy of the dimensional rate of change to not only control the molecular orientation of the thermoplastic liquid crystal polymer in the film surface S1, but also control the molecular orientation of the thermoplastic liquid crystal polymer, occurring in a film interior (film surface S2), and reduce internal strain and the like.

The LCP extruded film 100 of such each aspect of the present embodiment allows the molecular orientation of the thermoplastic liquid crystal polymer, internal strain, and the like to be relaxed in not only the film surface (film surface S1), but also the film interior (film surface S2), unlike the conventional technique, and thus is especially reduced in anisotropy of the dimensional rate of change, as compared with conventional one. For example, the LCP extruded film 100 of one aspect of the present embodiment illustrated in FIG. 1 is at least characterized in that the degree of orientation $\alpha1(\%)$ of the film surface S1 exposed and the degree of orientation $\alpha2(\%)$ of the film surface S2 exposed by etching treatment in the thickness direction of the film surface S1 and located at a depth of 5 μm from the film surface S1 satisfy a relationship of $-4.0 \leq [(\alpha2-\alpha1)/\alpha1] \times 100 \leq 0.0$, and the coefficients of linear thermal expansion in the MD direction and the TD direction at 23 to 200° C. as measured by a TMA method according to JIS K7197 are each within a range of −30 to 55 ppm/K. The LCP extruded film 100 of another aspect of the present embodiment illustrated in FIG. 2 is at least characterized in that the hardness H1 at a point of a depth of 1 μm located at a position of 1 μm from the film surface in the thickness direction and the hardness H2 at the thickness center point, as measured by subjecting a film cross section in parallel with the MD direction to a nanoindentation method, satisfy $-10.0 \leq 100 \times (H2-H1)/H1 \leq 0.0$, and the coefficients of linear thermal expansion in the MD direction and the TD direction at 23 to 200° C. as measured by a TMA method according to JIS K7197 are each within a range of −30 to 55 ppm/K. Hereinafter, the detail is further described.

The LCP extruded film 100 here used is preferably an extruded film such as a T-die extruded film. The LCP extruded film 100 here used is also preferably a thermoplastic liquid crystal polymer layer which is an intermediate layer (core layer) of a three layer co-extruded film having a laminated structure in which a thermoplastic resin layer, a thermoplastic liquid crystal polymer layer, and a thermoplastic resin layer are at least arranged in the listed order. In this case, the thermoplastic resin layers as both outer layers of the three layer co-extruded film can be removed to thereby allow the resultant to be used as a thermoplastic liquid crystal polymer film (LCP extruded film 100) of a single layer. An extruded film of a thermoplastic liquid crystal polymer can be produced which is low in cost and homogeneous as compared with woven fabrics and nonwoven fabrics made of thermoplastic liquid crystal polymer fibers.

As the thermoplastic liquid crystal polymer contained in the LCP extruded film 100, those known in the art may be used, and the type thereof is not particularly limited. A liquid crystal polymer is a polymer that forms an optically anisotropic molten phase, and representative examples thereof include a thermotropic liquid crystal compound. The properties of the anisotropic molten phase can be confirmed by a known method such as a polarization test method using crossed polarizers. More specifically, the anisotropic molten phase can be confirmed by observing a sample placed on a Leitz hot stage with a Leitz polarization microscope under a nitrogen atmosphere at 40-fold magnification.

Specific examples of the thermoplastic liquid crystal polymer include those obtained by polycondensation of monomers such as aromatic or aliphatic dihydroxy compounds, aromatic or aliphatic dicarboxylic acids, aromatic hydroxycarboxylic acids, aromatic diamines, aromatic hydroxyamines, and aromatic aminocarboxylic acids, but are not particularly limited thereto. The thermoplastic liquid crystal polymer is preferably a copolymer. Specific examples include aromatic polyamide resins obtained by polycondensation of monomers such as aromatic hydroxycarboxylic acids, aromatic diamines, and aromatic hydroxyamines; and (wholly) aromatic polyester resins obtained by polycondensation of monomers such as aromatic diols, aromatic carboxylic acids, and aromatic hydroxycarboxylic acids; but are not particularly limited thereto. The thermoplastic liquid crystal polymer can be used singly or in any combination of two or more thereof at any ratio.

Thermoplastic liquid crystal polymers are typically categorized to Type I, Type II, Type III, and the like from the viewpoint of thermal distortion temperature (TDUL). Any type of thermoplastic liquid crystal polymers can be suitably used in the LCP extruded film 100 of the present embodiment, and may be appropriately selected and used depending on the intended application. For example, a Type I thermoplastic liquid crystal polymer having a TDUL of about 250 to 350° C. and high heat resistance, or a Type II thermoplastic liquid crystal polymer having a TDUL of about 240 to 250° C. and relatively high heat resistance is suitably used in an electronic circuit substrate application where application to a lead-free solder at about 230 to 260° C. is demanded.

Among these, a (wholly) aromatic polyester resin that exhibits thermotropic liquid crystalline properties and has a melting point of 250° C. or more, preferably a melting point of 280° C. to 380° C. is preferably used. As such a (wholly) aromatic polyester resin, (wholly) aromatic polyester resins that are synthesized from monomers such as aromatic diols, aromatic carboxylic acids, and hydroxycarboxylic acids and that exhibit liquid crystallinity during melting are known. Representative examples thereof include, but are not particularly limited to, a polycondensate of ethylene terephthalate and para-hydroxybenzoic acid, a polycondensate of phenolic and phthalic acids and para-hydroxybenzoic acid, and a polycondensate of 2,6-hydroxynaphthoic acid and para-hydroxybenzoic acid. The (wholly) aromatic polyester resin can be used singly or in any combination of two or more thereof at any ratio. A wholly aromatic polyester resin having a relatively high melting point or a high thermal distortion temperature and high heat resistance or an aromatic polyester resin having a relatively low melting point or a low thermal distortion temperature and excellent fabricability can be used depending on the desired performance.

In preferable one aspect, a (wholly) aromatic polyester resin at least having 6-hydroxy-2-naphthoic acid and a derivative thereof (hereinafter, sometimes simply referred to as "monomer component A".) which is a basic structure, and having one or more monomer component(s) (hereinafter, sometimes simply referred to as "monomer component B".) selected from the group consisting of para-hydroxybenzoic acid, terephthalic acid, isophthalic acid, 6-naphthalenedicarboxylic acid, 4,4'-biphenol, bisphenol A, hydroquinone, 4,4-dihydroxybiphenol, ethylene terephthalate and derivatives thereof is exemplified. The (wholly) aromatic polyester resin forms an anisotropic molten phase in which linear chains of molecules are regularly aligned in a molten state, typically exhibits thermotropic liquid crystalline properties, and has excellent basic performance such as mechanical characteristics, electrical characteristics, high frequency characteristics, heat resistance, and hygroscopicity.

The (wholly) aromatic polyester resin of preferable one aspect, described above, may employ any constitution as long as it has the monomer component A and the monomer component B as essential units. For example, it may have two or more monomer components A, or three or more monomer components A. The (wholly) aromatic polyester resin of preferable one aspect, described above, may contain other monomer component (hereinafter, sometimes simply referred to as "monomer component C".) other than the monomer component A and the monomer component B. That is, the (wholly) aromatic polyester resin of preferable one aspect, described above, may be a binary or higher polycondensate consisting of only the monomer component A and the monomer component B, or may be a ternary or higher polycondensate consisting of the monomer component A, the monomer component B, and monomer component C. Other monomer components are other than the monomer component A and the monomer component B described above, and specific examples thereof include aromatic or aliphatic dihydroxy compounds and derivatives thereof; aromatic or aliphatic dicarboxylic acid and derivatives thereof; aromatic hydroxycarboxylic acid and derivatives thereof; aromatic diamine, aromatic hydroxyamine, or aromatic aminocarboxylic acid and derivatives thereof, but are not particularly limited thereto. Such other monomer component can be used singly or in any combination of two or more thereof at any ratio.

As used herein, the "derivatives" means those which have a modifying group such as a halogen atom (e.g., a fluorine atom, a chlorine atom, a bromine atom, and an iodine atom), an alkyl group having 1 to 5 carbon atoms (e.g., a methyl group, an ethyl group, an n-propyl group, an isopropyl group, an n-butyl group, an isobutyl group, an s-butyl group, and a t-butyl group), an aryl group such as a phenyl group, a hydroxyl group, an alkoxy group having 1 to 5 carbon atoms (e.g., a methoxy group and an ethoxy group), a carbonyl group, —O—, —S—, and —CH$_2$— introduced in a part of the monomer components described above (hereinafter, also referred to as "monomer component having a substituent"). Here, the "derivatives" may be acylated products, ester derivatives, or ester forming monomers such as acid halides, of the monomer components A and B, which may have a modifying group described above.

Examples of particularly preferable one aspect include a binary polycondensate of para-hydroxybenzoic acid and derivatives thereof, and 6-hydroxy-2-naphthoic acid and derivatives thereof; a ternary or higher polycondensate of para-hydroxybenzoic acid and derivatives thereof, 6-hydroxy-2-naphthoic acid and derivatives thereof, and the monomer component C; a ternary or higher polycondensate of para-hydroxybenzoic acid and derivatives thereof, 6-hydroxy-2-naphthoic acid and derivatives thereof, and at least one selected from the group consisting of terephthalic acid, isophthalic acid, 6-naphthalenedicarboxylic acid, 4,4'-biphenol, bisphenol A, hydroquinone, 4,4-dihydroxybiphenyl, ethylene terephthalate, and derivatives thereof; a quaternary or higher polycondensate of para-hydroxybenzoic acid and derivatives thereof, 6-hydroxy-2-naphthoic acid and derivatives thereof, at least one selected from the group consisting of terephthalic acid, isophthalic acid, 6-naphthalenedicarboxylic acid, 4,4'-biphenol, bisphenol A, hydroquinone, 4,4-dihydroxybiphenyl, ethylene terephthalate, and derivatives thereof, and one or more monomer components C. These can be obtained as having a relatively low melting point as compared with, for example, a homopolymer of para-hydroxybenzoic acid, and thus, the thermoplastic liquid crystal polymer using these polymers has excellent fabricability in the thermocompression bonding to an adherend.

From the viewpoint of reducing the melting point of the (wholly) aromatic polyester resin, increasing the fabricability of the LCP extruded film 100 in the thermocompression bonding to an adherend, obtaining high peel strength when the LCP extruded film 100 is thermocompression bonded to a metal foil, or the like, the content in terms of molar ratio of the monomer component A to the (wholly) aromatic polyester resin is preferably 10 mol % or more and 90 mol % or less, more preferably 30 mol % or more and 85 mol % or less, and further preferably 50 mol % or more and 80 mol % or less. Similarly, the content in terms of molar ratio of the monomer component B to the (wholly) aromatic polyester resin is preferably 10 mol % or more and 90 mol % or less, more preferably 15 mol % or more and 70 mol % or less, and further preferably 20 mol % or more and 50 mol % or less. The content of the monomer component C that may be contained in the (wholly) aromatic polyester resin is preferably 10 mol % or less, more preferably 8 mol % or less, further preferably 5 mol % or less, and particularly preferably 3 mol % or less in terms of molar ratio.

A known method may be applied to the synthetic method of the (wholly) aromatic polyester resin without particular limitation. A known polycondensation method to form ester bonds by the monomer components described above, such as melt polymerization, a melt acidolysis method, and a slurry polymerization method can be applied. When these polymerization methods are applied, an acylation or acetylation step may be performed in accordance with a conventional method.

The LCP extruded film 100 may further contain an inorganic filler. The LCP extruded film 100, which contains an inorganic filler, thus can be realized to have a reduced coefficient of linear thermal expansion, and specifically, the LCP extruded film 100, which is reduced in anisotropy of the coefficients of linear thermal expansion in the MD direction, the TD direction and the ZD direction (Z-axis Direction; film thickness direction), is easily obtained. Such an LCP extruded film 100 is particularly useful for, for example, rigid substrate applications in which multilayer laminates are required.

As the inorganic filler, those known in the art may be used, and the type thereof is not particularly limited. Examples include kaolin, fired kaolin, fired clay, unfired clay, silica (e.g., natural silica, fused silica, amorphous silica, hollow silica, wet silica, synthetic silica, and aerosil), aluminum compounds (e.g., boehmite, aluminum hydroxide, alumina, hydrotalcite, aluminum borate, and aluminum nitride), magnesium compounds (e.g., magnesium aluminometasilicate, magnesium carbonate, magnesium oxide, and magnesium hydroxide), calcium compounds (e.g., calcium carbonate, calcium hydroxide, calcium sulfate, calcium sulfite, and calcium borate), molybdenum compounds (e.g., molybdenum oxide and zinc molybdate), talc (e.g., natural talc and fired talc), mica, titanium oxide, zinc oxide, zirconium oxide, barium sulfate, zinc borate, barium metaborate, sodium borate, boron nitride, aggregated boron nitride, silicon nitride, carbon nitride, strontium titanate, barium titanate, and stannate such as zinc stannate, but are not particularly limited thereto. The inorganic filler can be used singly or in combinations of two or more thereof. Among these, silica is preferable from the viewpoint of dielectric characteristics and the like.

The inorganic filler here used may be one subjected to surface treatment known in the art. The surface treatment can allow for enhancements in moisture resistance, adhesion strength, dispersibility, and the like. Examples of the surface treatment agent include a silane coupling agent, a titanate coupling agent, sulfonate, carboxylate, and phosphate, but are not particularly limited thereto.

The median diameter (d50) of the inorganic filler can be appropriately set depending on the desired performance, and is not particularly limited. The d50 of the inorganic filler is preferably 0.01 μm or more and 50 μm or less, more preferably 0.03 μm or more and 50 μm or less, and further preferably 0.1 μm or more and 50 μm or less from the viewpoint of kneading ability and handleability in preparation, and the effect of reducing the coefficients of linear thermal expansion. As used herein, the median diameter (d50) of the inorganic filler refers to a value measured on a volume basis with a laser diffraction/scattering particle size distribution measurement apparatus (LA-500 manufactured by Horiba Ltd.) by a laser diffraction/scattering method.

The content of the inorganic filler can be appropriately set depending on the desired performance in consideration of the blending balance with other essential component and optional component, and is not particularly limited. The content of the inorganic filler in terms of solid content based on the total amount of the LCP extruded film 100 is preferably 1% by mass or more and 45% by mass or less in total, more preferably 3% by mass or more and 40% by mass or less in total, and further preferably 5% by mass or more and 35% by mass or less in total, from the viewpoint of kneading ability and handleability in preparation, and the effect of reducing the coefficients of linear thermal expansion.

The LCP extruded film 100 may contain a resin component other than the thermoplastic liquid crystal polymer described above (hereinafter, sometimes simply referred to as "other resin component".), for example, a thermosetting resin and/or a thermoplastic resin, within a range not excessively impairing the effects of the present invention. The LCP extruded film 100 may each contain additives known in the art, for example, release improving agents such as higher fatty acids having 10 to 25 carbon atoms, higher fatty acid esters, higher fatty acid amide, higher fatty acid metal salts, polysiloxane, and fluorine resins; colorants such as dyes and pigments; organic fillers; antioxidants; thermal stabilizers; light stabilizers; ultraviolet absorbers; flame retardants; antistatic agents; surfactants; anticorrosives; defoaming agents; and fluorescent agents, within a range not excessively impairing the effects of the present invention. These additives can be used each one alone or in combination of two or more. These additives can be contained in a molten resin composition prepared during formation of the LCP extruded film 100. The contents of such resin component and additive are not particularly limited, but are preferably each 0.01 to 10% by mass, more preferably each 0.1 to 7% by mass, further preferably each 0.5 to 5% by mass based on a total amount of the LCP extruded film 100, from the viewpoint of fabricability, thermal stability, and the like.

The thickness of the LCP extruded film 100 can be appropriately set depending on the desired performance and is not particularly limited. Considering the handleability and the productivity during extrusion and the like, the thickness is preferably 15 μm or more and 300 μm or less, more preferably 18 μm or more and 250 μm or less, and further preferably 20 μm or more and 200 μm or less.

The LCP extruded film 100 of the present embodiment is not particularly limited as long as the above conditions (A) and/or (B) are satisfied. In other words, the LCP extruded film 100 of the present embodiment may satisfy only the above conditions (A), may satisfy only the above conditions (B), or may satisfy both the above conditions (A) and (B). In particular, both the above conditions (A) and (B) are preferably satisfied.

For example, from the viewpoint of relaxing the molecular orientation of the thermoplastic liquid crystal polymer, internal strain, and the like in not only the film surface (film surface S1), but also the film interior (film surface S2), and reducing the anisotropy of the dimensional rate of change intended, the LCP extruded film 100 satisfying the above conditions (A) is adjusted so that the degree of orientation α1 of the film surface S1 and the degree of orientation α2 of the film surface S2 satisfy the following relationship:

preferably $-4.0 \leq [(\alpha2-\alpha1)/\alpha1] \times 100 \leq 0.0$.
more preferably $-3.0 \leq [(\alpha2-\alpha1)/\alpha1] \times 100 \leq 0.0$.
further preferably $-2.0 \leq [(\alpha2-\alpha1)/\alpha1] \times 100 \leq 0.0$.

As illustrated in FIG. 1, the film surface S1 is an outermost surface of the LCP extruded film 100 of the present embodiment and is an exposed surface exposed outward. The degree of orientation (degree of orientation α1) of the film surface S1 is preferably 39.0% or less, more preferably 38.5% or less, and further preferably 38.0% or less. On the other hand, the film surface S2 is a surface newly exposed by etching treatment in the thickness direction of the film surface S1 of the LCP extruded film 100 of the present embodiment, and is indicated as a virtual surface located at a depth of 5 μm from the film surface S1, by a dashed line in FIG. 1. The degree of orientation (degree of orientation α2) of the film surface S2 is preferably 37.7% or less, more preferably 37.5% or less, and further preferably 37.3% or less. The depth at which the film surface S2 is located is not needed to be exactly 5 μm from the film surface S1, in consideration of the dissolution error or the like during etching, and may be 5.0 μm or more from the film surface S1. The etching treatment conditions for production of the film surface S2 are not particularly limited, and follow conditions described in Examples below, from the viewpoint of retention of objectivity of the measurement data.

As used herein, the respective degrees of orientation α1 and α2(%) of the film surfaces S1 and S2 of the LCP extruded film 100 refer to values each determined by X-ray diffraction measurement with an X-ray diffraction apparatus according to a transmission method and then calculation from the following expression based on the orientation peak area ratio in the resulting diffraction intensity distribution curve. Typically, in the case of a measurement subject having a low degree of orientation (%), a low peak intensity and a broad diffraction peak are observed by the X-ray diffraction measurement, and thus a high measurement accuracy cannot be retained in a calculation method based on the half-value width of an orientation peak. Therefore, herein, the respective degrees of orientation α1 and α2(%) of the film surfaces S1 and S2 are calculated by not the half-value widths of orientation peaks, but a calculation method based on the orientation peak area ratio. Specifically, the calculation method based on the orientation peak area ratio, as represented in FIG. 3 and expression 1, includes measuring not only the peak intensity (orientation component) by 2θ/θ scan, but also the intensity at 0° to 360° in a bearing angle direction by β scan, to thereby obtain an intensity distribution (base intensity (isotropic component)) in the bearing angle direction, and calculating the proportion of the area of the orientation component, excluding the area of the isotropic component as the base, in the entire area (area of orientation component+ area of isotropic component), as the degree of orientation (%).

$$\text{Degree of orientation [\%]} = \frac{\text{Area of peak portion (orientation component)}}{\text{Whole area (orientation component + isotropic component)}}$$

In this regard, from the viewpoint of relaxing the molecular orientation of the thermoplastic liquid crystal polymer, internal strain, and the like in not only the film surface, but also the film interior, and reducing the anisotropy of the dimensional rate of change intended, the LCP extruded film 100 satisfying the above conditions (B) is adjusted so that the hardness H1 at a point of a depth of 1 µm located at a position of 1 µm from the film surface in the thickness direction and the hardness H2 at the thickness center point, as measured by subjecting a film cross section in parallel with the MD direction to a nanoindentation method, satisfy the following relationship:

preferably $-10.0 \leq 100 \times (H2-H1)/H1 \leq 0.0$.

more preferably $-7.5 \leq 100 \times (H2-H1)/H1 \leq 0.0$.

further preferably $-5.0 \leq 100 \times (H2-H1)/H1 \leq 0.0$.

The relationship represented by the above expressions, namely, the relationship between the hardness H1 at a point of a depth of 1 µm and the hardness H2 at the thickness center point represents the orientation of the thermoplastic liquid crystal polymer in the film, and it is meant that, as the absolute value is lower, the orientation in the MD direction and the TD direction are more isotropic.

As illustrated in FIG. 2, the hardness H1 at a point of a depth of 1 µm located at a position of 1 µm from the film surface in the thickness direction (a position of 1 µm from one film surface in the thickness direction in planar view of the film cross section), in the film cross section in parallel with the MD direction, is an index representing the molecular orientation of the thermoplastic liquid crystal polymer, internal strain, and the like in the vicinity of the film surface of the LCP extruded film 100. The hardness H1 at a point of a depth of 1 µm tends to be higher as the orientation of the thermoplastic liquid crystal polymer is lower, and the hardness tends to be lower as the orientation of the thermoplastic liquid crystal polymer is higher. The hardness H1 at a point of a depth of 1 µm is preferably 0.250 GPa or more, and more preferably 0.255 GPa or more. On the other hand, the hardness H2 at the thickness center point (a position at the equal interval from one film surface and other film surface in planar view of the film cross section) in the film cross section in parallel with the MD direction is an index representing the molecular orientation of the thermoplastic liquid crystal polymer, internal strain, and the like in the film interior of the LCP extruded film 100. The hardness H2 at the thickness center point tends to be higher as the orientation of the thermoplastic liquid crystal polymer is lower, and the hardness tends to be lower as the orientation of the thermoplastic liquid crystal polymer is higher. The hardness H2 at the thickness center point is preferably 0.240 GPa or more, and more preferably 0.245 GPa or more. The method for producing the film cross section in parallel with the MD direction of the LCP extruded film 100 is not particularly limited, and a film smooth cross section in parallel with the MD direction is produced by ion beam processing of the LCP extruded film 100 under freezing conditions, from the viewpoint of retention of objectivity of the measurement data.

As used herein, the hardness measurement according to a nanoindentation method is performed by subjecting the film cross section in parallel with the MD direction of the LCP extruded film 100 to measurement of the hardness H1 at a point of 1 µm from the film surface and the hardness H2 at the thickness center point with a diamond Berkovich indenter under a condition of an indentation depth hmax of 0.05 µm. The hardness H1 and the hardness H2 are calculated from the following expression based on the maximum load Pmax and the contact projected area A (area in which the indenter and the film cross section are in contact with each other), as illustrated in FIG. 4.

$$\text{Hardness (GPa)} = P\text{max}/A$$

The LCP extruded film 100 of such each aspect of the present embodiment is sufficiently reduced in not only the molecular orientation of the thermoplastic liquid crystal polymer, represented by the above degrees of orientation, but also the molecular orientation of the thermoplastic liquid crystal polymer, represented by the above coefficients of linear thermal expansion in the MD direction and the TD direction. As described above, each of the LCP extruded films as the conventional techniques described in Patent Literatures 1 and 2 has been slightly relaxed in molecular orientation of the thermoplastic liquid crystal polymer due to protection by the thermoplastic resin layers of both outer layers in three layer co-extrusion to result in relaxation of anisotropies of the strengths in the MD direction and TD direction of the resulting thermoplastic liquid crystal polymer film. However, in fact, the LCP extruded films described in Patent Literature 1 and 2, while have stably achieved a coefficient of linear thermal expansion in the MD direction, of about −20 ppm/K, each have exhibited a coefficient of linear thermal expansion in the TD direction, of more than 55 ppm, sometimes have reached about 100 ppm/K. As clear from this, it is easily understood that the molecular orientation of the thermoplastic liquid crystal polymer still largely remains or the internal strain and the like largely remain in each of the entire films of the LCP extruded films as the conventional techniques described in Patent Literatures 1 and 2. Accordingly, the molecular orientation of the thermoplastic liquid crystal polymer, internal strain, and the like of the entire film of the LCP extruded film 100 are needed to be controlled by a combination of the degrees of orientation of the film surfaces and the coefficients of linear thermal expansion, a combination of the hardnesses by a nanoindentation method and the coefficients of linear thermal expansion, and/or the like.

Specifically, the coefficients of linear thermal expansion in the MD direction and the TD direction (CTE, α2, 23 to 200° C.) in the LCP extruded film 100 of the present embodiment are each within a range from −30 to 55 ppm/K. The LCP extruded film 100, in which the coefficients of linear thermal expansion are each within such a range, is sufficiently reduced in internal strain and the like, and can be an LCP extruded film which is small in anisotropy of the dimensional rate of change and sufficiently small in absolute value of the dimensional rate of change as compared with those in which the coefficients are not each within such a range. The coefficient of linear thermal expansion (CTE, α2, 23 to 200° C.) in the MD direction of the LCP extruded film 100 of the present embodiment is preferably within a range from −30 to 10 ppm/K, more preferably within a range from −25 to 5 ppm/K, and further preferably within a range from −20 to 0 ppm/K from the viewpoint of increasing adhesiveness to metal foil, or the like. The coefficient of linear thermal expansion (CTE, α2, 23 to 200° C.) in the TD direction of the LCP extruded film 100 of the present embodiment is preferably within a range from 0 to 55 ppm/K, more preferably within a range from 0 to 50 ppm/K, and further preferably within a range from 0 to 45 ppm/K, from the viewpoint of increasing adhesiveness to metal foil, or the like. As used herein, the coefficient of linear thermal expansion (CTE, $\alpha 2$, 23 to 200° C.) refers to a value at a temperature interval of 23 to 200° C., as measured by a TMA method according to JIS K7197. Other detailed measurement conditions are in accordance with the conditions described in the Examples below.

The coefficient of linear thermal expansion is herein measured by a TMA method according to JIS K7197 and the average coefficient of linear thermal expansion, as used herein, refers to an average value of the coefficient of linear thermal expansion at 23 to 200° C. as measured by the relevant method. To observe a value from which the thermal history has been eliminated, the coefficient of linear thermal expansion, here measured, refers to a value obtained when the LCP extruded film 100 is heated at a temperature rising rate of 5° C./min (1st heating), cooled to the measurement environment temperature (23° C.) (1st cooling), and then heated for the second time at a temperature rising rate of 5° C./min (2nd heating). Other specific measurement conditions are in accordance with conditions described in the Examples below.

The dielectric characteristics of the LCP extruded film 100 of the present embodiment can be appropriately set depending on the desired performance, and are not particularly limited. From the viewpoint of obtaining higher dielectric characteristics, the relative dielectric constant $\varepsilon_r$ (36 GHz) is preferably 3.0 or more and 3.7 or less, and more preferably 3.0 to 3.5. Similarly, the dielectric loss tangent tan $\delta$ (36 GHz) is preferably 0.0010 or more and 0.0050 or less, more preferably 0.0010 or more and 0.0045 or less. As used herein, the relative dielectric constant $\varepsilon r$ (36 GHz) and the dielectric loss tangent tan $\delta$ (36 GHz) refer to respective values at 36 GHz as measured by a cavity resonator perturbation method according to JIS K6471. Other specific measurement conditions are in accordance with conditions described in the Examples below.

(Method for Manufacturing LCP Extruded Film)

The LCP extruded film 100 of such each aspect of the present embodiment can be obtained by extruding a resin composition including the thermoplastic liquid crystal polymer described above and if necessary optional component(s) such as an inorganic filler and/or other resin component, in a predetermined thickness. The extrusion method here applied can be any of various known methods, and the type thereof is not particularly limited. For example, a T-die method or an inflation method; for example, a multi-manifold type co-extrusion method or a feed block type co-extrusion method; for example, a multilayer co-extrusion method such as a two layer co-extrusion method or a three layer co-extrusion method; can be arbitrarily combined and applied.

In particular, preferable one aspect provides, for example, a method for obtaining a predetermined LCP extruded film 100 by molding of the above resin composition into a film through a T-die according to an extrusion method with a T-die (hereinafter, sometimes simply referred to as "T-die extrusion method".) and then, if necessary, cooling treatment, compression bonding treatment, heating and pressurizing treatment, and/or the like, from the viewpoint of ease of control of the respective molecular orientations of the thermoplastic liquid crystal polymers in the film surface (film surface S1) and the film interior (film surface S2). Specifically, a co-extrusion method is preferable which involves preparing a resin composition A for a first surface layer comprising a thermoplastic resin, a resin composition B for an intermediate layer comprising a thermoplastic liquid crystal polymer, and a resin composition C of a second surface layer comprising a thermoplastic resin, respectively, and co-extruding them through a co-extrusion die of an extruder and thus extruding a co-extruded melt of a three layer configuration, to thereby form the LCP extruded film 100 as a thermoplastic liquid crystal polymer layer of an intermediate layer. Such co-extrusion leads to protection by the thermoplastic resin layers of both outer layers and thus relaxation of the molecular orientation of the thermoplastic liquid crystal polymer in the thermoplastic liquid crystal polymer layer as the intermediate layer. Hereinafter, preferable one aspect of the method for manufacturing the LCP extruded film 100 of the present embodiment is described in detail.

FIG. 5 to FIG. 7 illustrate preferable one aspect of the method for manufacturing the LCP extruded film 100 of the present embodiment. Here, the above resin composition B comprising the thermoplastic liquid crystal polymer described above and if necessary optional component(s) such as an inorganic filler and/or other resin component is melt-extruded into a film through a T-die of an extruder. The resin compositions A and C each comprising a thermoplastic resin are co-extruded onto both surfaces of the above film-shaped melt-extruded product, and thus a co-extruded melt (three layer laminated film) having a predetermined thickness is produced which has a first outer layer (release layer) comprising a thermoplastic resin, an intermediate layer (LCP layer) comprising a thermoplastic liquid crystal polymer, and a second outer layer (release layer) comprising a thermoplastic resin. The co-extruded melt is drawn by a drawing roller, and sent to a cooling roller and a compression bonding roller. Thereafter, the first outer layer and the second outer layer are separated from the intermediate layer, and the thermoplastic resin layers as both outer layers, and the thermoplastic liquid crystal polymer layer (LCP extruded film 100) as the intermediate layer are each wound by a winding roller.

The resin composition B comprising the thermoplastic liquid crystal polymer may be prepared in accordance with a conventional method, and is not particularly limited. The components described above can be manufactured and processed by a known method such as kneading, melt-kneading, granulation, extrusion, and pressing or injection molding. When melt-kneading is performed, commonly used uniaxial or biaxial extruders or kneading apparatuses such as various kneaders can be used. When various components are supplied to these melt-kneading apparatuses, the liquid crystal polymer, other resin component, the inorganic filler, the additive, and the like may be dry blended in advance with a mixing apparatus such as a tumbler and a Henschel mixer. Upon melt-kneading, the cylinder set temperature of the kneading apparatus may be appropriately set without particular limitation, and is typically preferably within a range of the melting point of the liquid crystal polymer or more and 360° C. or less, and more preferably the melting point of the liquid crystal polymer +10° C. or more and 360° C. or less.

The preparation of the resin compositions A and C each comprising the thermoplastic resin may also be performed in accordance with a conventional method, and is not particularly limited. Examples of the thermoplastic resin include polyolefin-based resins such as polyethylene, polypropylene, polymethylpentene and ethylene-α-olefin copolymers, acrylic resins such as PMMA, polyamide resins, acrylonitrile-butadiene-styrene copolymers (ABS resin), polystyrene (PS), polyvinyl chloride, polybutylene terephthalate (PBT), polyethylene terephthalate (PET), polycarbonate (PC), polyether ether ketone (PEEK), and polyphenyl sulfide (PPS), but are not particularly limited thereto. Even either a polar resin such as polycarbonate or a non-polar resin such as polymethylpentene can effectively serve as a release layer, when formed into a co-extruded melt. The thermoplastic resin may be blended with other resin component and an optional component such as an inorganic filler which are optionally contained in the LCP extruded film 100. The resin composition A and the resin composition C may be the same or different in terms of the resin composition ratio, and may contain the same or different thermoplastic resins. The resin compositions each comprising the thermoplastic resin can be manufactured and processed by a known method such as kneading, melt-kneading, granulation, extrusion, and pressing or injection molding. When melt-kneading is performed, uniaxial or biaxial extruders or kneading apparatuses such as various kneaders, commonly used, can be used. When various components are supplied to these melt-kneading apparatuses, the thermoplastic resin, other resin component, the inorganic filler, the additive, and the like may be dry blended by use of a mixing apparatus such as a tumbler and a Henschel mixer. Upon melt-kneading, the cylinder set temperature of the kneading apparatus may be appropriately set to a temperature equal to or less than the temperature not causing any degradation of the thermoplastic resin due to pyrolysis, is not particularly limited, and is typically preferably equal to or more than the melting point of the thermoplastic resin, more preferably the melting point of the thermoplastic resin +10° C. or more.

The set conditions of the co-extrusion may be appropriately set depending on the types and compositions of the resin compositions to be used, the desired performance of the intended extruded film, and the like, and are not particularly limited. For example, the set temperature of the cylinder of the extruder may be appropriately set depending on the types and compositions of the resin compositions to be used, the desired performance of the intended extruded film, and the like, is not particularly limited, and is preferably 230 to 360° C., and more preferably 280 to 350° C.

For example, the die width (mm) of the T-die may also be appropriately set depending on the types and compositions of the resin compositions to be used, the desired performance of the intended extruded film, and the like, is not particularly limited, and is typically preferably 200 to 2000 mm, and more preferably 400 to 1500 mm.

For example, the lip opening (mm) of the T-die may also be appropriately set depending on the types and compositions of the resin compositions to be used, the desired performance of the intended extruded film, and the like, is not particularly limited, and is typically preferably 0.1 to 3.0 (mm), and more preferably 0.2 to 2.0 (mm).

For example, the shear rate ($sec^{-1}$) on the lip wall of the T-die may also be appropriately set depending on the types and compositions of the resin compositions to be used, the desired performance of the intended extruded film, and the like, is not particularly limited, and is typically preferably 100 to 1500 ($sec^{-1}$), and more preferably 150 to 1000 ($sec^{-1}$).

The total amount of ejection ($mm^3$/sec) of the resin compositions through the T-die may also be appropriately set depending on the types and compositions of the resin compositions to be used, the desired performance of the intended extruded film, and the like, is not particularly limited, and is typically preferably 500 to 15000 ($mm^3$/sec), and more preferably 1500 to 10000 ($mm^3$/sec).

The melt viscosity (Pa·sec) of the thermoplastic liquid crystal polymer may also be appropriately set depending on the types and compositions of the resin compositions to be used, the desired performance of the intended extruded film, and the like, is not particularly limited, and is typically preferably 10 to 300 (Pa·sec), and more preferably 20 to 250 (Pa·sec). The melt viscosity (Pa·sec) of the thermoplastic liquid crystal polymer refers to a value measured with Capilograph 1D (manufactured by Toyo Seiki Seisaku-sho, Ltd.) according to JIS K7199, under conditions of a cylinder diameter of mm, a cylinder size of 1.00 mm, and a barrel diameter of 9.55 mm and under the manufacturing conditions of the LCP extruded film 100 (die temperature, and shear rate of lip wall).

The drawing speed (ram/sec) of the co-extruded film may also be appropriately set depending on the types and compositions of the resin compositions to be used, the desired performance of the intended extruded film, and the like, is not particularly limited, and is typically preferably 15 to 1000 (ram/sec), and more preferably 20 to 500 (ram/sec).

The shear stress (kPa) during co-extrusion is desirably low from the viewpoint of reducing the molecular orientation in the MD direction of the thermoplastic liquid crystal polymer during co-extrusion. When the shear stress during co-extrusion is high, the thermoplastic liquid crystal polymer tends to be easily highly aligned in the MD direction and the internal strain tends to easily remain, and when the shear stress during co-extrusion is low, the molecular orientation of the thermoplastic liquid crystal polymer tends to be easily reduced in both the film surface (film surface S1) and the film interior (film surface S2) and the internal strain tends to hardly remain. The shear stress (kPa) during co-extrusion is a value represented by the product of the shear rate ($sec^{-1}$) on the lip wall and the melt viscosity (Pa·sec) of the thermoplastic liquid crystal polymer, and the shear rate is a value calculated based on the total amount of ejection of the resin compositions during co-extrusion, the die width, and the lip opening. Accordingly, the shear stress during co-extrusion can be controlled by adjusting such each value. Specifically, the shear stress during co-extrusion is preferably 40 kPa or less, more preferably 38 kPa or less, and further preferably 36 kPa or less. The lower limit value is not particularly limited, but is preferably 5 kPa or more, and more preferably 10 kPa or more, in consideration of productivity and the like.

The drawdown ratio during co-extrusion is desirably low from the viewpoint of reducing the molecular orientation in the MD direction of the thermoplastic liquid crystal polymer during co-extrusion. When the drawdown ratio during co-extrusion is high, the thermoplastic liquid crystal polymer tends to be easily highly aligned in the MD direction and the internal strain tends to easily remain, and when the drawdown ratio during co-extrusion is low, the molecular orientation of the thermoplastic liquid crystal polymer tends to be easily reduced in both the film surface (film surface S1) and the film interior (film surface S2) and the internal strain tends to hardly remain. The drawdown ratio is a value represented by the drawing speed (mm/sec)/the flow rate (ram/sec) of the thermoplastic liquid crystal polymer, and the flow rate of the thermoplastic liquid crystal polymer is a value calculated based on the total amount of ejection of the resin compositions during co-extrusion, the die width, and the lip opening. Accordingly, the drawdown ratio during co-extrusion can be controlled by adjusting such each value. Specifically, the drawdown ratio during co-extrusion is preferably 3.5 or less, more preferably 3.3 or less, and further preferably 3.1 or less. The lower limit value is not particularly limited, but is preferably 1.0 or more, and more preferably 1.2 or more, in consideration of productivity and the like.

The thickness of the LCP extruded film 100 to be obtained can be appropriately set depending on the desired performance, and is not particularly limited. Considering the handleability and the productivity during extrusion and the like, the thickness is preferably 15 μm or more and 300 μm or less, more preferably 18 μm or more and 250 μm or less, and further preferably 20 μm or more and 200 μm or less.

The melting point (melting temperature) of the obtained LCP extruded film 100 is not particularly limited, but the melting point (melting temperature) is preferably 200 to 400° C. from the viewpoint of the heat resistance, processability, and the like of the film, and is preferably 250 to 360° C., more preferably 260 to 355° C., further preferably 270 to 350° C., and particularly preferably 275 to 345° C., from the viewpoint of especially increasing the thermocompression bonding properties to the metal foil. As used herein, to observe a value from which the thermal history has been eliminated, the melting point of LCP extruded film 100 refers to a melting peak temperature in differential scanning calorimetry (DSC) when the extruded film is heated at a temperature interval of 30 to 400° C. and at a temperature rising rate of 20° C./min with DSC8500 (manufactured by PerkinElmer Japan Co., Ltd.) (1st heating), then cooled at a temperature decreasing rate of 50° C./min (1st cooling), and then heated for the second time at a temperature rising rate of 20° C./min (2nd heating). Others are in accordance with the measurement conditions described in the Examples below.

The LCP extruded film 100, which is extruded, can be used as it is, but can be, if necessary, subjected to a pressurizing and heating step to result in further reduction in molecular orientation (anisotropy) of the thermoplastic liquid crystal polymer or further relaxation of the internal strain, and thus the LCP extruded film 100, which is more reduced in anisotropy of the dimensional rate of change, and the LCP extruded film 100, which is lower in absolute value of the dimensional rate of change, can also be realized.

The heating and pressurizing treatment may be performed using a method known in the art such as contact type heat treatment and non-contact type heat treatment, and the type thereof is not particularly limited. Heat setting can be carried out using a known device such as a non-contact heater, an oven, a blowing apparatus, a heat roller, a cooling roller, a heat press, or a double belt heat press. At this time, heat treatment may be performed by placing a release film or a porous film known in the art on a surface of the LCP extruded film 100, if necessary. When this heat treatment is performed, thermocompression molding in which a release film or a porous film is placed on both surfaces of the LCP extruded film 100, which is subjected to thermocompression bonding by sandwiching it between a pair of endless belts of a double belt press, and then the release film or the porous film is removed is preferably used, from the viewpoint of controlling the orientation. Thermocompression molding may be performed with reference to, for example, Japanese Patent Laid-Open No. 2010-221694. The treatment temperature when the LCP extruded film 100 using the above resin composition is subjected to thermocompression molding between a pair of endless belts of a double belt press is preferably a temperature higher than the melting point of the liquid crystal polymer and not more than a temperature 70° C. higher than the melting point, more preferably not less than a temperature+5° C. higher than the melting point and not more than a temperature 60° C. higher than the melting point, and further preferably not less than a temperature+10° C. higher than the melting point and not more than a temperature 50° C. higher than the melting point, to control the crystalline state of the LCP extruded film 100. The thermocompression bonding conditions can be appropriately set depending on the desired performance and are not particularly limited, but are preferably conditions of a surface pressure of 0.5 to 10 MPa and a heating temperature of 250 to 430° C., more preferably conditions of a surface pressure of 0.6 to 8 MPa and a heating temperature of 260 to 400° C., and further preferably conditions of a surface pressure of 0.7 to 6 MPa and a heating temperature of 270 to 370° C. On the other hand, when a non-contact heater or an oven is used, for example, thermocompression bonding is preferably performed under the conditions at 200 to 320° C. for 1 to hours.

(Insulating Material for Circuit Substrate)

FIG. 8 and FIG. 9 are each a schematic cross-sectional view of a main portion of an insulating material 200 for a circuit substrate of the present embodiment. The insulating material 200 for a circuit substrate of the present embodiment comprises a laminate having at least the LCP extruded film 100 satisfying the above conditions (A) and/or (B) and a woven fabric WF provided on one surface and/or both surfaces of the LCP extruded film 100.

Specifically, the insulating material 200 for a circuit substrate comprises a laminate having a laminated structure (three layer structure) in which the LCP extruded film 100, the woven fabric WF and the LCP extruded film 100 are at least arranged in the listed order. In the laminate, one of these LCP extruded films 100 is provided on a front surface of the woven fabric WF and other of these LCP extruded films 100 is provided on a rear surface of the woven fabric WF. These three layers are thermocompression bonded and thus a laminate of the three layer structure is formed. While the laminate of the three layer structure is here exemplified, the present invention can be, of course, realized even by a laminate of a two layer structure in which one of these LCP extruded films 100 is omitted or a laminate of a laminated structure of four or more layers, in which the LCP extruded film 100 and/or woven fabric WF are/is further laminated.

As used herein, the "woven fabric WF provided on one surface and/or both surfaces of the LCP extruded film 100" encompasses not only an aspect in which the LCP extruded film 100 is placed directly on a surface of the woven fabric WF as in the present embodiment, but also an aspect in which any layers (not shown, e.g., primer layer and/or adhesive layer) are interposed between the LCP extruded film 100 and the woven fabric WF and thus the LCP extruded film 100 is located with being apart from the woven fabric WF.

The woven fabric WF is a fabric obtained by weaving a fiber. The type of the fiber of the woven fabric WF is not particularly limited, and any of an inorganic fiber, an organic fiber, or an organic/inorganic hybrid fiber can be used. In particular, a woven fabric WF of an inorganic fiber is preferably used. The woven fabric WF of an inorganic fiber can be thermocompression bonded with the LCP extruded film 100 to thereby allow the anisotropy of the dimensional rate of change in the MD direction and the TD direction to be kept small, and allow the dimensional rate of change in each of the MD direction and the TD direction, by itself, to be decreased in a further suitable aspect. A commercial product can be used for the woven fabric WF, and the woven fabric can be manufactured by a method known in the art.

Examples of the inorganic fiber include glass fibers such as E-glass, D-glass, L-glass, M-glass, S-glass, T-glass, Q-glass, UN-glass, NE-glass, and spherical glass, inorganic fibers other than glass, such as quartz, and ceramic fibers such as silica, but are not particularly limited thereto. The woven fabric WF of the inorganic fiber is suitably a woven fabric subjected to opening treatment or packing treatment, from the viewpoint of dimensional stability. Among these, a glass cloth is preferable from the viewpoint of mechanical strength, dimensional stability, water absorbability, and the like. A glass cloth subjected to opening treatment or packing treatment is preferable from the viewpoint of increasing the thermocompression bonding properties of the LCP extruded film 100. A glass cloth subjected to surface treatment with a silane coupling agent or the like, for example, epoxy silane treatment or amino silane treatment can also be suitably used. The woven fabric WF can be used singly or in appropriate combinations of two or more kinds thereof.

The thickness of the woven fabric WF can be appropriately set depending on the desired performance, and is not particularly limited. The thickness is preferably 10 to 300 µm, more preferably 10 to 200 µm, and further preferably 15 to 180 µm from the viewpoint of lamination ability, processability, mechanical strength, and the like.

The total thickness of the insulating material for a circuit substrate 200 can be appropriately set depending on the desired performance, and is not particularly limited. The total thickness is preferably 30 to 500 µm, more preferably 50 to 400 µm, further preferably 70 to 300 µm, and particularly preferably 90 to 250 µm from the viewpoint of lamination ability, processability, mechanical strength, and the like.

The insulating material 200 for a circuit substrate of the present embodiment, in which the above configuration is adopted, thus has a significant effect in that the anisotropy of the dimensional rate of change in the MD direction and the TD direction is small and, in a further suitable aspect, the dimensional rate of change in each of the MD direction and the TD direction, by itself, can be decreased and furthermore the material is excellent in dielectric characteristics in a high frequency area, is easily manufactured and is excellent in productivity.

The insulating material 200 for a circuit substrate can be manufactured by appropriate application of a known production method, and the manufacturing method thereof is not particularly limited. As one example, the insulating material 200 for a circuit substrate can be obtained by laminating the LCP extruded film 100 and the woven fabric WF, and heating and pressurizing the resultant, to thereby thermocompression bond the LCP extruded film 100 and the woven fabric WF. A method is also preferable in which the LCP extruded film 100, the woven fabric WF and the LCP extruded film 100 are stacked in the listed order into a laminate and this laminate is heated and pressurized and subjected to thermocompression molding with being sandwiched by use of a press, a double belt press or the like to thereby provide the insulating material 200 for a circuit substrate. The processing temperature during thermocompression bonding can be appropriately set depending on the desired performance and is not particularly limited, but is preferably 200 to 400° C., more preferably 250 to 360° C., and further preferably 270 to 350° C. The processing temperature during thermocompression bonding is a value measured with the surface temperature of the LCP extruded film 100 of the laminate described above. The pressurizing conditions here can be appropriately set depending on the desired performance and are not particularly limited, but, are, for example, conditions of a surface pressure of 0.5 to 10 MPa and 1 to 240 minutes, more preferably conditions of a surface pressure of 0.8 to 8 MPa and 1 to 120 minutes.

(Metal Foil-Clad Laminate)

FIG. 10 and FIG. 11 are each a schematic cross-sectional view of a main portion of a metal foil-clad laminate 300 of the present embodiment. The metal foil-clad laminate 300 of the present embodiment comprises the LCP extruded film 100 satisfying the above conditions (A) and/or (B) and a metal foil MF provided on one surface and/or both surfaces of the LCP extruded film 100.

Specifically, the metal foil-clad laminate 300 is a double-sided metal foil-clad laminate having a laminated structure (three layer structure) in which the metal foil MF, the LCP extruded film 100, and the metal foil MF are at least arranged in the listed order. These three layers are thermocompression bonded and thus a laminate of the three layer structure is formed. While the double-sided metal foil-clad laminate is shown in the present embodiment, the present invention can also be realized as an aspect in which the metal foil MF is provided on only one surface of the LCP extruded film 100. In other words, while the laminate of the three layer structure is here exemplified, the present invention can be, of course, realized even by a laminate of a two layer structure in which one of these metal foils MF is omitted or a laminate of a laminated structure of four or more layers, in which the LCP extruded film 100 and/or the woven fabric WF are/is further laminated.

FIG. 12 and FIG. 13 are each a schematic cross-sectional view of a main portion of a metal foil-clad laminate 400 of the present embodiment. The metal foil-clad laminate 400 of the present embodiment comprises a laminate having at least the LCP extruded film 100 satisfying the above conditions (A) and/or (B) and the above woven fabric WF provided on one surface and/or both surfaces of the LCP extruded film 100, and a metal foil MF provided on one surface and/or both surfaces of the laminate.

Specifically, the metal foil-clad laminate 400 is a double-sided metal foil-clad laminate having a laminated structure (five layer structure) in which the metal foil MF, the LCP extruded film 100, the woven fabric WF, the LCP extruded film 100, and the metal foil MF are at least arranged in the listed order. These five layers are thermocompression bonded and thus a laminate of the five layer structure is formed. While the double-sided metal foil-clad laminate is shown in the present embodiment, the present invention can also be realized as an aspect in which the metal foil MF is provided on only one surface. In other words, while the laminate of the five layer structure is here exemplified, the present invention can be, of course, realized even by a laminate of a four layer structure in which one of these metal foils MF is omitted or a laminate of a laminated structure of six or more layers, in which the LCP extruded film 100, the insulating material 200 for a circuit substrate, and/or the woven fabric WF are/is further laminated.

Examples of the material of the metal foil MF include, but are not particularly limited to, gold, silver, copper, copper alloy, nickel, nickel alloy, aluminum, aluminum alloy, iron, and iron alloy. Among these, a copper foil, an aluminum foil, a stainless steel foil, and an alloy foil of copper and aluminum are preferred, and a copper foil is more preferred. As such a copper foil, any one manufactured by a rolling method, an electrolysis method, or the like may be used, and electrolytic copper foil and rolled copper foil which have a relatively high surface roughness are preferred.

The thickness of the metal foils MF may be appropriately set in accordance with the desired performance, and is not particularly limited. Typically, the thickness is preferably 1.5 to 1,000 μm, more preferably 2 to 500 μm, further preferably 5 to 150 μm, and particularly preferably 7 to 100 μm. As long as the function and effect of the present invention are not impaired, the metal foils MF may be subjected to surface treatment such as chemical surface treatment such as acid washing. The types and the thicknesses of the metal foils MF may be the same as or different from each other.

The method for providing the metal foils MF on the surfaces of the LCP extruded film 100 and the insulating material for a circuit substrate 200 can be performed in accordance with a conventional method, and is not particularly limited. The method may be any one of methods in which the metal foils MF are laminated on the LCP extruded film 100 and the insulating material for a circuit substrate 200 and then both layers are adhered or pressure bonded, physical methods (dry method) such as sputtering and vapor deposition, chemical methods (wet method) such as electroless plating and electrolytic plating after electroless plating, and methods for applying a metal paste. The metal foil-clad laminates 300 and 400 can also be obtained by heat pressing a laminate in which the LCP extruded film 100 and the insulating material for a circuit substrate 200 and one or more metal foils MF are laminated, with, for example, a multi-stage press, a multi-stage vacuum press, a continuous molding machine, or an autoclave molding machine.

The metal foil-clad laminates 300 and 400 can be manufactured by appropriate application of a known production method, and the manufacturing method thereof is not particularly limited. As one example, a method is exemplified in which the LCP extruded film 100, the insulating material 200 for a circuit substrate and the metal foil MF are stacked into a laminate in which the metal foil MF is placed on the LCP extruded film 100 and this laminate is subjected to thermocompression molding with being sandwiched between a pair of endless belts of a double belt press. As described above, the LCP extruded film 100 to be used in the present embodiment is small in anisotropy of the dimensional rate of change in the MD direction and the TD direction and, in a further suitable aspect, the dimensional rate of change in each of the MD direction and the TD direction, by itself, is small and thus high peel strength to the metal foil MF is obtained.

The temperature during thermocompression bonding of the metal foils MF can be appropriately set depending on the desired performance, and is not particularly limited, but is preferably not less than a temperature 50° C. lower than the melting point of the liquid crystal polymer and not more than a temperature 50° C. higher than the melting point, more preferably not less than a temperature 40° C. lower than the melting point and not more than a temperature 40° C. higher than the melting point, further preferably not less than a temperature 30° C. lower than the melting point and not more than a temperature 30° C. higher than the melting point, and particularly preferably not less than a temperature 20° C. lower than the melting point and not more than 20° C. higher than the melting point. The temperature during thermocompression bonding of the metal foils MF is a value measured with the surface temperature of the LCP extruded film 100 of the above-described. The thermocompression bonding conditions at this time can be appropriately set in accordance with the desired performance, but is not particularly limited thereto. For example, when a double belt press is used, the thermocompression bonding is preferably performed under the conditions of surface pressure of 0.5 to 10 MPa and a heating temperature of 200 to 360° C.

The metal foil-clad laminates 300 and 400 of the present embodiment may have another laminated structure or a further laminated structure, as long as including a thermocompression bonded body of a two layer structure of the LCP extruded film 100, and the metal foils MF. The laminated structure may be a multilayer structure, for example, a two layer structure such as metal foil MF/LCP extruded film 100; a three layer structure such as metal foil MF/LCP extruded film 100/metal foil MF, or LCP extruded film 100/metal foil MF/LCP extruded film 100; a four layer structure such as metal foil MF/LCP extruded film 100/woven fabric WF/LCP extruded film 100; or a five layer structure such as metal foil MF/LCP extruded film 100/metal foil MF/LCP extruded film 100/metal foil MF, or metal foil MF/LCP extruded film 100/woven fabric WF/LCP extruded film 100/metal foil MF. Also, a plurality of metal foil-clad laminates 300 and 400 (e.g., 2 to 50 laminates) may be laminated and thermocompression bonded.

In the metal foil-clad laminates 300 and 400 of the present embodiment, the peel strength between the LCP extruded film 100 and the metal foils MF is not particularly limited, but is preferably 0.8 (N/mm) or more, more preferably 1.0 (N/mm) or more, and further preferably 1.2 (N/mm) or more, from the viewpoint of providing further high peel strength. As described above, since the metal foil-clad laminates 300 and 400 of the present embodiment can realize high peel strength, for example, peeling between the LCP extruded film 100 and the metal foils MF can be suppressed in the heating step during manufacture of a substrate. In addition, since manufacturing conditions for excellent process tolerance and productivity can be applied to obtain the same peel strength as the conventional technique, the deterioration of the basic performance possessed by the liquid crystal polymer can be suppressed, while the same degree of peel strength as the conventional metal foil-clad laminate is maintained.

The metal foil-clad laminates 300 and 400 of the present embodiment can be used as a raw material for circuit substrates such as electronic circuit substrates or multilayer substrates, by performing pattern etching on at least a part of the metal foils MF. The metal foil-clad laminates 300 and 400 of the present embodiment, since having excellent dielectric characteristics in a high frequency area and being small in anisotropy of the dimensional rate of change in the MD direction and the TD direction, and, in a further suitable aspect, being low in dimensional rate of change in each of the MD direction and the TD direction, by itself, having excellent dimensional stability, being easily manufactured and having excellent productivity, are especially useful raw materials as insulating materials for flexible printed wiring boards (FPC) and the like in the fifth-generation mobile communication system (5G), millimeter wave radar, and the like.

(LCP Stretched Film)

In each of the embodiments, the LCP extruded film 100, which is obtained by extruding the resin composition comprising the thermoplastic liquid crystal polymer, into a film, is used, and the LCP extruded film 100 can be, if necessary, subjected to uniaxial and/or biaxial stretch treatment and then used in the form of an LCP stretched film (stretched product of the LCP extruded film 100). The LCP stretched film can be used to form the insulating material 200 for a circuit substrate, the metal foil-clad laminates 300 and 400, or the like.

The set conditions of the stretch treatment may be appropriately set depending on the types and compositions of the resin compositions to be used, the desired performance of the intended LCP stretched film, and the like, and are not particularly limited. In the case of the uniaxial stretch, for example, the LCP extruded film 100 can be stretched by 1.1 to 2.5 times in the TD direction (Transverse Direction) at 90 to 180° C., and thereafter is preferably subjected to, for example, heat treatment (heat setting) at 100 to 240° C. for 1 to 600 seconds. In the case of the biaxial stretch, for example, the LCP extruded film 100 can be stretched preferably by 1.1 to 2.5 times in the MD direction (Machine Direction) at 70 to 180° C. into a uniaxial stretched film and furthermore then stretched by 1.1 to 2.5 times in the TD direction (Transverse Direction) at 90 to 180° C., and thereafter the resultant is preferably subjected to, for example, heat treatment (heat setting) at 100 to 240° C. for 1 to 600 seconds. Here, not sequential stretch, but simultaneous biaxial stretch can also be adopted. The stretch ratio is not particularly limited, but is preferably 1.1 times or more, more preferably 1.2 times or more, further preferably 1.3 times or more, and particularly preferably 1.5 times or more, in terms of the total stretch ratio of MD direction×TD direction (stretch ratio represented by m×n under the assumption that the stretch ratio in the MD direction is m and the stretch ratio in the TD direction is n), from the viewpoints such as enhancing conveyance ability and release ability of the film, suppressing the variation in thickness and the occurrence of wrinkles and the like. The upper limit is not particularly limited, but is 3.0 times or less as a target, and is preferably 2.7 times or less, further preferably less than 2.5 times, and particularly preferably less than 2.3 times. The heat setting can be performed by a method known in the art such as contact type heat treatment and non-contact type heat treatment, and the type thereof is not particularly limited. The heat setting can be carried out using a known device such as a non-contact heater, an oven, a blowing apparatus, a heat roller, a cooling roller, a heat press, or a double belt heat press. At this time, heating and pressurizing treatment may be performed by placing a release film or a porous film known in the art on a surface of the LCP stretched film, if necessary.

The coefficients of linear thermal expansion in the MD direction and the TD direction (CTE, $\alpha 2$, 23 to 200° C.) of the LCP extruded film 100 of the LCP stretched film (stretched product of the LCP extruded film 100) can be appropriately set depending on the desired performance and are not particularly limited, but are each preferably within a range from −20 to 15 ppm/K, each more preferably within a range from −15 to 10 ppm/K, each further preferably within a range from −10 to 5 ppm/K, and each particularly preferably within a range from −10 to 0 ppm/K, from the viewpoint of decreasing anisotropy of the dimensional rate of change and the absolute value of the dimensional rate of change, increasing adhesiveness to the metal foil, and the like.

(LCP Extruded Film for Stretch Treatment)

The LCP extruded film to be stretched (LCP extruded film before stretch treatment, hereinafter, sometimes simply referred to as "LCP extruded film for stretch treatment".), which can be suitably used as a precursor film of the LCP stretched film, is described below in detail. The LCP extruded film for stretch treatment, here described, corresponds to another aspect of the present invention, and is an LCP extruded film (LCP extruded film to be stretched) which comprises a thermoplastic liquid crystal polymer and which can be uniformly stretched in stretch treatment.

As described above, an LCP extruded film as a conventional technique has been one having a film surface in which a thermoplastic liquid crystal polymer is extremely molecularly oriented, for example, peeling of a skin layer and/or peeling of a fibrillated fiber occur(s). It has been presumed that shear stress is applied from an apparatus side surface in extrusion to result in high orientation of the thermoplastic liquid crystal polymer in the surface of an extruded product. Even an LCP extruded film as a conventional technique, with a high orientation of the thermoplastic liquid crystal polymer, has been expected to allow for realization of an LCP stretched film small in anisotropy of the dimensional rate of change and small in absolute value of the dimensional rate of change, by application of stretch treatment, but it has been found by findings of the present inventors that an LCP extruded film as a conventional technique has almost no stretch suitability in stretch treatment and an industrially useful LCP stretched film is substantially difficult to obtain. Specifically, an LCP extruded film as a conventional technique has possessed substantially no stretch suitability, for example, has been non-uniformly stretched even only by stretch treatment at a stretch ratio of 1.1 times in the TD direction, and for example, has been fractured at an increased stretch ratio in the TD direction, of 1.2 times. In this regard, although it has been confirmed that such extreme molecular orientation of the thermoplastic liquid crystal polymer in the film surface is relaxed due to improvements as in Patent Literatures 1 and 2, it has been simultaneously found by findings of the present inventors that one capable of withstanding the desired performance of an insulating material of a circuit substrate cannot be realized by only control of the molecular orientation of the thermoplastic liquid crystal polymer in the film surface.

An LCP extruded film for stretch treatment of the present embodiment (LCP extruded film to be stretched) has been studied from such a viewpoint. In other words, the LCP extruded film for stretch treatment of the present embodiment (LCP extruded film to be stretched) has predetermined tensile characteristics, and thus has favorable stretch suitability in at least the TD direction and therefore can be uniformly stretched, in which such uniform stretch has been difficult in a conventional technique. The LCP extruded film to be stretched can be subjected to stretch treatment and thus reduced in molecular orientation of the thermoplastic liquid crystal polymer, occurring in the film surface and/or the film interior, and internal strain and the like, and therefore a heat-shrinkable LCP stretched film small in anisotropy of the dimensional rate of change and small in absolute value of the dimensional rate of change can be realized.

As the thermoplastic liquid crystal polymer contained in the LCP extruded film for stretch treatment, those known in the art may be used, and the type thereof is not particularly limited. A liquid crystal polymer is a polymer that forms an optically anisotropic molten phase, and representative examples thereof include a thermotropic liquid crystal compound. The properties of the anisotropic molten phase can be confirmed by a known method such as a polarization test method using crossed polarizers. More specifically, the anisotropic molten phase can be confirmed by observing a sample placed on a Leitz hot stage with a Leitz polarization microscope under a nitrogen atmosphere at 40-fold magnification.

Specific examples of the thermoplastic liquid crystal polymer include those obtained by polycondensation of monomers such as aromatic or aliphatic dihydroxy compounds, aromatic or aliphatic dicarboxylic acids, aromatic hydroxycarboxylic acids, aromatic diamines, aromatic hydroxyamines, and aromatic aminocarboxylic acids, but are not particularly limited thereto. The thermoplastic liquid crystal polymer is preferably a copolymer. Specific examples include aromatic polyamide resins obtained by polycondensation of monomers such as aromatic hydroxycarboxylic acids, aromatic diamines, and aromatic hydroxyamines; and (wholly) aromatic polyester resins obtained by polycondensation of monomers such as aromatic diols, aromatic carboxylic acids, and aromatic hydroxycarboxylic acids; but are not particularly limited thereto. The thermoplastic liquid crystal polymer can be used singly or in any combination of two or more thereof at any ratio.

Thermoplastic liquid crystal polymers are typically categorized to Type I, Type II, Type III, and the like from the viewpoint of thermal distortion temperature (TDUL). Any type of thermoplastic liquid crystal polymers can be suitably used in the LCP extruded film for stretch treatment of the present embodiment, and may be appropriately selected and used depending on the intended application. For example, a Type I thermoplastic liquid crystal polymer having a TDUL of about 250 to 350° C. and high heat resistance, or a Type II thermoplastic liquid crystal polymer having a TDUL of about 240 to 250° C. and relatively high heat resistance is suitably used in an electronic circuit substrate application where application to a lead-free solder at about 230 to 260° C. is demanded.

Among these, a (wholly) aromatic polyester resin that exhibits thermotropic liquid crystalline properties and has a melting point of 250° C. or more, preferably a melting point of 280° C. to 380° C. is preferably used. As such a (wholly) aromatic polyester resin, (wholly) aromatic polyester resins that are synthesized from monomers such as aromatic diols, aromatic carboxylic acids, and hydroxycarboxylic acids and that exhibit liquid crystallinity during melting are known. Representative examples thereof include, but are not particularly limited to, a polycondensate of ethylene terephthalate and para-hydroxybenzoic acid, a polycondensate of phenolic and phthalic acids and para-hydroxybenzoic acid, and a polycondensate of 2,6-hydroxynaphthoic acid and para-hydroxybenzoic acid. The (wholly) aromatic polyester resin can be used singly or in any combination of two or more thereof at any ratio. A wholly aromatic polyester resin having a relatively high melting point or a high thermal distortion temperature and high heat resistance or an aromatic polyester resin having a relatively low melting point or a low thermal distortion temperature and excellent fabricability can be used depending on the desired performance.

In preferable one aspect, a (wholly) aromatic polyester resin at least having 6-hydroxy-2-naphthoic acid and a derivative thereof (hereinafter, sometimes simply referred to as "monomer component A".) which is a basic structure, and having one or more monomer component(s) (hereinafter, sometimes simply referred to as "monomer component B".) selected from the group consisting of para-hydroxybenzoic acid, terephthalic acid, isophthalic acid, 6-naphthalenedicarboxylic acid, 4,4'-biphenol, bisphenol A, hydroquinone, 4,4-dihydroxybiphenol, ethylene terephthalate and derivatives thereof is exemplified. The (wholly) aromatic polyester resin forms an anisotropic molten phase in which linear chains of molecules are regularly aligned in a molten state, typically exhibits thermotropic liquid crystalline properties, and has excellent basic performance such as mechanical characteristics, electrical characteristics, high frequency characteristics, heat resistance, and hygroscopicity.

The (wholly) aromatic polyester resin of preferable one aspect, described above, may employ any constitution as long as it has the monomer component A and the monomer component B as essential units. For example, it may have two or more monomer components A, or three or more monomer components A. The (wholly) aromatic polyester resin of preferable one aspect, described above, may contain other monomer component (hereinafter, sometimes simply referred to as "monomer component C".) other than the monomer component A and the monomer component B. That is, the (wholly) aromatic polyester resin of preferable one aspect, described above, may be a binary or higher polycondensate consisting of only the monomer component A and the monomer component B, or may be a ternary or higher polycondensate consisting of the monomer component A, the monomer component B, and monomer component C. Other monomer components are other than the monomer component A and the monomer component B described above, and specific examples thereof include aromatic or aliphatic dihydroxy compounds and derivatives thereof; aromatic or aliphatic dicarboxylic acid and derivatives thereof; aromatic hydroxycarboxylic acid and derivatives thereof; aromatic diamine, aromatic hydroxyamine, or aromatic aminocarboxylic acid and derivatives thereof, but are not particularly limited thereto. Such other monomer component can be used singly or in any combination of two or more thereof at any ratio.

As used herein, the "derivatives" means those which have a modifying group such as a halogen atom (e.g., a fluorine atom, a chlorine atom, a bromine atom, and an iodine atom), an alkyl group having 1 to 5 carbon atoms (e.g., a methyl group, an ethyl group, an n-propyl group, an isopropyl group, an n-butyl group, an isobutyl group, an s-butyl group, and a t-butyl group), an aryl group such as a phenyl group, a hydroxyl group, an alkoxy group having 1 to 5 carbon atoms (e.g., a methoxy group and an ethoxy group), a carbonyl group, —O—, —S—, and —$CH_2$— introduced in a part of the monomer components described above (hereinafter, also referred to as "monomer component having a substituent"). Here, the "derivatives" may be acylated products, ester derivatives, or ester forming monomers such as acid halides, of the monomer components A and B, which may have a modifying group described above.

Examples of particularly preferable one aspect include a binary polycondensate of para-hydroxybenzoic acid and derivatives thereof, and 6-hydroxy-2-naphthoic acid and derivatives thereof; a ternary or higher polycondensate of para-hydroxybenzoic acid and derivatives thereof, 6-hydroxy-2-naphthoic acid and derivatives thereof, and the monomer component C; a ternary or higher polycondensate of para-hydroxybenzoic acid and derivatives thereof, 6-hydroxy-2-naphthoic acid and derivatives thereof, and at least one selected from the group consisting of terephthalic acid, isophthalic acid, 6-naphthalenedicarboxylic acid, 4,4'-biphenol, bisphenol A, hydroquinone, 4,4-dihydroxybiphenol, ethylene terephthalate, and derivatives thereof; a quaternary or higher polycondensate of para-hydroxybenzoic acid and derivatives thereof, 6-hydroxy-2-naphthoic acid and derivatives thereof, at least one selected from the group consisting of terephthalic acid, isophthalic acid, 6-naphthalenedicarboxylic acid, 4,4'-biphenol, bisphenol A, hydroquinone, 4,4-dihydroxybiphenol, ethylene terephthalate, and derivatives thereof, and one or more monomer components C. These can be obtained as having a relatively low melting point as compared with, for example, a homopolymer of para-hydroxybenzoic acid, and thus, the thermoplastic liquid crystal polymer using these polymers has excellent fabricability in the thermocompression bonding to an adherend.

From the viewpoint of reducing the melting point of the (wholly) aromatic polyester resin, increasing the fabricability of the LCP extruded film for stretch treatment or a stretched product thereof in the thermocompression bonding to an adherend, obtaining high peel strength when the LCP extruded film for stretch treatment or a stretched product thereof is thermocompression bonded to a metal foil, or the like, the content in terms of molar ratio of the monomer component A to the (wholly) aromatic polyester resin is preferably 10 mol % or more and 90 mol % or less, more preferably 30 mol % or more and 85 mol % or less, and further preferably 50 mol % or more and 80 mol % or less. Similarly, the content in terms of molar ratio of the monomer component B to the (wholly) aromatic polyester resin is preferably 10 mol % or more and 90 mol % or less, more preferably 15 mol % or more and 70 mol % or less, and further preferably 20 mol % or more and 50 mol % or less. The content of the monomer component C that may be contained in the (wholly) aromatic polyester resin is preferably 10 mol % or less, more preferably 8 mol % or less, further preferably 5 mol % or less, and particularly preferably 3 mol % or less in terms of molar ratio.

A known method may be applied to the synthetic method of the (wholly) aromatic polyester resin without particular limitation. A known polycondensation method to form ester bonds by the monomer components described above, such as melt polymerization, a melt acidolysis method, and a slurry polymerization method can be applied. When these polymerization methods are applied, an acylation or acetylation step may be performed in accordance with a conventional method.

The LCP extruded film for stretch treatment may further contain an inorganic filler. The LCP extruded film for stretch treatment, which contains an inorganic filler, thus can be realized to have a reduced coefficient of linear thermal expansion, and specifically, the LCP extruded film for stretch treatment, which is reduced in anisotropy of the coefficients of linear thermal expansion in the MD direction, the TD direction and the ZD direction (Z-axis Direction; film thickness direction), is easily obtained. Such an LCP extruded film for stretch treatment is particularly useful for, for example, rigid substrate applications in which multilayer laminates are required.

As the inorganic filler, those known in the art may be used, and the type thereof is not particularly limited. Examples include kaolin, fired kaolin, fired clay, unfired clay, silica (e.g., natural silica, fused silica, amorphous silica, hollow silica, wet silica, synthetic silica, and aerosil), aluminum compounds (e.g., boehmite, aluminum hydroxide, alumina, hydrotalcite, aluminum borate, and aluminum nitride), magnesium compounds (e.g., magnesium aluminometasilicate, magnesium carbonate, magnesium oxide, and magnesium hydroxide), calcium compounds (e.g., calcium carbonate, calcium hydroxide, calcium sulfate, calcium sulfite, and calcium borate), molybdenum compounds (e.g., molybdenum oxide and zinc molybdate), talc (e.g., natural talc and fired talc), mica, titanium oxide, zinc oxide, zirconium oxide, barium sulfate, zinc borate, barium metaborate, sodium borate, boron nitride, aggregated boron nitride, silicon nitride, carbon nitride, strontium titanate, barium titanate, and stannate such as zinc stannate, but are not particularly limited thereto. The inorganic filler can be used singly or in combinations of two or more thereof. Among these, silica is preferable from the viewpoint of dielectric characteristics and the like.

The inorganic filler here used may be one subjected to surface treatment known in the art. The surface treatment can allow for enhancements in moisture resistance, adhesion strength, dispersibility, and the like. Examples of the surface treatment agent include a silane coupling agent, a titanate coupling agent, sulfonate, carboxylate, and phosphate, but are not particularly limited thereto.

The median diameter (d50) of the inorganic filler can be appropriately set depending on the desired performance, and is not particularly limited. The d50 of the inorganic filler is preferably 0.01 μm or more and 50 μm or less, more preferably 0.03 μm or more and 50 μm or less, and further preferably 0.1 μm or more and 50 μm or less from the viewpoint of kneading ability and handleability in preparation, and the effect of reducing the coefficients of linear thermal expansion. As used herein, the median diameter (d50) of the inorganic filler refers to a value measured on a volume basis with a laser diffraction/scattering particle size distribution measurement apparatus (LA-500 manufactured by Horiba Ltd.) by a laser diffraction/scattering method.

The content of the inorganic filler can be appropriately set depending on the desired performance in consideration of the blending balance with other essential component and optional component, and is not particularly limited. The content of the inorganic filler in terms of solid content based on the total amount of the LCP extruded film for stretch treatment is preferably 1% by mass or more and 45% by mass or less in total, more preferably 3% by mass or more and 40% by mass or less in total, and further preferably 5% by mass or more and 35% by mass or less in total, from the viewpoint of kneading ability and handleability in preparation, and the effect of reducing the coefficient of linear thermal expansion.

The LCP extruded film for stretch treatment may contain a resin component other than the thermoplastic liquid crystal polymer described above (hereinafter, sometimes simply referred to as "other resin component".), for example, a thermosetting resin and/or a thermoplastic resin, within a range not excessively impairing the effects of the present invention. The LCP extruded film for stretch treatment may contain additives known in the art, for example, release improving agents such as higher fatty acids having 10 to 25 carbon atoms, higher fatty acid esters, higher fatty acid amide, higher fatty acid metal salts, polysiloxane, and fluorine resins; colorants such as dyes and pigments; organic fillers; antioxidants; thermal stabilizers; light stabilizers; ultraviolet absorbers; flame retardants; antistatic agents; surfactants; anticorrosives; defoaming agents; and fluorescent agents, within a range not excessively impairing the effects of the present invention. These additives can be used each one alone or in combination of two or more. These additives can be contained in a molten resin composition prepared during formation of the LCP extruded film for stretch treatment. The contents of such resin component and additive are not particularly limited, but are preferably each 0.01 to 10% by mass, more preferably each 0.1 to 7% by mass, and further preferably each 0.5 to 5% by mass based on a total amount of the LCP extruded film for stretch treatment, from the viewpoint of fabricability, thermal stability, and the like.

The LCP extruded film for stretch treatment of the present embodiment has predetermined tensile characteristics, and thus has favorable stretch suitability in at least the TD direction and can be uniformly stretched in stretch treatment, unlike a conventional technique. Specifically, in the LCP extruded film for stretch treatment of the present embodiment, the yield point strength X (MPa) and the fracture point strength Y (MPa) in the TD direction of the LCP extruded film for stretch treatment, in a stress-strain curve measured in a thermostatic tensile test (according to JIS K7161-1: 2014, 200° C., tensile speed 200 ram/min), satisfy the following expression (I):

$$0.75 \leq \text{fracture point strength } Y/\text{yield point strength } X \leq 1.50 \qquad (\text{I}).$$

The tensile test here performed according to JIS K7161-1:2014 is a test in which a test piece is pulled along with a main axis at a certain speed (at a certain speed in a direction perpendicular to a cross section of the test piece) until breakage of the test piece and the force and elongation applied to the test piece are measured. The yield point strength X (MPa) refers to the highest point in a yield region of a stress-strain curve obtained by the above tensile test, and as the value thereof is higher, a stronger force for distorting a material is needed. The fracture point strength Y (MPa) refers to a stress immediately before breakage of the test piece in the above tensile test, and as the value thereof is higher, a stronger force for distorting a material is needed. In this regard, the fracture point strength Y/yield point strength X refers to the strength ratio between the fracture point strength Y and the yield point strength X in the stress-strain curve obtained by the tensile test. FIG. 14 and FIG. 15 are each a graph representing one example of a stress-strain curve in the TD direction of the LCP extruded film for stretch treatment of the present invention, in which $0.75 \leq Y/X \leq 1.50$ is satisfied. FIG. 16 is a graph representing one example of a stress-strain curve in a TD direction of an LCP extruded film for stretch treatment of a conventional technique, in which Y/X<0.75 is satisfied. As understood from comparison among FIG. 14 to FIG. 16, the LCP extruded film for stretch treatment of the present invention is relatively high in strength ratio of fracture point strength Y/yield point strength X as compared with a conventional technique, and thus has uniform stretch ability under a certain load. The amount of displacement (horizontal axis) from the yield point strength X to the fracture point strength Y correlates to the stretch ratio, and a large amount of the displacement indicates that a high stretch ratio can be applied. In other words, it is understood that the LCP extruded film for stretch treatment of the present embodiment, which satisfies the above expression (I), can be relatively uniformly stretched and can allow for application of a relatively high stretch ratio unlike a conventional technique.

The value of fracture point strength Y/yield point strength X in the TD direction is not particularly limited, but is preferably 0.80 or more and 1.50 or less, more preferably 0.85 or more and 1.50 or less, further preferably 0.90 or more and 1.35 or less, and particularly preferably 0.90 or more and 1.20 or less. As the value is larger, the uniform stretch ability in the TD direction tends to be increased. As used herein, the value of fracture point strength Y/yield point strength X refers to an average value in the tensile test performed five times under conditions described in Examples below, from the viewpoint of retention of the measurement accuracy.

The value of fracture point strength Y/yield point strength X in the MD direction is not particularly limited. When the uniform stretch ability in the MD direction is demanded, the value of fracture point strength Y/yield point strength X in the MD direction is preferably 0.75 or more and 1.50 or less, more preferably 0.80 or more and 1.50 or less, further preferably 0.85 or more and 1.50 or less, and particularly preferably 0.90 or more and 1.50 or less. As the value is larger, the uniform stretch ability in the MD direction tends to be increased.

The LCP extruded film for stretch treatment, here used, is preferably a melt-extruded film such as a T-die extruded film. The LCP extruded film for stretch treatment, here used, is also preferably a thermoplastic liquid crystal polymer layer which is an intermediate layer (core layer) of a three layer co-extruded film having a laminated structure in which a thermoplastic resin layer, a thermoplastic liquid crystal polymer layer, and a thermoplastic resin layer are at least arranged in the listed order. In this case, the thermoplastic resin layers as both outer layers of the three layer co-extruded film can be removed to thereby allow the resultant to be used as a thermoplastic liquid crystal polymer film (LCP extruded film for stretch treatment) of a single layer. An extruded film of a thermoplastic liquid crystal polymer can be produced which is low in cost and homogeneous as compared with woven fabrics and non-woven fabrics made of thermoplastic liquid crystal polymer fibers.

The thickness of the LCP extruded film for stretch treatment can be appropriately set depending on the desired performance and is not particularly limited. Considering the handleability and the productivity during extrusion and the like, the thickness is preferably 15 μm or more and 300 μm or less, more preferably 18 μm or more and 250 μm or less, and further preferably 20 μm or more and 200 μm or less.

On the other hand, the LCP extruded film for stretch treatment of the present embodiment is preferably sufficiently reduced in molecular orientation of the thermoplastic liquid crystal polymer, represented by the coefficients of linear thermal expansion in the MD direction and the TD direction. As described above, each of the LCP extruded films as the conventional techniques described in Patent Literatures 1 and 2 has been slightly relaxed in molecular orientation of the thermoplastic liquid crystal polymer due to protection by the thermoplastic resin layers of both outer layers in three layer co-extrusion to result in relaxation of anisotropies of the strengths in the MD direction and TD direction of the resulting thermoplastic liquid crystal polymer film. However, in fact, the LCP extruded films described in Patent Literature 1 and 2, while have stably achieved a coefficient of linear thermal expansion in the MD direction, of about −20 ppm/K, each have exhibited a coefficient of linear thermal expansion in the TD direction, of more than 55 ppm, sometimes have reached about 100 ppm/K. As clear from this, it is easily understood that the molecular orientation of the thermoplastic liquid crystal polymer still largely remains or the internal strain and the like largely remain in each of the entire films of the LCP extruded films as conventional techniques described in Patent Literatures 1 and 2.

The coefficients of linear thermal expansion in the MD direction and the TD direction (CTE, $\alpha 2$, 23 to 200° C.) in the LCP extruded film for stretch treatment of the present embodiment are each within a range from −30 to 55 ppm/K. The LCP extruded film for stretch treatment, in which the coefficients of linear thermal expansion are each within such a range, is reduced in internal strain and the like, and can be an LCP extruded film for stretch treatment, which is small in anisotropy of the dimensional rate of change and sufficiently small in absolute value of the dimensional rate of change as compared with those in which the coefficients are not each within such a range. The coefficient of linear thermal expansion (CTE, $\alpha 2$, 23 to 200° C.) in the MD direction of the LCP extruded film for stretch treatment is preferably within a range from −30 to 10 ppm/K, more preferably within a range from −25 to 5 ppm/K, and further preferably within a range from −20 to 0 ppm/K, from the viewpoint of increasing adhesiveness to metal foil, or the like. The coefficient of linear thermal expansion (CTE, $\alpha 2$, 23 to 200° C.) in the TD direction of the LCP extruded film for stretch treatment is preferably within a range from 0 to 55 ppm/K, more preferably within a range from 5 to 55 ppm/K, and further preferably within a range from 5 to 50 ppm/K, from the viewpoint of increasing adhesiveness to metal foil, or the like. As used herein, the coefficient of linear thermal expansion (CTE, $\alpha 2$, 23 to 200° C.) refers to a value at a temperature interval of 23 to 200° C., as measured by a TMA method according to JIS K7197. Other detailed measurement conditions are in accordance with the conditions described in the Examples below.

The dielectric characteristics of the LCP extruded film for stretch treatment of the present embodiment can be appropriately set depending on the desired performance and are not particularly limited. From the viewpoint of obtaining higher dielectric characteristics, the relative dielectric constant $\varepsilon_r$ (36 GHz) is preferably 3.0 or more and 3.7 or less, and more preferably 3.0 to 3.5. Similarly, the dielectric loss tangent tan $\delta$ (36 GHz) is preferably 0.0010 or more and 0.0050 or less, and more preferably 0.0010 or more and 0.0045 or less. As used herein, the relative dielectric constant $\varepsilon_r$ (36 GHz) and the dielectric loss tangent tan $\delta$ (36 GHz) refer to respective values at 36 GHz as measured by a cavity resonator perturbation method according to JIS K6471. Other detailed measurement conditions are in accordance with the conditions described in the Examples below.

(Method for Manufacturing LCP Extruded Film for Stretch Treatment)

The LCP extruded film for stretch treatment of the present embodiment can be obtained by extruding a resin composition including the thermoplastic liquid crystal polymer described above and if necessary optional component(s) such as an inorganic filler and/or other resin component, in a predetermined thickness. The extrusion method here applied can be any of various known methods, and the type thereof is not particularly limited. For example, a T-die method or an inflation method; for example, a multi-manifold type co-extrusion method or a feed block type co-extrusion method; for example, a multilayer co-extrusion method such as a two layer co-extrusion method or a three layer co-extrusion method; can be arbitrarily combined and applied.

In particular, preferable one aspect provides, for example, a method for obtaining a predetermined LCP extruded film for stretch treatment by molding of the above resin composition into a film through a T-die according to an extrusion method with a T-die (hereinafter, sometimes simply referred to as "T-die extrusion method".) and then, if necessary, cooling treatment, compression bonding treatment, heating and pressurizing treatment, and/or the like, from the viewpoint of ease of control of the respective molecular orientations of the thermoplastic liquid crystal polymers in the film surface (film surface S1) and the film interior (film surface S2). Specifically, a co-extrusion method is preferable which involves preparing a resin composition A for a first surface layer comprising a thermoplastic resin, a resin composition B for an intermediate layer comprising a thermoplastic liquid crystal polymer, and a resin composition C of a second surface layer comprising a thermoplastic resin, respectively, and co-extruding them through a co-extrusion die of an extruder and thus extruding a co-extruded melt of a three layer configuration, to thereby form the LCP extruded film for stretch treatment as a thermoplastic liquid crystal polymer layer of an intermediate layer. Such co-extrusion leads to protection by the thermoplastic resin layers of both outer layers and thus relaxation of the molecular orientation of the thermoplastic liquid crystal polymer in the thermoplastic liquid crystal polymer layer as the intermediate layer. Hereinafter, preferable one aspect of the method for manufacturing the LCP extruded film for stretch treatment of the present embodiment is described in detail.

FIG. 17 to FIG. 19 illustrate preferable one aspect of the method for manufacturing the LCP extruded film for stretch treatment of the present embodiment. Here, the above resin composition B comprising the thermoplastic liquid crystal polymer described above and if necessary optional component(s) such as an inorganic filler and/or other resin component is melt-extruded into a film through a T-die of an extruder. The resin compositions A and C each comprising a thermoplastic resin are co-extruded onto both surfaces of the above film-shaped melt-extruded product, and thus a co-extruded melt (three layer laminated film) having a predetermined thickness is produced which has a first outer layer (release layer) comprising a thermoplastic resin, an intermediate layer (LCP layer) comprising a thermoplastic liquid crystal polymer, and a second outer layer (release layer) comprising a thermoplastic resin. The co-extruded melt is drawn by a drawing roller, and sent to a cooling roller and a compression bonding roller. Thereafter, the first outer layer and the second outer layer are separated from the intermediate layer, and the thermoplastic resin layers as both outer layers, and the thermoplastic liquid crystal polymer layer (LCP extruded film for stretch treatment) as the intermediate layer are each wound by a winding roller.

The resin composition B comprising the thermoplastic liquid crystal polymer may be prepared in accordance with a conventional method, and is not particularly limited. The components described above can be manufactured and processed by a known method such as kneading, melt-kneading, granulation, extrusion, and pressing or injection molding. When melt-kneading is performed, commonly used uniaxial or biaxial extruders or kneading apparatuses such as various kneaders can be used. When various components are supplied to these melt-kneading apparatuses, the liquid crystal polymer, other resin component, the inorganic filler, the additive, and the like may be dry blended in advance with a mixing apparatus such as a tumbler and a Henschel mixer. Upon melt-kneading, the cylinder set temperature of the kneading apparatus may be appropriately set without particular limitation, and is typically preferably within a range of the melting point of the liquid crystal polymer or more and 360° C. or less, and more preferably the melting point of the liquid crystal polymer +10° C. or more and 360° C. or less.

The preparation of the resin compositions A and C each comprising the thermoplastic resin may also be performed in accordance with a conventional method, and is not particularly limited. Examples of the thermoplastic resin include polyolefin-based resins such as polyethylene, polypropylene, polymethylpentene and ethylene-$\alpha$-olefin copolymers, acrylic resins such as PMMA, polyamide resins, acrylonitrile-butadiene-styrene copolymers (ABS resin), polystyrene (PS), polyvinyl chloride, polybutylene terephthalate (PBT), polyethylene terephthalate (PET), polycarbonate (PC), polyether ether ketone (PEEK), and polyphenyl sulfide (PPS), but are not particularly limited thereto. Even either a polar resin such as polycarbonate or a non-polar resin such as polymethylpentene can effectively serve as a release layer, when formed into a co-extruded melt. The thermoplastic resin may be blended with other resin component and an optional component such as an inorganic filler which are optionally contained in the LCP extruded film for stretch treatment. The resin composition A and the resin composition C may be the same or different in terms of the resin composition ratio, and may contain the same or different thermoplastic resins. The resin compositions A and C each comprising the thermoplastic resin can be manufactured and processed by a known method such as kneading, melt-kneading, granulation, extrusion, and pressing or injection molding. When melt-kneading is performed, uniaxial or biaxial extruders or kneading apparatuses such as various kneaders, commonly used, can be used. When various components are supplied to these melt-kneading apparatuses, the thermoplastic resin, other resin component, the inorganic filler, the additive, and the like may be dry blended by use of a mixing apparatus such as a tumbler and a Henschel mixer. Upon melt-kneading, the cylinder set temperature of the kneading apparatus may be appropriately set to a temperature equal to or less than the temperature not causing any degradation of the thermoplastic resin due to pyrolysis, is not particularly limited, and is typically preferably equal to or more than the melting point of the thermoplastic resin, more preferably the melting point of the thermoplastic resin +10° C. or more.

The set conditions of the co-extrusion may be appropriately set depending on the types and compositions of the resin compositions to be used, the desired performance of the intended extruded film, and the like, and are not particularly limited. For example, the set temperature of the cylinder of the extruder may be appropriately set depending on the types and compositions of the resin compositions to be used, the desired performance of the intended extruded film, and the like, is not particularly limited, and is preferably 230 to 360° C., and more preferably 280 to 350° C.

For example, the die width (mm) of the T-die may also be appropriately set depending on the types and compositions of the resin compositions to be used, the desired performance of the intended extruded film, and the like, is not particularly limited, and is typically preferably 200 to 2000 mm, and more preferably 400 to 1500 mm.

For example, the lip opening (mm) of the T-die may also be appropriately set depending on the types and compositions of the resin compositions to be used, the desired performance of the intended extruded film, and the like, is not particularly limited, and is typically preferably 0.1 to 3.0 (mm), and more preferably 0.2 to 2.0 (mm).

For example, the shear rate ($sec^{-1}$) on the lip wall of the T-die may also be appropriately set depending on the types and compositions of the resin compositions to be used, the desired performance of the intended extruded film, and the like, is not particularly limited, and is typically preferably 100 to 1500 ($sec^{-1}$), and more preferably 150 to 1000 ($sec^{-1}$).

The total amount of ejection ($mm^3$/sec) of the resin compositions through the T-die may also be appropriately set depending on the types and compositions of the resin compositions to be used, the desired performance of the intended extruded film, and the like, is not particularly limited, and is typically preferably 500 to 15000 ($mm^3$/sec), and more preferably 1500 to 10000 ($mm^3$/sec).

The melt viscosity (Pa·sec) of the thermoplastic liquid crystal polymer may also be appropriately set depending on the types and compositions of the resin compositions to be used, the desired performance of the intended extruded film, and the like, is not particularly limited, and is typically preferably 10 to 300 (Pa·sec), and more preferably 20 to 250 (Pa·sec). The melt viscosity (Pa·sec) of the thermoplastic liquid crystal polymer refers to a value measured with Capilograph 1D (manufactured by Toyo Seiki Seisaku-sho, Ltd.) according to JIS K7199, under conditions of a cylinder length of mm, a cylinder diameter of 1.00 mm, and a barrel diameter of 9.55 mm and under the manufacturing conditions of the LCP extruded film for stretch treatment (die temperature, and shear rate of lip wall).

The drawing speed (ram/sec) of the co-extruded film may also be appropriately set depending on the types and compositions of the resin compositions to be used, the desired performance of the intended extruded film, and the like, is not particularly limited, and is typically preferably 15 to 1000 (ram/sec), and more preferably 20 to 500 (ram/sec).

The shear stress (kPa) during co-extrusion is desirably low from the viewpoint of reducing the molecular orientation in the MD direction of the thermoplastic liquid crystal polymer during co-extrusion. When the shear stress during co-extrusion is high, the thermoplastic liquid crystal polymer tends to be easily highly aligned in the MD direction and the internal strain tends to easily remain, and when the shear stress during co-extrusion is low, the molecular orientation of the thermoplastic liquid crystal polymer tends to be easily reduced in both the film surface and the film interior and the internal strain tends to hardly remain. The shear stress (kPa) during co-extrusion is a value represented by the product of the shear rate ($sec^{-1}$) on the lip wall and the melt viscosity (Pa·sec) of the thermoplastic liquid crystal polymer, and the shear rate is a value calculated based on the total amount of ejection of the resin compositions during co-extrusion, the die width, and the lip opening. Accordingly, the shear stress during co-extrusion can be controlled by adjusting such each value. Specifically, the shear stress during co-extrusion is preferably 40 kPa or less, more preferably 38 kPa or less, and further preferably 36 kPa or less. The lower limit value is not particularly limited, but is preferably 5 kPa or more, and more preferably 10 kPa or more, in consideration of productivity and the like.

The drawdown ratio during co-extrusion is desirably low from the viewpoint of reducing the molecular orientation in the MD direction of the thermoplastic liquid crystal polymer during co-extrusion. When the drawdown ratio during co-extrusion is high, the thermoplastic liquid crystal polymer tends to be easily highly aligned in the MD direction and the internal strain tends to easily remain, and when the drawdown ratio during co-extrusion is low, the molecular orientation of the thermoplastic liquid crystal polymer tends to be easily reduced in both the film surface and the film interior and the internal strain tends to hardly remain. The drawdown ratio is a value represented by the drawing speed (mm/sec)/ the flow rate (ram/sec) of the thermoplastic liquid crystal polymer, and the flow rate of the thermoplastic liquid crystal polymer is a value calculated based on the total amount of ejection of the resin compositions during co-extrusion, the die width, and the lip opening. Accordingly, the drawdown ratio during co-extrusion can be controlled by adjusting such each value. Specifically, the drawdown ratio during co-extrusion is preferably 3.5 or less, more preferably 3.3 or less, and further preferably 3.1 or less. The lower limit value is not particularly limited, but is preferably 1.0 or more, and more preferably 1.2 or more, in consideration of productivity and the like.

The thickness of the obtained LCP extruded film for stretch treatment can be appropriately set depending on the desired performance and is not particularly limited. Considering the handleability and the productivity during extrusion and the like, the thickness is preferably 15 µm or more and 300 µm or less, more preferably 18 µm or more and 250 µm or less, and further preferably 20 µm or more and 200 µm or less.

The melting point (melting temperature) of the obtained LCP extruded film for stretch treatment is not particularly limited, but the melting point (melting temperature) is preferably 200 to 400° C. from the viewpoint of the heat resistance, processability, and the like of the film, and is preferably 250 to 360° C., more preferably 260 to 355° C., further preferably 270 to 350° C., and particularly preferably 275 to 345° C. from the viewpoint of especially increasing the thermocompression bonding properties to the metal foil. As used herein, to observe a value from which the thermal history has been eliminated, the melting point of the LCP extruded film for stretch treatment refers to a melting peak temperature in differential scanning calorimetry (DSC) when the extruded film is heated at a temperature interval of 30 to 400° C. and at a temperature rising rate of 20° C./min with DSC8500 (manufactured by PerkinElmer Japan Co., Ltd.) (1st heating), then cooled at a temperature decreasing rate of 50° C./min (1st cooling), and then heated for the second time at a temperature rising rate of 20° C./min (2nd heating). Others are in accordance with the measurement conditions described in the Examples below.

The LCP extruded film for stretch treatment, which is extruded, can be used as it is, but can be, if necessary, subjected to a pressurizing and heating step to result in further reduction in molecular properties (anisotropy) of the thermoplastic liquid crystal polymer or further relaxation of the internal strain, and therefore the LCP extruded film for stretch treatment, which is more reduced in anisotropy of the dimensional rate of change, and the LCP extruded film for stretch treatment, which is lower in absolute value of the dimensional rate of change, can also be realized.

The heating and pressurizing treatment may be performed using a method known in the art such as contact type heat treatment and non-contact type heat treatment, and the type thereof is not particularly limited. Heat setting can be carried out using a known device such as a non-contact heater, an oven, a blowing apparatus, a heat roller, a cooling roller, a heat press, or a double belt heat press. At this time, heat treatment may be performed by placing a release film or a porous film known in the art on a surface of the LCP extruded film for stretch treatment, if necessary. When this heat treatment is performed, thermocompression molding in which a release film or a porous film is placed on both surfaces of the LCP extruded film for stretch treatment, which is subjected to thermocompression bonding by sandwiching it between a pair of endless belts of a double belt press, and then the release film or the porous film is removed is preferably used, from the viewpoint of controlling the orientation.

Thermocompression molding may be performed with reference to, for example, Japanese Patent Laid-Open No. 2010-221694. The treatment temperature when the LCP extruded film for stretch treatment using the above resin composition is subjected to thermocompression molding between a pair of endless belts of a double belt press is preferably a temperature higher than the melting point of the liquid crystal polymer and not more than a temperature 70° C. higher than the melting point, more preferably not less than a temperature+5° C. higher than the melting point and not more than a temperature 60° C. higher than the melting point, and further preferably not less than a temperature+10° C. higher than the melting point and not more than a temperature 50° C. higher than the melting point, to control the crystalline state of the LCP extruded film for stretch treatment. The thermocompression bonding conditions can be appropriately set depending on the desired performance and are not particularly limited, but are preferably conditions of a surface pressure of 0.5 to 10 MPa and a heating temperature of 250 to 430° C., more preferably conditions of a surface pressure of 0.6 to 8 MPa and a heating temperature of 260 to 400° C., and further preferably conditions of a surface pressure of 0.7 to 6 MPa and a heating temperature of 270 to 370° C. On the other hand, when a non-contact heater or an oven is used, for example, thermocompression bonding is preferably performed under the conditions at 200 to 320° C. for 1 to 20 hours.

(LCP Stretched Film)

The LCP extruded film for stretch treatment can be subjected to uniaxial and/or biaxial stretch treatment and then used in the form of an LCP stretched film 100 (stretched product of the LCP extruded film for stretch treatment). The LCP stretched film 100 may be heat-shrinkable or heat-expandable in the TD direction, and is preferably heat-shrinkable in the TD direction. The LCP stretched film 100 may be heat-shrinkable or heat-expandable in the MD direction, and is preferably heat-shrinkable in the MD direction. As used herein, the heat-shrinkable LCP stretched film refers to an LCP stretched film heat-shrinkable in the TD direction and the MD direction, and such heat-shrinkability is supported by a negative value of the coefficient of linear thermal expansion (ppm/K), described below.

The set conditions of the stretch treatment may be appropriately set depending on the types and compositions of the resin compositions to be used, the desired performance of the intended LCP stretched film 100, and the like, and are not particularly limited. In the case of the uniaxial stretch, for example, the LCP extruded film for stretch treatment can be stretched by 1.3 to 2.5 times in the TD direction (Transverse Direction) at 90 to 180° C., and thereafter is preferably subjected to, for example, heat treatment (heat setting) at 100 to 240° C. for 1 to 600 seconds. The stretch ratio in the TD direction is preferably 1.4 to 2.4 times, more preferably 1.5 to 2.3 times, and further preferably 1.6 to 2.3 times. In the case of the biaxial stretch, for example, the LCP extruded film for stretch treatment can be stretched preferably by 1.3 to 2.5 times in the MD direction (Machine Direction) at 70 to 180° C. into a uniaxial stretched film and furthermore then stretched by 1.1 to 2.5 times in the TD direction (Transverse Direction) at 90 to 180° C., and thereafter the resultant is preferably subjected to, for example, heat treatment (heat setting) at 100 to 240° C. for 1 to 600 seconds. Here, not sequential stretch, but simultaneous biaxial stretch can also be adopted. The stretch ratio is not particularly limited, but is preferably 1.3 times or more, more preferably 1.4 times or more, further preferably 1.5 times or more, and particularly preferably 1.6 times or more, in terms of the total stretch ratio of MD direction×TD direction (stretch ratio represented by m×n under the assumption that the stretch ratio in the MD direction is m and the stretch ratio in the TD direction is n), from the viewpoints such as enhancing conveyance ability and release ability of the film, suppressing the variation in thickness and the occurrence of wrinkles and the like. The upper limit is not particularly limited, but is 6.0 times or less as a target, and is preferably 5.0 times or less, further preferably less than 4.0 times, and further preferably less than 3.0 times. The heat setting can be performed by a method known in the art such as contact type heat treatment and non-contact type heat treatment, and the type thereof is not particularly limited. The heat setting can be carried out using a known device such as a non-contact heater, an oven, a blowing apparatus, a heat roller, a cooling roller, a heat press, or a double belt heat press. At this time, heating and pressurizing treatment may be performed by placing a release film or a porous film known in the art on a surface of the LCP stretched film 100, if necessary.

The coefficients of linear thermal expansion in the MD direction and the TD direction (CTE, $\alpha 2$, 23 to 200° C.) of the LCP stretched film 100 (stretched product of the LCP extruded film for stretch treatment) can be appropriately set depending on the desired performance and are not particularly limited, but are each preferably within a range from −20 to 0 ppm/K, each more preferably within a range from −15 to 0 ppm/K, each further preferably within a range from −13 to 0 ppm/K, and each particularly preferably within a range from −10 to 0 ppm/K, from the viewpoint of decreasing anisotropy of the dimensional rate of change and the absolute value of the dimensional rate of change, increasing adhesiveness to the metal foil, and the like.

(Insulating Material for Circuit Substrate)

FIG. 20 is a schematic cross-sectional view of a main portion of the insulating material 200 for a circuit substrate of the present embodiment. The insulating material 200 for a circuit substrate of the present embodiment comprises a laminate having at least a woven fabric WF provided on one surface and/or both surfaces of the LCP stretched film 100 (stretched product of the LCP extruded film for stretch treatment).

Specifically, the insulating material 200 for a circuit substrate comprises a laminate having a laminated structure (three layer structure) in which the LCP stretched film 100, the woven fabric WF and the LCP stretched film 100 are at least arranged in the listed order. In the laminate, one of these LCP stretched films 100 is provided on a front surface of the woven fabric WF and other of these LCP stretched films 100 is provided on a rear surface of the woven fabric WF. These three layers are thermocompression bonded and thus a laminate of the three layer structure is formed. While the laminate of the three layer structure is here exemplified, the present invention can be, of course, realized even by a laminate of a two layer structure in which one of these LCP stretched films 100 is omitted or a laminate of a laminated structure of four or more layers, in which the LCP stretched film 100 and/or woven fabric WF are/is further laminated.

As used herein, the "woven fabric WF provided on one surface and/or both surfaces of the LCP stretched film 100" encompasses not only an aspect in which the LCP stretched film 100 is placed directly on a surface of the woven fabric WF as in the present embodiment, but also an aspect in which any layers (not shown, e.g., primer layer and/or adhesive layer) are interposed between the LCP stretched film 100 and the woven fabric WF and thus the LCP stretched film 100 is located with being apart from the woven fabric WF.

The woven fabric WF is a fabric obtained by weaving a fiber. The type of the fiber of the woven fabric WF is not particularly limited, and any of an inorganic fiber, an organic fiber, or an organic/inorganic hybrid fiber can be used. In particular, a woven fabric WF of an inorganic fiber is preferably used. The woven fabric WF of an inorganic fiber can be thermocompression bonded with the LCP stretched film 100 to thereby allow the anisotropy of the dimensional rate of change in the MD direction and the TD direction to be kept small, and allow the dimensional rate of change in each of the MD direction and the TD direction, by itself, to be decreased in a further suitable aspect. A commercial product can be used for the woven fabric WF, and the woven fabric can be manufactured by a method known in the art.

Examples of the inorganic fiber include glass fibers such as E-glass, D-glass, L-glass, M-glass, S-glass, T-glass, Q-glass, UN-glass, NE-glass, and spherical glass, inorganic fibers other than glass, such as quartz, and ceramic fibers such as silica, but are not particularly limited thereto. The woven fabric WF of the inorganic fiber is suitably a woven fabric subjected to opening treatment or packing treatment, from the viewpoint of dimensional stability. Among these, a glass cloth is preferable from the viewpoint of mechanical strength, dimensional stability, water absorbability, and the like. A glass cloth subjected to opening treatment or packing treatment is preferable from the viewpoint of increasing the thermocompression bonding properties of the LCP stretched film 100. A glass cloth subjected to surface treatment with a silane coupling agent or the like, for example, epoxy silane treatment or amino silane treatment can also be suitably used. The woven fabric WF can be used singly or in appropriate combinations of two or more kinds thereof.

The thickness of the woven fabric WF can be appropriately set depending on the desired performance, and is not particularly limited. The thickness is preferably 10 to 300 μm, more preferably 10 to 200 μm, and further preferably 15 to 180 μm from the viewpoint of lamination ability, processability, mechanical strength, and the like.

The total thickness of the insulating material for a circuit substrate 200 can be appropriately set depending on the desired performance, and is not particularly limited. The total thickness is preferably 30 to 500 μm, more preferably 50 to 400 μm, further preferably 70 to 300 μm, and particularly preferably 90 to 250 μm from the viewpoint of lamination ability, processability, mechanical strength, and the like.

The insulating material 200 for a circuit substrate of the present embodiment, in which the above configuration is adopted, thus has a significant effect in that the anisotropy of the dimensional rate of change in the MD direction and the TD direction is small and, in a further suitable aspect, the dimensional rate of change in each of the MD direction and the TD direction, by itself, can be decreased and furthermore the material is excellent in dielectric characteristics in a high frequency area, is easily manufactured and is excellent in productivity.

The insulating material 200 for a circuit substrate can be manufactured by appropriate application of a known production method, and the manufacturing method thereof is not particularly limited. As one example, the insulating material 200 for a circuit substrate can be obtained by laminating the LCP stretched film 100 and the woven fabric WF, and heating and pressurizing the resultant, to thereby thermocompression bond the LCP stretched film 100 and the woven fabric WF. A method is also preferable in which the LCP stretched film 100, the woven fabric WF and the LCP stretched film 100 are stacked in the listed order into a laminate and this laminate is heated and pressurized and subjected to thermocompression molding with being sandwiched by use of a press, a double belt press or the like to thereby provide the insulating material 200 for a circuit substrate. The processing temperature during thermocompression bonding can be appropriately set depending on the desired performance and is not particularly limited, but is preferably 200 to 400° C., more preferably 250 to 360° C., and further preferably 270 to 350° C. The processing temperature during thermocompression bonding is a value measured with the surface temperature of the LCP stretched film 100 of the laminate described above. The pressurizing conditions here can be appropriately set depending on the desired performance and are not particularly limited, but are, for example, conditions of a surface pressure of 0.5 to MPa and 1 to 240 minutes, more preferably conditions of a surface pressure of 0.8 to 8 MPa and 1 to 120 minutes.

(Metal Foil-Clad Laminate)

FIG. 21 is a schematic cross-sectional view of a main portion of the metal foil-clad laminate 300 of the present embodiment. The metal foil-clad laminate 300 of the present embodiment comprises the LCP stretched film 100 and a metal foil MF provided on one surface and/or both surfaces of the LCP stretched film 100.

Specifically, the metal foil-clad laminate 300 is a double-sided metal foil-clad laminate having a laminated structure (three layer structure) in which the metal foil MF, the LCP stretched film 100, and the metal foil MF are at least arranged in the listed order. These three layers are thermocompression bonded and thus a laminate of the three layer structure is formed. While the double-sided metal foil-clad laminate is shown in the present embodiment, the present invention can also be realized as an aspect in which the metal foil MF is provided on only one surface of the LCP stretched film 100. In other words, while the laminate of the three layer structure is here exemplified, the present invention can be, of course, realized even by a laminate of a two layer structure in which one of these metal foils MF is omitted or a laminate of a laminated structure of four or more layers, in which the LCP stretched film 100 and/or the woven fabric WF are/is further laminated.

FIG. 22 is a schematic cross-sectional view of a main portion of the metal foil-clad laminate 400 of the present embodiment. The metal foil-clad laminate 400 of the present embodiment comprises a laminate having at least the LCP stretched film 100 and the woven fabric WF provided on one surface and/or both surfaces of the LCP stretched film 100, and a metal foil MF provided on one surface and/or both surfaces of the laminate.

Specifically, the metal foil-clad laminate 400 is a double-sided metal foil-clad laminate having a laminated structure (five layer structure) in which the metal foil MF, the LCP stretched film 100, the woven fabric WF, the LCP stretched film 100, and the metal foil MF are at least arranged in the listed order. These five layers are thermocompression bonded and thus a laminate of the five layer structure is formed. While the double-sided metal foil-clad laminate is shown in the present embodiment, the present invention can also be realized as an aspect in which the metal foil MF is provided on only one surface. In other words, while the laminate of the five layer structure is here exemplified, the present invention can be, of course, realized even by a laminate of a four layer structure in which one of these metal foils MF is omitted or a laminate of a laminated structure of six or more layers, in which the LCP stretched film 100, the insulating material 200 for a circuit substrate, and/or the woven fabric WF are/is further laminated.

Examples of the material of the metal foil MF include, but are not particularly limited to, gold, silver, copper, copper alloy, nickel, nickel alloy, aluminum, aluminum alloy, iron, and iron alloy. Among these, a copper foil, an aluminum foil, a stainless steel foil, and an alloy foil of copper and aluminum are preferred, and a copper foil is more preferred. As such a copper foil, any one manufactured by a rolling method, an electrolysis method, or the like may be used, and electrolytic copper foil and rolled copper foil which have a relatively high surface roughness are preferred.

The thickness of the metal foils MF may be appropriately set in accordance with the desired performance, and is not particularly limited. Typically, the thickness is preferably 1.5 to 1,000 μm, more preferably 2 to 500 μm, further preferably 5 to 150 μm, and particularly preferably 7 to 100 μm. As long as the function and effect of the present invention are not impaired, the metal foils MF may be subjected to surface treatment such as chemical surface treatment such as acid washing. The types and the thicknesses of the metal foils MF may be the same as or different from each other.

The method for providing the metal foil MF on surfaces of the LCP stretched film 100 or the insulating material 200 for a circuit substrate can be performed in accordance with a conventional method, and is not particularly limited. The method may be any one of methods in which the metal foil MF is laminated on the LCP stretched film 100 or the insulating material 200 for a circuit substrate and then both layers are adhered or pressure bonded, physical methods (dry method) such as sputtering and vapor deposition, chemical methods (wet method) such as electroless plating and electrolytic plating after electroless plating, and methods for applying a metal paste. The metal foil-clad laminates 300 and 400 can also be each obtained by heat pressing a laminate in which the LCP stretched film 100 or the insulating material 200 for a circuit substrate and one or more metal foils MF are laminated, with, for example, a multi-stage press, a multi-stage vacuum press, a continuous molding machine, or an autoclave molding machine.

The metal foil-clad laminates 300 and 400 can be manufactured by appropriate application of a known production method, and the manufacturing method thereof is not particularly limited. As one example, a method is exemplified in which the LCP stretched film 100, the insulating material 200 for a circuit substrate and the metal foil MF are stacked into a laminate in which the metal foil MF is placed on the LCP stretched film 100 and this laminate is subjected to thermocompression molding with being sandwiched between a pair of endless belts of a double belt press. As described above, the LCP stretched film 100 to be used in the present embodiment is small in anisotropy of the dimensional rate of change in the MD direction and the TD direction and, in a further suitable aspect, the dimensional rate of change in each of the MD direction and the TD direction, by itself, is small and thus high peel strength to the metal foil MF is obtained.

The temperature during thermocompression bonding of the metal foil MF can be appropriately set depending on the desired performance and is not particularly limited, but is preferably not less than a temperature 50° C. lower than the melting point of the liquid crystal polymer and not more than a temperature 50° C. higher than the melting point, more preferably not less than a temperature 40° C. lower than the melting point and not more than a temperature 40° C. higher than the melting point, further preferably not less than a temperature 30° C. lower than the melting point and not more than a temperature 30° C. higher than the melting point, and particularly preferably not less than a temperature 20° C. lower than the melting point and not more than a temperature 20° C. higher than the melting point. The temperature during thermocompression bonding of the metal foil MF is a value measured with the surface temperature of the LCP stretched film 100 described above. The compression bonding conditions at this time can be appropriately set depending on the desired performance, but are not particularly limited. For example, when a double belt press is used, the compression bonding is preferably performed under the conditions of a surface pressure of 0.5 to 10 MPa and a heating temperature of 200 to 360° C.

The metal foil-clad laminates 300 and 400 of the present embodiment may each have another laminated structure or a further laminated structure, as long as including a thermocompression bonded body of a two layer structure of the LCP stretched film 100 and the metal foil MF. The laminated structure may be a multilayer structure, for example, a two layer structure such as metal foil MF/LCP stretched film 100; a three layer structure such as metal foil MF/LCP stretched film 100/metal foil MF or LCP stretched film 100/metal foil MF/LCP stretched film 100; a four layer structure such as metal foil MF/LCP stretched film 100/ woven fabric WF/LCP stretched film 100; or a five layer structure such as metal foil MF/LCP stretched film 100/metal foil MF/LCP stretched film 100/metal foil MF, or metal foil MF/LCP stretched film 100/woven fabric WF/LCP stretched film 100/metal foil MF. Also, a plurality of metal foil-clad laminates 300 and 400 (e.g., each 2 to 50 laminates) can be laminated and thermocompression bonded.

In each of the metal foil-clad laminates 300 and 400 of the present embodiment, the peel strength between the LCP stretched film 100 and the metal foil MF is not particularly limited, but is preferably 0.8 (N/mm) or more, more preferably 1.0 (N/mm) or more, and further preferably 1.2 (N/mm) or more, from the viewpoint of providing further higher peel strength. As described above, since the metal foil-clad laminates 300 and 400 of the present embodiment can each realize high peel strength, for example, peeling between the LCP stretched film 100 and the metal foil MF can be suppressed in the heating step during manufacture of a substrate. In addition, since manufacturing conditions for excellent process tolerance and productivity can be applied to obtain the same peel strength as the conventional technique, the deterioration of the basic performance possessed by the liquid crystal polymer can be suppressed, while the same degree of peel strength as the conventional metal foil-clad laminate is maintained.

The metal foil-clad laminates 300 and 400 of the present embodiment can be each used as a raw material for circuit substrates such as electronic circuit substrates or multilayer substrates, by performing pattern etching on at least a part of the metal foil MF. The metal foil-clad laminates 300 and 400 of the present embodiment, since having excellent dielectric characteristics in a high frequency area and being small in anisotropy of the dimensional rate of change in the MD direction and the TD direction, and, in a further suitable aspect, being small in dimensional rate of change in each of the MD direction and the TD direction, by itself, having excellent dimensional stability, being easily manufactured and having excellent productivity, are especially useful raw materials as insulating materials for flexible printed wiring boards (FPC) and the like in the fifth-generation mobile communication system (5G), millimeter wave radar, and the like.

EXAMPLES

The feature of the present invention will be further described in detail below by way of Examples and Comparative Examples, but the present invention is not limited thereto in any way. That is, the materials, amounts used, proportions, contents of treatment, treatment procedures, and the like presented in the following Examples can be appropriately modified without departing from the gist of the present invention. The values of various manufacturing conditions and evaluation results in the following Examples have a meaning as a preferred upper limit value or a preferred lower limit value in the embodiment of the present invention, and the preferred numerical value range may be a range defined by a combination of the upper limit value or the lower limit value and the values of the following Examples or a combination of values in Examples.

[Melt Viscosity]

The melt viscosity [Pa·sec] of each LCP extruded film was measured under the following conditions.
  Measurement device: Capilograph 1D (manufactured by Toyo Seiki Seisaku-sho, Ltd.)
  Apparatus used: cylinder length 10.00 mm, cylinder diameter 1.00 mm, barrel diameter 9.55 mm
  Measurement conditions: temperature [ ° C.] and shear rate [$sec^{-1}$] in extrusion of each LCP extruded film

[Degree of Orientation]

Each LCP extruded film comprising the film surface S1 or the film surface S2 was subjected to X-ray diffraction measurement with an X-ray diffraction apparatus Smartlab (manufactured by Rigaku Corporation) by a transmission method, and the degree of orientation was thus measured. Here, X-ray diffraction measurement (2θ/θ scan, β scan) was performed with a Cu sealed tube as an X-ray source in a parallel beam optical system by a transmission method, and it was first confirmed by 2θ/θ scan that a peak top was present at 2θ=19.5°. Next, the intensity of a diffraction peak at 2θ=19.5 was measured at 0° to 360° in the bearing angle direction by β scan, and thus an intensity distribution in the bearing angle direction was obtained. The degree of orientation was calculated from the above expression based on the orientation peak area ratio from the base intensity (isotropic component) and the peak intensity (orientation) of the resulting β profile.

The film surface S2 of each LCP extruded film was here adjusted by immersing each LCP extruded film in an aqueous 70% monoethylamine solution (manufactured by Daicel Corporation) under the environment at 23° C. and 50% RH for 168 hours, etching both surfaces of each LCP extruded film, by 5 μm, thereafter washing them with flowing water for 5 minutes and furthermore distilled water, and subjecting the resultant to drying at 80° C. for 1 hour and cooling 24 hours under the environment at 23° C. and 50% RH.

[Hardness Measurement According to Nanoindentation Method]

The hardness H1 at a point of a depth of 1 μm and the hardness H2 at the thickness center point, of each LCP extruded film, were measured by a nanoindentation method according to ISO 14577.
  Measurement device: nanoindenter Hysitron TI 950 TriboIndenter (manufactured by Bruker)
  Indenter used: diamond Berkovich indenter
  Measurement conditions: indentation depth hmax 0.05 μm
  Measurement method: loading-unloading test The measurement surface of each LCP extruded film was defined as a film smooth cross section in parallel with the MD direction of each of the LCP extruded films, and such a film smooth cross section was produced by cutting and processing each LCP extruded film by ion beam processing under freezing conditions.

[Coefficient of Linear Thermal Expansion]

The coefficients of linear thermal expansion of each LCP extruded film and each LCP stretched film were measured by a TMA method according to JIS K7197.
  Measurement device: TMA 4000SE (manufactured by NETZSCH Japan K.K.)
  Measurement method: tension mode
  Measurement conditions: sample size 25 mm×4 mm×thickness: 50 μm
  distance between chucks: 20 mm
  temperature interval: 23 to 200° C. (2nd RUN)
  temperature rising rate: 5° C./min
  atmosphere: nitrogen (flow rate: 50 ml/min)
  test load: 5 gf
  To observe a value from which the thermal history has been eliminated, the value at 2nd RUN was employed

[Tape Release Test]

The film surface S1 of each LCP extruded film was subjected to an adhesiveness test by a cross-cutting method according to JIS K5600-5-6 and the presence of a skin layer therein was confirmed. Here, Cellotape® of 24 mm width× 50 mm length, manufactured by Nichiban Co., Ltd., was used, and a case of no peeling on the mesh of grid after tape release was defined as "Skin layer absent" and a case of peeling thereon was defined as "Skin layer present".

A (Good): skin layer absent
C (Bad): skin layer present

[Dimensional Rate of Change after Etching of Metal Foil, and Anisotropy Thereof]

An electrolytic copper foil (TQ-M7VSP manufactured by Mitsui Kinzoku) having a thickness of 12 µm was laminated on both surfaces of each LCP extruded film, and subjected to thermocompression bonding under a temperature condition of 320° C. at a surface pressure of 1 MPa for 1 minute, to thereby produce each double-sided metal foil-clad laminate having a three layer configuration of copper foil/LCP extruded film/copper foil. Each sample was prepared from such each double-sided metal foil-clad laminate obtained, according to JPCA-UB01(2017) and "16.4.4-18 dimensional rate of change" and "16.4.4-2-2 production of sample by removal of copper foil" of the same standard, the dimensional rate of change after etching of the copper foil of such each sample was measured with a measurement microscope (MF-A4020C manufactured by Mitutoyo Corporation), and the anisotropy of the dimensional rate of change was evaluated. Here, $\beta_1$ represents the dimensional rate of change in the MD direction and $\beta_2$ represents the dimensional rate of change in the TD direction.

S (Very good): very small anisotropy of dimensional rate of change ($|\beta_2-\beta_1|\leq 0.3\%$)
A (Good): small anisotropy of dimensional rate of change ($0.3\% < |\beta_2-\beta_1| < 0.4\%$)
C (Bad): large anisotropy of dimensional rate of change ($0.4\% \leq |\beta_2-\beta_1|$)

Examples 1A to 3A

A type II thermoplastic liquid crystal polymer (copolymer having a monomer composition of 74 mol % of p-hydroxybenzoic acid and 26 mol % of 6-hydroxy-2-naphthoic acid, and having a melt viscosity at a temperature of 300° C. and a shear rate of 500 sec$^{-1}$, of 80 Pa·sec) and polycarbonate PC (Panlite L-1225L manufactured by Teijin Limited) were used respectively in an intermediate layer and each surface layer of both surfaces of the intermediate layer, such respective resins were co-extruded at 300° C. from a two-kind three layer extruder provided with a T-die having a die width of 600 mm and a lip opening of 0.2 to 1.0 mm, according to a T-die casting method under molding conditions shown in Table 1, and thus a two-kind three layer film in which the thickness of the intermediate layer was 50 µm was formed. Polycarbonate films on both surface layers of the two-kind three layer film formed were each released by a winding line, and an LCP extruded film of each of Examples 1A to 3A, having a melting point of 280° C. and a thickness of 50 µm, was obtained.

While a glass cloth (IPC No. #1037) was sandwiched between a pair of thermoplastic liquid crystal polymer films obtained of each of Examples 1A to 3A, thermocompression bonding treatment with a heat press was performed at 300° C. for 5 minutes and thus an insulating material for a circuit substrate, having a melting point of 280° C. and a total thickness of 100 lam, of each of Examples 1A to 3A was obtained.

Comparative Example 1A

A type II thermoplastic liquid crystal polymer (copolymer having a monomer composition of 74 mol % of p-hydroxybenzoic acid and 26 mol % of 6-hydroxy-2-naphthoic acid, and having a melt viscosity at a temperature of 300° C. and a shear rate of 500 sec$^{-1}$, of 80 Pa·sec) was used, and the liquid crystal polymer was extruded at 300° C. from a single layer extruder provided with a T-die having a die width of 600 mm and a lip opening of 0.3 mm, according to a T-die casting method under molding conditions shown in Table 1, and thus an LCP extruded film of Comparative Example 1A, having a melting point of 280° C. and a thickness of 50 was obtained.

Comparative Examples 2A to 4A

An LCP extruded film of each of Comparative Examples 2A to 4A, having a melting point of 280° C. and a thickness of 50 µm, was obtained in the same manner as in Example 1A except that molding conditions were changed as described in Table 1.

TABLE 1

| | Film formation method | Intermediate layer LCP | Thermoplastic resin (release layer) of both surface layers | Film formation conditions | |
|---|---|---|---|---|---|
| | | | | Shear stress [kPa] | Drawdown ratio |
| Example 1A | Release of two-kind three layers | Type II | PC | 20 | 2.0 |
| Example 2A | Release of two-kind three layers | Type II | PC | 20 | 3.0 |
| Example 3A | Release of two-kind three layers | Type II | PC | 35 | 2.0 |
| Comparative Example 1A | Single layer | Type II | — | 45 | 3.8 |
| Comparative Example 2A | Release of two-kind three layers | Type II | PC | 50 | 6.0 |
| Comparative Example 3A | Release of two-kind three layers | Type II | PC | 20 | 6.0 |
| Comparative Example 4A | Release of two-kind three layers | Type II | PC | 50 | 2.0 |

Examples 4a to 6A

An LCP extruded film of each of Examples 4A to 6A, having a melting point of 315° C. and a thickness of 50 lam, was obtained by the same method as in Example 1A except that a type I thermoplastic liquid crystal polymer (copolymer having a monomer composition of 79 mol % of p-hydroxybenzoic acid, 20 mol % of 6-hydroxy-2-naphthoic acid and 1 mol % of terephthalic acid, and having a melt viscosity at a temperature of 330° C. and a shear rate of 500 sec$^{-1}$, of 70 Pa·sec) was used instead of the type II thermoplastic liquid crystal polymer, in an intermediate layer, and the respective resins were co-extruded at 330° C.

While a glass cloth (IPC No. #1037) was sandwiched between a pair of thermoplastic liquid crystal polymer films obtained of each of Examples 4A to 6A, thermocompression bonding treatment with a heat press was performed at 330° C. for 5 minutes and thus an insulating material for a circuit substrate, having a melting point of 315° C. and a total thickness of 100 μm, of each of Examples 4A to 6A was obtained.

Comparative Example 5A

An LCP extruded film of Comparative Example 5A, having a melting point of 315° C. and a thickness of 50 μm, was obtained by the same method as in Comparative Example LA except that a type I thermoplastic liquid crystal polymer (copolymer having a monomer composition of 79 mol % of p-hydroxybenzoic acid, 20 mol % of 6-hydroxy-2-naphthoic acid and 1 mol % of terephthalic acid, and having a melt viscosity at a temperature of 330° C. and a shear rate of 500 sec$^{-1}$, of 70 Pa·sec) was used instead of the type II thermoplastic liquid crystal polymer and the liquid crystal polymer was extruded at 330° C.

Comparative Examples 6A to 8A

An LCP extruded films of each of Comparative Examples 6A to 8A, having a melting point of 315° C. and a thickness of 50 μm, was obtained in the same manner as in Example 4A except that molding conditions were changed as described in Table 2.

Examples 7a to 9A

An LCP extruded film of each of Examples 7A to 9A, having a melting point of 280° C. and a thickness of 50 lam, was obtained by the same method as in Example 1A except that polymethylpentene PMP (TPX MX004 manufactured by Mitsui Chemicals, Inc.) was used instead of polycarbonate, in surface layers of both surfaces.

While a glass cloth (IPC No. #1037) was sandwiched between a pair of thermoplastic liquid crystal polymer films obtained of each of Examples 7A to 9A, thermocompression bonding treatment with a heat press was performed at 300° C. for 5 minutes and thus an insulating material for a circuit substrate, having a melting point of 280° C. and a total thickness of 100 lam, of each of Examples 7A to 9A was obtained.

Comparative Examples 9A to 11A

An LCP extruded film of each of Comparative Examples 9A to 11A, having a melting point of 280° C. and a thickness of 50 μm, was obtained in the same manner as in Example 7A except that molding conditions were changed as described in Table 3.

TABLE 2

| | Film formation method | Intermediate layer LCP | Thermoplastic resin (release layer) of both surface layers | Film formation conditions | |
|---|---|---|---|---|---|
| | | | | Shear stress [kPa] | Drawdown ratio |
| Example 4A | Release of two-kind three layers | Type I | PC | 20 | 2.0 |
| Example 5A | Release of two-kind three layers | Type I | PC | 20 | 3.0 |
| Example 6A | Release of two-kind three layers | Type I | PC | 35 | 2.0 |
| Comparative Example 5A | Single layer | Type I | — | 45 | 3.8 |
| Comparative Example 6A | Release of two-kind three layers | Type I | PC | 50 | 6.0 |
| Comparative Example 7A | Release of two-kind three layers | Type I | PC | 20 | 6.0 |
| Comparative Example 8A | Release of two-kind three layers | Type I | PC | 50 | 2.0 |

TABLE 3

| | Film formation method | Intermediate layer LCP | Thermoplastic resin (release layer) of both surface layers | Film formation conditions | |
|---|---|---|---|---|---|
| | | | | Shear stress [kPa] | Drawdown ratio |
| Example 7A | Release of two-kind three layers | Type II | PMP | 20 | 2.0 |
| Example 8A | Release of two-kind three layers | Type II | PMP | 20 | 3.0 |
| Example 9A | Release of two-kind three layers | Type II | PMP | 35 | 2.0 |
| Comparative Example 9A | Release of two-kind three layers | Type II | PMP | 50 | 6.0 |
| Comparative Example 10A | Release of two-kind three layers | Type II | PMP | 20 | 6.0 |
| Comparative Example 11A | Release of two-kind three layers | Type II | PMP | 50 | 2.0 |

The measurement results are shown in Tables 4 to 6.

TABLE 4

| | Degree of orientation [%] | | | Coefficient [ppm/K] of linear thermal expansion | | Presence of skin layer | Dimensional rate of change [%] after etching of copper foil | | |
|---|---|---|---|---|---|---|---|---|---|
| | $\alpha_1$ before etching treatment | $\alpha_2$ after etching treatment | $(\alpha_2 - \alpha_1)/\alpha_1 \times 100$ | MD direction | TD direction | | MD direction $\beta_1$ | TD direction $\beta_2$ | $|\beta_2 - \beta_1|$ |
| Example 1A | 35.3 | 34.9 | −1.1 | −18 | 29 | Absent | −0.1 | −0.2 | 0.1 |
| Example 2A | 36.6 | 36.1 | −1.4 | −20 | 37 | Absent | ±0 | −0.2 | 0.2 |
| Example 3A | 37.3 | 36.9 | −1.1 | −20 | 42 | Absent | ±0 | −0.2 | 0.2 |
| Comparative Example 1A | 39.9 | 38.0 | −4.8 | −20 | 61 | Present | +0.2 | −0.6 | 0.8 |
| Comparative Example 2A | 44.8 | 44.3 | −1.1 | −20 | 95 | Absent | ±0 | −0.7 | 0.7 |
| Comparative Example 3A | 41.5 | 41.0 | −1.2 | −20 | 72 | Absent | ±0 | −0.6 | 0.6 |
| Comparative Example 4A | 39.5 | 39.0 | −1.3 | −20 | 58 | Absent | ±0 | −0.5 | 0.5 |

TABLE 5

| | Degree of orientation [%] | | | Coefficient [ppm/K] of linear thermal expansion | | Presence of skin layer | Dimensional rate of change [%] after etching of copper foil | | |
|---|---|---|---|---|---|---|---|---|---|
| | $\alpha_1$ before etching treatment | $\alpha_2$ after etching treatment | $(\alpha_2 - \alpha_1)/\alpha_1 \times 100$ | MD direction | TD direction | | MD direction $\beta_1$ | TD direction $\beta_2$ | $|\beta_2 - \beta_1|$ |
| Example 4A | 35.1 | 34.8 | −0.9 | −16 | 27 | Absent | −0.1 | −0.2 | 0.1 |
| Example 5A | 35.9 | 35.5 | −1.1 | −17 | 33 | Absent | ±0 | −0.2 | 0.2 |
| Example 6A | 37.0 | 36.6 | −1.1 | −17 | 40 | Absent | ±0 | −0.2 | 0.2 |
| Comparative Example 5A | 39.7 | 37.8 | −4.8 | −18 | 59 | Present | +0.2 | −0.6 | 0.8 |
| Comparative Example 6A | 44.4 | 43.9 | −1.1 | −18 | 93 | Absent | ±0 | −0.7 | 0.7 |
| Comparative Example 7A | 39.8 | 39.3 | −1.3 | −18 | 60 | Absent | ±0 | −0.6 | 0.6 |
| Comparative Example 8A | 39.3 | 38.9 | −1.0 | −18 | 57 | Absent | ±0 | −0.5 | 0.5 |

TABLE 6

| | Degree of orientation [%] | | | Coefficient [ppm/K] of linear thermal expansion | | Presence of skin layer | Dimensional rate of change [%] after etching of copper foil | | |
|---|---|---|---|---|---|---|---|---|---|
| | $\alpha_1$ before etching treatment | $\alpha_2$ after etching treatment | $(\alpha_2 - \alpha_1)/\alpha_1 \times 100$ | MD direction | TD direction | | MD direction $\beta_1$ | TD direction $\beta_2$ | $|\beta_2 - \beta_1|$ |
| Example 7A | 35.4 | 35.0 | −1.1 | −18 | 29 | Absent | −0.1 | −0.2 | 0.1 |
| Example 8A | 36.8 | 36.3 | −1.4 | −20 | 36 | Absent | ±0 | −0.2 | 0.2 |
| Example 9A | 37.8 | 37.3 | −1.3 | −20 | 43 | Absent | ±0 | −0.2 | 0.2 |
| Comparative Example 9A | 44.9 | 44.3 | −1.3 | −20 | 96 | Absent | ±0 | −0.7 | 0.7 |
| Comparative Example 10A | 41.8 | 41.2 | −1.4 | −20 | 74 | Absent | ±0 | −0.6 | 0.6 |
| Comparative Example 11A | 39.6 | 39.2 | −1.0 | −20 | 59 | Absent | ±0 | −0.5 | 0.5 |

The relationships of film formation conditions with the degree of orientation and the coefficient of linear thermal expansion in the method for manufacturing an LCP extruded film are collectively shown in Tables 7 to 9.

TABLE 7

| | Film formation method | Center layer LCP | Thermoplastic resin (release layer) of both surface layers | Film formation conditions | | Presence of skin layer | Degree of orientation [%] | | | Coefficient [ppm/K] of linear thermal expansion | |
|---|---|---|---|---|---|---|---|---|---|---|---|
| | | | | Shear stress [kPa] | Drawdown ratio | | $\alpha_1$ before etching treatment | $\alpha_2$ after etching treatment | $(\alpha_2 - \alpha_1)/\alpha_1 \times 100$ | MD direction | TD direction |
| Example 1A | Release of two-kind three layers | Type II | PC | 20 | 2.0 | Absent | 35.3 | 34.9 | −1.1 | −18 | 29 |
| Example 2A | Release of two-kind three layers | Type II | PC | 20 | 3.0 | Absent | 36.6 | 36.1 | −1.4 | −20 | 37 |
| Example 3A | Release of two-kind three layers | Type II | PC | 35 | 2.0 | Absent | 37.3 | 36.9 | −1.1 | −20 | 42 |
| Comparative Example 1A | Single layer | Type II | — | 45 | 3.8 | Present | 39.9 | 38.0 | −4.8 | −20 | 61 |
| Comparative Example 2A | Release of two-kind three layers | Type II | PC | 50 | 6.0 | Absent | 44.8 | 44.3 | −1.1 | −20 | 95 |
| Comparative Example 3A | Release of two-kind three layers | Type II | PC | 20 | 6.0 | Absent | 41.5 | 41.0 | −1.2 | −20 | 72 |
| Comparative Example 4A | Release of two-kind three layers | Type II | PC | 50 | 2.0 | Absent | 39.5 | 39.0 | −1.3 | −20 | 58 |

TABLE 8

| | Film formation method | Center layer LCP | Thermoplastic resin (release layer) of both surface layers | Film formation conditions | | Presence of skin layer | Degree of orientation [%] | | | Coefficient [ppm/K] of linear thermal expansion | |
|---|---|---|---|---|---|---|---|---|---|---|---|
| | | | | Shear stress [kPa] | Drawdown ratio | | $\alpha_1$ before etching treatment | $\alpha_2$ after etching treatment | $(\alpha_2 - \alpha_1)/\alpha_1 \times 100$ | MD direction | TD direction |
| Example 4A | Release of two-kind three layers | Type I | PC | 20 | 2.0 | Absent | 35.1 | 34.8 | −0.9 | −16 | 27 |
| Example 5A | Release of two-kind three layers | Type I | PC | 20 | 3.0 | Absent | 35.9 | 35.5 | −1.1 | −17 | 33 |
| Example 6A | Release of two-kind three layers | Type I | PC | 35 | 2.0 | Absent | 37.0 | 36.6 | −1.1 | −17 | 40 |

TABLE 8-continued

| | Film formation method | Center layer LCP | Thermoplastic resin (release layer) of both surface layers | Film formation conditions | | Presence of skin layer | Degree of orientation [%] | | | Coefficient [ppm/K] of linear thermal expansion | |
|---|---|---|---|---|---|---|---|---|---|---|---|
| | | | | Shear stress [kPa] | Drawdown ratio | | $\alpha_1$ before etching treatment | $\alpha_2$ after etching treatment | $(\alpha_2 - \alpha_1)/\alpha_1 \times 100$ | MD direction | TD direction |
| Comparative Example 5A | Single layer | Type I | — | 45 | 3.8 | Present | 39.7 | 37.8 | −4.8 | −18 | 59 |
| Comparative Example 6A | Release of two-kind three layers | Type I | PC | 50 | 6.0 | Absent | 44.4 | 43.9 | −1.1 | −18 | 93 |
| Comparative Example 7A | Release of two-kind three layers | Type I | PC | 20 | 6.0 | Absent | 39.8 | 39.3 | −1.3 | −18 | 60 |
| Comparative Example 8A | Release of two-kind three layers | Type I | PC | 50 | 2.0 | Absent | 39.3 | 38.9 | −1.0 | −18 | 57 |

TABLE 9

| | Film formation method | Center layer LCP | Thermoplastic resin (release layer) of both surface layers | Film formation conditions | | Presence of skin layer | Degree of orientation [%] | | | Coefficient [ppm/K] of linear thermal expansion | |
|---|---|---|---|---|---|---|---|---|---|---|---|
| | | | | Shear stress [kPa] | Drawdown ratio | | $\alpha_1$ before etching treatment | $\alpha_2$ after etching treatment | $(\alpha_2 - \alpha_1)/\alpha_1 \times 100$ | MD direction | TD direction |
| Example 7A | Release of two-kind three layers | Type II | PMP | 20 | 2.0 | Absent | 35.4 | 35.0 | −1.1 | −18 | 29 |
| Example 8A | Release of two-kind three layers | Type II | PMP | 20 | 3.0 | Absent | 36.8 | 36.3 | −1.4 | −20 | 36 |
| Example 9A | Release of two-kind three layers | Type II | PMP | 35 | 2.0 | Absent | 37.8 | 37.3 | −1.3 | −20 | 43 |
| Comparative Example 9A | Release of two-kind three layers | Type II | PMP | 50 | 6.0 | Absent | 44.9 | 44.3 | −1.3 | −20 | 96 |
| Comparative Example 10A | Release of two-kind three layers | Type II | PMP | 20 | 6.0 | Absent | 41.8 | 41.2 | −1.4 | −20 | 74 |
| Comparative Example 11A | Release of two-kind three layers | Type II | PMP | 50 | 2.0 | Absent | 39.6 | 39.2 | −1.0 | −20 | 59 |

Each of the obtained LCP extruded films of Examples LA, 4A and 7A was stretched by 1.5 times (total stretch ratio: 1.5 times) in the TD direction at 130° C. with a uniaxial stretch machine, and subjected to heat setting at 130° C. for 2 minutes, and thus each LCP stretched film was obtained. The measurement results are shown in Table 10.

TABLE 10

| | LCP extruded film, Coefficient [ppm/K] of linear thermal expansion | | LCP stretched film, Coefficient [ppm/K] of linear thermal expansion | |
|---|---|---|---|---|
| | MD direction | TD direction | MD direction | TD direction |
| Example 1A | −18 | 29 | −14 | 13 |
| Example 4A | −16 | 27 | −12 | 11 |
| Example 7A | −18 | 29 | −14 | 13 |

Each of the obtained LCP extruded films of Examples LA, 4A and 7A was stretched by 2.0 times (total stretch ratio: 2.0 times) in the TD direction at 130° C. with a uniaxial stretch machine, and subjected to heat setting at 130° C. for 2 minutes, and thus each LCP stretched film was obtained. The measurement results are shown in Table 11.

TABLE 11

| | LCP extruded film, Coefficient [ppm/K] of linear thermal expansion | | LCP stretched film, Coefficient [ppm/K] of linear thermal expansion | |
|---|---|---|---|---|
| | MD direction | TD direction | MD direction | TD direction |
| Example 1A | −18 | 29 | −8 | −8 |
| Example 4A | −16 | 27 | −7 | −7 |
| Example 7A | −18 | 29 | −8 | −8 |

Examples 1B to 3B

A type II thermoplastic liquid crystal polymer (copolymer having a monomer composition of 74 mol % of p-hydroxybenzoic acid and 26 mol % of 6-hydroxy-2-naphthoic acid, and having a melt viscosity at a temperature of 300° C. and a shear rate of 500 sec$^{-1}$, of 80 Pa·sec) and polycarbonate PC (Panlite L-1225L manufactured by Teijin Limited) were used respectively in an intermediate layer and each surface layer of both surfaces of the intermediate layer, such respective resins were co-extruded at 300° C. from a two-kind three layer extruder provided with a T-die having a die width of 600 mm and a lip opening of 0.2 to 1.0 mm, according to a T-die casting method under molding conditions shown in Table 12, and thus a two-kind three layer film in which the thickness of the intermediate layer was 50 μm was formed. Polycarbonate films on both surface layers of the two-kind three layer film formed were each released by a winding line, and an LCP extruded film of each of Examples 1B to 3B, having a melting point of 280° C. and a thickness of 50 lam, was obtained.

While a glass cloth (IPC No. #1037) was sandwiched between a pair of thermoplastic liquid crystal polymer films obtained of each of Examples 1B to 3B, thermocompression bonding treatment with a heat press was performed at 300° C. for 5 minutes and thus an insulating material for a circuit substrate, having a melting point of 280° C. and a total thickness of 100 of each of Examples 1B to 3B was obtained.

Comparative Example 1B

A type II thermoplastic liquid crystal polymer (copolymer having a monomer composition of 74 mol % of p-hydroxybenzoic acid and 26 mol % of 6-hydroxy-2-naphthoic acid, and having a melt viscosity at a temperature of 300° C. and a shear rate of 500 sec$^{-1}$, of 80 Pa·sec) was used, and the liquid crystal polymer was extruded at 300° C. from a single layer extruder provided with a T-die having a die width of 600 mm and a lip opening of 0.3 mm, according to a T-die casting method under molding conditions shown in Table 12, and thus an LCP extruded film of Comparative Example 1B, having a melting point of 280° C. and a thickness of 50 was obtained.

Comparative Examples 2B to 4B

An LCP extruded film of each of Comparative Examples 2B to 4B, having a melting point of 280° C. and a thickness of 50 μm, was obtained in the same manner as in Example 1B except that molding conditions were changed as described in Table 12.

Examples 4B to 6B

An LCP extruded film of each of Examples 4B to 6B, having a melting point of 315° C. and a thickness of 50 lam, was obtained by the same method as in Example 1B except that a type I thermoplastic liquid crystal polymer (copolymer having a monomer composition of 79 mol % of p-hydroxybenzoic acid, 20 mol % of 6-hydroxy-2-naphthoic acid and 1 mol % of terephthalic acid, and having a melt viscosity at a temperature of 330° C. and a shear rate of 500 sec$^{-1}$, of 70 Pa·sec) was used instead of the type II thermoplastic liquid crystal polymer, in an intermediate layer, and the respective resins were co-extruded at 330° C.

While a glass cloth (IPC No. #1037) was sandwiched between a pair of thermoplastic liquid crystal polymer films obtained of each of Examples 4B to 6B, thermocompression bonding treatment with a heat press was performed at 330° C. for 5 minutes and thus an insulating material for a circuit substrate, having a melting point of 315° C. and a total thickness of 100 lam, of each of Examples 4B to 6B was obtained.

Comparative Example 5B

An LCP extruded film of Comparative Example 5B, having a melting point of 315° C. and a thickness of 50 μm, was obtained by the same method as in Comparative Example 1B except that a type I thermoplastic liquid crystal polymer (copolymer having a monomer composition of 79 mol % of p-hydroxybenzoic acid, 20 mol % of 6-hydroxy-2-naphthoic acid and 1 mol % of terephthalic acid, and having a melt viscosity at a temperature of 330° C. and a shear rate of 500 sec$^{-1}$, of 70 Pa·sec) was used instead of the type II thermoplastic liquid crystal polymer and the liquid crystal polymer was extruded at 330° C.

Comparative Examples 6B to 8B

An LCP extruded films of each of Comparative Examples 6B to 8B, having a melting point of 315° C. and a thickness of 50 μm, was obtained in the same manner as in Example 4B except that molding conditions were changed as described in Table 13.

TABLE 12

| | Film formation method | Intermediate layer LCP | Thermoplastic resin (release layer) of both surface layers | Film formation conditions | |
|---|---|---|---|---|---|
| | | | | Shear stress [kPa] | Drawdown ratio |
| Example 1B | Release of two-kind three layers | Type II | PC | 20 | 2.0 |
| Example 2B | Release of two-kind three layers | Type II | PC | 20 | 3.0 |
| Example 3B | Release of two-kind three layers | Type II | PC | 35 | 2.0 |
| Comparative Example 1B | Single layer | Type II | — | 45 | 3.8 |
| Comparative Example 2B | Release of two-kind three layers | Type II | PC | 50 | 6.0 |
| Comparative Example 3B | Release of two-kind three layers | Type II | PC | 20 | 6.0 |
| Comparative Example 4B | Release of two-kind three layers | Type II | PC | 50 | 2.0 |

TABLE 13

|  | Film formation method | Intermediate layer LCP | Thermoplastic resin (release layer) of both surface layers | Film formation conditions | |
|---|---|---|---|---|---|
|  |  |  |  | Shear stress [kPa] | Drawdown ratio |
| Example 4B | Release of two-kind three layers | Type I | PC | 20 | 2.0 |
| Example 5B | Release of two-kind three layers | Type I | PC | 20 | 3.0 |
| Example 6B | Release of two-kind three layers | Type I | PC | 35 | 2.0 |
| Comparative Example 5B | Single layer | Type I | — | 45 | 3.8 |
| Comparative Example 6B | Release of two-kind three layers | Type I | PC | 50 | 6.0 |
| Comparative Example 7B | Release of two-kind three layers | Type I | PC | 20 | 6.0 |
| Comparative Example 8B | Release of two-kind three layers | Type I | PC | 50 | 2.0 |

Examples 7B to 9B

An LCP extruded film of each of Examples 7B to 9B, having a melting point of 280° C. and a thickness of 50 lam, was obtained by the same method as in Example 1B except that polymethylpentene PMP (TPX MX004 manufactured by Mitsui Chemicals, Inc.) was used instead of polycarbonate, in surface layers of both surfaces.

While a glass cloth (IPC No. #1037) was sandwiched between a pair of thermoplastic liquid crystal polymer films obtained of each of Examples 7B to 9B, thermocompression bonding treatment with a heat press was performed at 300° C. for 5 minutes and thus an insulating material for a circuit substrate, having a melting point of 280° C. and a total thickness of 100 lam, of each of Examples 7B to 9B was obtained.

Comparative Examples 9B to 11B

An LCP extruded film of each of Comparative Examples 9B to 11B, having a melting point of 280° C. and a thickness of 50 was obtained in the same manner as in Example 7B except that molding conditions were changed as described in Table 14.

TABLE 14

|  | Film formation method | Intermediate layer LCP | Thermoplastic resin (release layer) of both surface layers | Film formation conditions | |
|---|---|---|---|---|---|
|  |  |  |  | Shear stress [kPa] | Drawdown ratio |
| Example 7B | Release of two-kind three layers | Type II | PMP | 20 | 2.0 |
| Example 8B | Release of two-kind three layers | Type II | PMP | 20 | 3.0 |
| Example 9B | Release of two-kind three layers | Type II | PMP | 35 | 2.0 |
| Comparative Example 9B | Release of two-kind three layers | Type II | PMP | 50 | 6.0 |
| Comparative Example 10B | Release of two-kind three layers | Type II | PMP | 20 | 6.0 |
| Comparative Example 11B | Release of two-kind three layers | Type II | PMP | 50 | 2.0 |

The measurement results are shown in Tables 15 to 17.

TABLE 15

|  | Hardness [GPa] of cross section in parallel with MD direction | | | Coefficient [ppm/K] of linear thermal expansion | | Presence of skin layer | Dimensional rate of change [%] after etching of copper foil | | |
|---|---|---|---|---|---|---|---|---|---|
|  | H1 at point of depth of 1 μm from film surface | H2 at thickness center point | (H2 − H1)/ H1 × 100 | MD direction | TD direction |  | MD direction $\beta_1$ | TD direction $\beta_2$ | $|\beta_2 - \beta_1|$ |
| Example 1B | 0.269 | 0.259 | −3.7 | −18 | 29 | Absent | −0.1 | −0.2 | 0.1 |
| Example 2B | 0.261 | 0.249 | −4.6 | −20 | 37 | Absent | 0.0 | −0.2 | 0.2 |
| Example 3B | 0.257 | 0.248 | −3.5 | −20 | 42 | Absent | 0.0 | −0.2 | 0.2 |
| Comparative Example 1B | 0.242 | 0.209 | −13.6 | −20 | 61 | Present | 0.2 | −0.6 | 0.8 |

TABLE 15-continued

| | Hardness [GPa] of cross section in parallel with MD direction | | | Coefficient [ppm/K] of linear thermal expansion | | Presence of skin layer | Dimensional rate of change [%] after etching of copper foil | | |
|---|---|---|---|---|---|---|---|---|---|
| | H1 at point of depth of 1 μm from film surface | H2 at thickness center point | (H2 − H1)/ H1 × 100 | MD direction | TD direction | | MD direction $\beta_1$ | TD direction $\beta_2$ | $|\beta_2 − \beta_1|$ |
| Comparative Example 2B | 0.214 | 0.206 | −3.7 | −20 | 95 | Absent | 0.0 | −0.7 | 0.7 |
| Comparative Example 3B | 0.233 | 0.224 | −3.9 | −20 | 72 | Absent | 0.0 | −0.6 | 0.6 |
| Comparative Example 4B | 0.244 | 0.234 | −4.1 | −20 | 58 | Absent | 0.0 | −0.5 | 0.5 |

TABLE 16

| | Hardness [GPa] of cross section in parallel with MD direction | | | Coefficient [ppm/K] of linear thermal expansion | | Presence of skin layer | Dimensional rate of change [%] after etching of copper foil | | |
|---|---|---|---|---|---|---|---|---|---|
| | H1 at point of depth of 1 μm from film surface | H2 at thickness center point | (H2 − H1)/ H1 × 100 | MD direction | TD direction | | MD direction $\beta_1$ | TD direction $\beta_2$ | $|\beta_2 − \beta_1|$ |
| Example 4B | 0.270 | 0.262 | −3.0 | −16 | 27 | Absent | −0.1 | −0.2 | 0.1 |
| Example 5B | 0.265 | 0.256 | −3.4 | −17 | 33 | Absent | 0.0 | −0.2 | 0.2 |
| Example 6B | 0.259 | 0.250 | −3.5 | −17 | 40 | Absent | 0.0 | −0.2 | 0.2 |
| Comparative Example 5B | 0.243 | 0.210 | −13.6 | −18 | 59 | Present | 0.2 | −0.6 | 0.8 |
| Comparative Example 6B | 0.216 | 0.208 | −3.7 | −18 | 93 | Absent | 0.0 | −0.7 | 0.7 |
| Comparative Example 7B | 0.243 | 0.233 | −4.1 | −18 | 60 | Absent | 0.0 | −0.6 | 0.6 |
| Comparative Example 8B | 0.245 | 0.238 | −2.9 | −18 | 57 | Absent | 0.0 | −0.5 | 0.5 |

TABLE 17

| | Hardness [GPa] of cross section in parallel with MD direction | | | Coefficient [ppm/K] of linear thermal expansion | | Presence of skin layer | Dimensional rate of change [%] after etching of copper foil | | |
|---|---|---|---|---|---|---|---|---|---|
| | H1 at point of depth of 1 μm from film surface | H2 at thickness center point | (H2 − H1)/ H1 × 100 | MD direction | TD direction | | MD direction $\beta_1$ | TD direction $\beta_2$ | $|\beta_2 − \beta_1|$ |
| Example 7B | 0.268 | 0.259 | −3.4 | −18 | 29 | Absent | −0.1 | −0.2 | 0.1 |
| Example 8B | 0.260 | 0.248 | −4.6 | −20 | 36 | Absent | 0.0 | −0.2 | 0.2 |
| Example 9B | 0.254 | 0.244 | −3.9 | −20 | 43 | Absent | 0.0 | −0.2 | 0.2 |
| Comparative Example 9B | 0.213 | 0.204 | −4.2 | −20 | 96 | Absent | 0.0 | −0.7 | 0.7 |
| Comparative Example 10B | 0.231 | 0.221 | −4.3 | −20 | 74 | Absent | 0.0 | −0.6 | 0.6 |
| Comparative Example 11B | 0.244 | 0.236 | −3.3 | −20 | 59 | Absent | 0.0 | −0.5 | 0.5 |

The relationships of film formation conditions with the hardness and the coefficient of linear thermal expansion in the method for manufacturing an LCP extruded film are collectively shown in Tables 18 to 20.

TABLE 18

| | Film formation method | Center layer LCP | Thermoplastic resin (release layer) of both surface layers | Film formation conditions Shear stress [kPa] | Drawdown ratio | Presence of skin layer | Hardness [GPa] of cross section in parallel with MD direction H1 at point of depth of 1 μm from film surface | H2 at thickness center point | (H2 − H1)/ H1 × 100 | Coefficient [ppm/K] of linear thermal expansion MD direction | TD direction |
|---|---|---|---|---|---|---|---|---|---|---|---|
| Example 1B | Release of two-kind three layers | Type II | PC | 20 | 2.0 | Absent | 0.269 | 0.259 | −3.7 | −18 | 29 |
| Example 2B | Release of two-kind three layers | Type II | PC | 20 | 3.0 | Absent | 0.261 | 0.249 | −4.6 | −20 | 37 |
| Example 3B | Release of two-kind three layers | Type II | PC | 35 | 2.0 | Absent | 0.257 | 0.248 | −3.5 | −20 | 42 |
| Comparative Example 1B | Single layer | Type II | — | 45 | 3.8 | Present | 0.242 | 0.209 | −13.6 | −20 | 61 |
| Comparative Example 2B | Release of two-kind three layers | Type II | PC | 50 | 6.0 | Absent | 0.214 | 0.206 | −3.7 | −20 | 95 |
| Comparative Example 3B | Release of two-kind three layers | Type II | PC | 20 | 6.0 | Absent | 0.233 | 0.224 | −3.9 | −20 | 72 |
| Comparative Example 4B | Release of two-kind three layers | Type II | PC | 50 | 2.0 | Absent | 0.244 | 0.234 | −4.1 | −20 | 58 |

TABLE 19

| | Film formation method | Center layer LCP | Thermoplastic resin (release layer) of both surface layers | Film formation conditions Shear stress [kPa] | Drawdown ratio | Presence of skin layer | Hardness [GPa] of cross section in parallel with MD direction H1 at point of depth of 1 μm from film surface | H2 at thickness center point | (H2 − H1)/ H1 × 100 | Coefficient [ppm/K] of linear thermal expansion MD direction | TD direction |
|---|---|---|---|---|---|---|---|---|---|---|---|
| Example 4B | Release of two-kind three layers | Type I | PC | 20 | 2.0 | Absent | 0.270 | 0.262 | −3.0 | −16 | 27 |
| Example 5B | Release of two-kind three layers | Type I | PC | 20 | 3.0 | Absent | 0.265 | 0.256 | −3.4 | −17 | 33 |
| Example 6B | Release of two-kind three layers | Type I | PC | 35 | 2.0 | Absent | 0.259 | 0.250 | −3.5 | −17 | 40 |
| Comparative Example 5B | Single layer | Type I | — | 45 | 3.8 | Present | 0.243 | 0.210 | −13.6 | −18 | 59 |
| Comparative Example 6B | Release of two-kind three layers | Type I | PC | 50 | 6.0 | Absent | 0.216 | 0.208 | −3.7 | −18 | 93 |
| Comparative Example 7B | Release of two-kind three layers | Type I | PC | 20 | 6.0 | Absent | 0.243 | 0.233 | −4.1 | −18 | 60 |
| Comparative Example 8B | Release of two-kind three layers | Type I | PC | 50 | 2.0 | Absent | 0.245 | 0.238 | −2.9 | −18 | 57 |

TABLE 20

| | Film formation method | Center layer LCP | Thermoplastic resin (release layer) of both surface layers | Film formation conditions Shear stress [kPa] | Drawdown ratio | Presence of skin layer | Hardness [GPa] of cross section in parallel with MD direction H1 at point of depth of 1 μm from film surface | H2 at thickness center point | (H2 − H1)/ H1 × 100 | Coefficient [ppm/K] of linear thermal expansion MD direction | TD direction |
|---|---|---|---|---|---|---|---|---|---|---|---|
| Example 7B | Release of two-kind three layers | Type II | PMP | 20 | 2.0 | Absent | 0.268 | 0.259 | −3.4 | −18 | 29 |
| Example 8B | Release of two-kind three layers | Type II | PMP | 20 | 3.0 | Absent | 0.260 | 0.248 | −4.6 | −20 | 36 |
| Example 9B | Release of two-kind three layers | Type II | PMP | 35 | 2.0 | Absent | 0.254 | 0.244 | −3.9 | −20 | 43 |
| Comparative Example 9B | Release of two-kind three layers | Type II | PMP | 50 | 6.0 | Absent | 0.213 | 0.204 | −4.2 | −20 | 96 |
| Comparative Example 10B | Release of two-kind three layers | Type II | PMP | 20 | 6.0 | Absent | 0.231 | 0.221 | −4.3 | −20 | 74 |
| Comparative Example 11B | Release of two-kind three layers | Type II | PMP | 50 | 2.0 | Absent | 0.244 | 0.236 | −3.3 | −20 | 59 |

The measurement results are shown in Table 21.

TABLE 21

| | Degree of orientation [%] | | |
|---|---|---|---|
| | $\alpha_1$ before etching treatment | $\alpha_2$ after etching treatment | $(\alpha_2-\alpha_1)/\alpha_1 \times 100$ |
| Example 1B | 35.3 | 34.9 | −1.1 |
| Example 2B | 36.6 | 36.1 | −1.4 |
| Example 3B | 37.3 | 36.9 | −1.1 |
| Comparative Example 1B | 39.9 | 38.0 | −4.8 |
| Comparative Example 2B | 44.8 | 44.3 | −1.1 |
| Comparative Example 3B | 41.5 | 41.0 | −1.2 |
| Comparative Example 4B | 39.5 | 39.0 | −1.3 |
| Example 4B | 35.1 | 34.8 | −0.9 |
| Example 5B | 35.9 | 35.5 | −1.1 |
| Example 6B | 37.0 | 36.6 | −1.1 |
| Comparative Example 5B | 39.7 | 37.8 | −4.8 |
| Comparative Example 6B | 44.4 | 43.9 | −1.1 |
| Comparative Example 7B | 39.8 | 39.3 | −1.3 |
| Comparative Example 8B | 39.3 | 38.9 | −1.0 |
| Example 7B | 35.4 | 35.0 | −1.1 |
| Example 8B | 36.8 | 36.3 | −1.4 |
| Example 9B | 37.8 | 37.3 | −1.3 |
| Comparative Example 9B | 44.9 | 44.3 | −1.3 |
| Comparative Example 10B | 41.8 | 41.2 | −1.4 |
| Comparative Example 11B | 39.6 | 39.2 | −1.0 |

Each of the obtained LCP extruded films of Examples 1B, 4B and 7B was stretched by 1.5 times (total stretch ratio: 1.5 times) in the TD direction at 130° C. with a uniaxial stretch machine, and subjected to heat setting at 130° C. for 2 minutes, and thus each LCP stretched film was obtained.

The measurement results are shown in Table 22.

TABLE 22

| | LCP extruded film, Coefficient [ppm/K] of linear thermal expansion | | LCP stretched film, Coefficient [ppm/K] of linear thermal expansion | |
|---|---|---|---|---|
| | MD direction | TD direction | MD direction | TD direction |
| Example 1B | −18 | 29 | −14 | 13 |
| Example 4B | −16 | 27 | −12 | 11 |
| Example 7B | −18 | 29 | −14 | 13 |

Each of the obtained LCP extruded films of Examples 1B, 4B and 7B was stretched by 2.0 times (total stretch ratio: 2.0 times) in the TD direction at 130° C. with a uniaxial stretch machine, and subjected to heat setting at 130° C. for 2 minutes, and thus each LCP stretched film was obtained.

The measurement results are shown in Table 23.

TABLE 23

| | LCP extruded film, Coefficient [ppm/K] of linear thermal expansion | | LCP stretched film, Coefficient [ppm/K] of linear thermal expansion | |
|---|---|---|---|---|
| | MD direction | TD direction | MD direction | TD direction |
| Example 1B | −18 | 29 | −8 | −8 |
| Example 4B | −16 | 27 | −7 | −7 |
| Example 7B | −18 | 29 | −8 | −8 |

[Melt Viscosity]

The melt viscosity [Pa·sec] of each of the LCP extruded films for stretch treatment was measured under the following conditions.

Measurement device: Capilograph 1D (manufactured by Toyo Seiki Seisaku-sho, Ltd.)
    Apparatus used: cylinder diameter 10.00 mm, cylinder size 1.00 mm, barrel diameter 9.55 mm
    Measurement conditions: temperature [ ° C.] and shear rate [sec$^{-1}$] in extrusion of LCP extruded film for stretch treatment

[Yield Point Strength X and Fracture Point Strength Y]

A tensile test of each of the LCP extruded films for stretch treatment was performed under the following conditions, and the yield point strength X and the fracture point strength Y were determined.

According to JIS K7161-1:2014
Tensile tester: Strograph VELD (manufactured by Toyo Seiki Seisaku-sho, Ltd.)
Sample size: dumbbell type
Conditioning before test: 24 hours at 23° C. and 50% RH
Measurement temperature: 200° C.
Tensile speed: 200 ram/min
Distance between reference lines: 50 mm
Measurement result: average value in measurement five times

[Coefficient of Linear Thermal Expansion]

The respective coefficients of linear thermal expansion of each of the LCP extruded films for stretch treatment and each of the LCP stretched films were measured by a TMA method according to JIS K7197.

Measurement device: TMA 4000SE (manufactured by NETZSCH Japan K.K.)
Measurement method: tension mode
Measurement conditions: sample size 25 mm×4 mm×thickness: 50
  distance between chucks: 20 mm
  temperature interval: 23 to 200° C. (2nd RUN)
  temperature rising rate: 5° C./min
  atmosphere: nitrogen (flow rate: 50 ml/min)
  test load: 5 gf
  To observe a value from which the thermal history has been eliminated, the value at 2nd RUN was employed

[Tape Release Test]

The film surface of each of the LCP extruded films for stretch treatment was subjected to an adhesiveness test by a cross-cutting method according to JIS K5600-5-6 and the presence of a skin layer was confirmed. Here, Cellotape® of 24 mm width×50 mm length, manufactured by Nichiban Co., Ltd., was used, and a case of no peeling on the mesh of grid after tape release was defined as "Skin layer absent" and a case of peeling thereon was defined as "Skin layer present".

A (Good): skin layer absent
C (Bad): skin layer present

Examples 1C to 3C

A type I thermoplastic liquid crystal polymer (copolymer having a monomer composition of 79 mol % of p-hydroxybenzoic acid, 20 mol % of 6-hydroxy-2-naphthoic acid and 1 mol % of terephthalic acid, and having a melt viscosity at a temperature of 330° C. and a shear rate of 500 sec$^{-1}$, of 70 Pa·sec) and polycarbonate PC (Panlite L-1225L manufactured by Teijin Limited) were used respectively in an intermediate layer and each surface layer of both surfaces of the intermediate layer, such respective resins were co-extruded at 330° C. from a two-kind three layer extruder provided with a T-die having a die width of 600 mm and a lip opening of 0.2 to 1.0 mm, according to a T-die casting method under conditions of a shear stress of 40 kPa and a drawdown ratio of 2.0, and thus a two-kind three layer film in which the intermediate layer had a thickness shown in Table 24 was formed. Polycarbonate films on both surface layers of the two-kind three layer film formed were each released by a winding line, and an LCP extruded film for stretch treatment, of each of Examples 1C to 3C, having a melting point of 315° C. was obtained.

Each of the obtained LCP extruded films for stretch treatment of Examples 1C to 3C was stretched by 2.0 times (total stretch ratio: 2.0 times) in the TD direction at 130° C. with a uniaxial stretch machine, and subjected to heat setting at 130° C. for 30 seconds, and thus each LCP stretched film of Examples 1C to 3C was obtained. Thereafter, while a glass cloth (IPC No. #1037) was sandwiched between a pair of LCP stretched films of each of Examples 1C to 3C, thermocompression bonding treatment with a heat press was performed at 300° C. for 5 minutes and thus an insulating material for a circuit substrate of each of Examples 1C to 3C was obtained.

Comparative Example 1C

An LCP extruded film for stretch treatment of Comparative Example 1C, having a melting point of 315° C., was obtained by the same method as in Example 1C except that the liquid crystal polymer was extruded at 330° C. from a single layer extruder provided with a T-die having a die width of 600 mm and a lip opening of 0.2 to 1.0 mm, according to a T-die casting method under conditions of a shear stress of 50 kPa and a drawdown ratio of 6.0.

An LCP stretched film was tried to be obtained by the same method as in Example 1C except that the obtained LCP extruded film for stretch treatment of Comparative Example 1C was used, but uniform stretch could not be performed.

The results are shown in Table 24.

TABLE 24

| | | | Example 1C | Example 2C | Example 3C | Comparative Example 1C |
|---|---|---|---|---|---|---|
| Type | | | Type I | Type I | Type I | Type I |
| Thickness | | [μm] | 100 | 75 | 50 | 100 |
| Yield point strength X | | [MPa] | 9.5 | 7.3 | 6.3 | 8.2 |
| Fracture point strength Y | | [MPa] | 9.3 | 6.7 | 6.2 | 5.8 |
| Strength ratio Y/X | | | 0.98 | 0.92 | 0.98 | 0.71 |
| Presence of skin layer | | | Absent | Absent | Absent | Present |
| Stretch ability | | | A | A | A | C |
| Stretch ratio | TD | | 2.0 | 2.0 | 2.0 | 2.0 |
| Before stretch | Coefficient of linear thermal expansion | MD [ppm/K] | −14 | −12 | −16 | −19 |
| | Coefficient of linear thermal expansion | TD [ppm/K] | 46 | 50 | 44 | 73 |

TABLE 24-continued

|  |  |  |  | Example 1C | Example 2C | Example 3C | Comparative Example 1C |
|---|---|---|---|---|---|---|---|
| After stretch | Coefficient of linear thermal expansion | MD | [ppm/K] | −7 | −8 | −7 | — |
|  | Coefficient of linear thermal expansion | TD | [ppm/K] | −7 | −8 | −7 | — |

Examples 4C to 6C

A type II thermoplastic liquid crystal polymer (copolymer having a monomer composition of 74 mol % of p-hydroxybenzoic acid, 26 mol % of 6-hydroxy-2-naphthoic acid and having a melt viscosity at a temperature of 300° C. and a shear rate of 500 sec$^{-1}$, of 80 Pa·sec) and polycarbonate PC (Panlite L-1225L manufactured by Teijin Limited) were used respectively in an intermediate layer and each surface layer of both surfaces of the intermediate layer, such respective resins were co-extruded at 300° C. from a two-kind three layer extruder provided with a T-die having a die width of 600 mm and a lip opening of 0.2 to 1.0 mm, according to a T-die casting method under conditions of a shear stress of 40 kPa and a drawdown ratio of 2.0, and thus a two-kind three layer film in which the intermediate layer had a thickness shown in Table 25 was formed. Polycarbonate films on both surface layers of the two-kind three layer film formed were each released by a winding line, and an LCP extruded film for stretch treatment, of each of Examples 4C to 6C, having a melting point of 280° C. was obtained.

Each of the obtained LCP extruded films for stretch treatment of Examples 4C to 6C was stretched by 2.0 times (total stretch ratio: 2.0 times) in the TD direction at 130° C. with a uniaxial stretch machine, and subjected to heat setting at 130° C. for 30 seconds, and thus each LCP stretched film of Examples 4C to 6C was obtained. Thereafter, while a glass cloth (IPC No. #1037) was sandwiched between a pair of LCP stretched films of each of Examples 4C to 6C, thermocompression bonding treatment with a heat press was performed at 300° C. for 5 minutes and thus an insulating material for a circuit substrate of each of Examples 4C to 6C was obtained.

Comparative Example 2C

An LCP extruded film for stretch treatment of Comparative Example 2C, having a melting point of 280° C., was obtained by the same method as in Example 4C except that the liquid crystal polymer was extruded at 300° C. from a single layer extruder provided with a T-die having a die width of 600 mm and a lip opening of 0.2 to 1.0 mm, according to a T-die casting method under conditions of a shear stress of 60 kPa and a drawdown ratio of 6.0.

An LCP stretched film was tried to be obtained by the same method as in Example 4C except that the obtained LCP extruded film for stretch treatment of Comparative Example 2C was used, but uniform stretch could not be performed.

The results are shown in Table 25.

TABLE 25

|  |  |  |  | Example 4C | Example 50 | Example 6C | Comparative Example 2C |
|---|---|---|---|---|---|---|---|
| Type |  |  |  | Type II | Type II | Type II | Type II |
| Thickness |  |  | [µm] | 100 | 75 | 50 | 100 |
| Yield point strength X |  |  | [MPa] | 7.9 | 8 | 4.1 | 4.3 |
| Fracture point strength Y |  |  | [MPa] | 8.9 | 8.6 | 3.8 | 3.1 |
| Strength ratio Y/X |  |  |  | 1.10 | 1.10 | 0.93 | 0.72 |
| Presence of skin layer |  |  |  | Absent | Absent | Absent | Present |
| Stretch ability |  |  |  | A | A | A | C |
| Stretch ratio |  | TD |  | 2.0 | 2.0 | 2.0 | 2.0 |
| Before stretch | Coefficient of linear thermal expansion | MD | [ppm/K] | −12 | −16 | −18 | −20 |
|  | Coefficient of linear thermal expansion | TD | [ppm/K] | 46 | 45 | 45 | 99 |
| After stretch | Coefficient of linear thermal expansion | MD | [ppm/K] | −7 | −8 | −8 | — |
|  | Coefficient of linear thermal expansion | TD | [ppm/K] | −7 | −8 | −8 | — |

INDUSTRIAL APPLICABILITY

The LCP extruded film of the present invention can be widely and effectively utilized in applications such as electronic circuit substrates, multilayer substrates, high heat radiation substrates, flexible printed wiring boards, antenna substrates, optoelectronic hybrid substrates, and IC packages, and since being especially adapted to ultrafine processing and having high reliability, the LCP extruded film of the present invention can be especially widely and effectively utilized as an insulating material or a metal foil-clad laminate for flexible printed wiring boards (FPC) and the like in the fifth-generation mobile communication system (5G), millimeter wave radar, and the like.

REFERENCE SIGNS LIST

100 . . . LCP extruded film
100$a$ . . . surface
100$b$ . . . surface
S1 . . . film surface
S2 . . . film surface at depth of 5 µm
H1 . . . hardness at point of depth of 1 µm
H2 . . . hardness at thickness center point
200 . . . insulating material for circuit substrate
300 . . . metal foil-clad laminate
400 . . . metal foil-clad laminate
WF . . . woven fabric
MF . . . metal foil
X . . . yield point strength
Y . . . fracture point strength
100 . . . LCP stretched film
200 . . . insulating material for circuit substrate
300 . . . metal foil-clad laminate
400 . . . metal foil-clad laminate
WF . . . woven fabric
MF . . . metal foil

The invention claimed is:

1. A method for manufacturing an LCP extruded film, the method comprising:
   a step of respectively preparing a resin composition A for a first surface layer comprising a thermoplastic resin, a resin composition B for an intermediate layer comprising a thermoplastic liquid crystal polymer, and a resin composition C of a second surface layer comprising a thermoplastic resin,
   a step of co-extruding the resin composition A, the resin composition B and the resin composition C in conditions of a shear stress of 40 kPa or less and a drawdown ratio of 3.5 or less, from a two-kind three layer extruder, to form a two-kind three layer film having the first surface layer, the intermediate layer, and the second surface layer at least in the listed order, and
   a step of removing the first and second surface layers from the two-kind three layer film to obtain an LCP extruded film having a thickness of 15 µm or more and 300 µm or less.

2. The method for manufacturing an LCP extruded film according to claim 1, wherein the LCP extruded film is obtained in which a hardness H1 at a point of a depth of 1 µm located at a position of 1 µm from a film surface in a thickness direction and a hardness H2 at a thickness center point, as measured by subjecting a film cross section in parallel with a MD direction to a nanoindentation method, satisfy $-10.0 \leq 100 \times (H2-H1)/H1 \leq 0.0$, and coefficients of linear thermal expansion in a MD direction and a TD direction at 23 to 200° C. as measured by a TMA method according to JIS K7197 are each within a range of −30 to 55 ppm/K.

3. The method for manufacturing an LCP extruded film according to claim 1, wherein the thermoplastic liquid crystal polymer comprises a wholly aromatic polyester resin.

4. The method for manufacturing an LCP extruded film according to claim 1, wherein the thermoplastic resin comprises one selected from the group consisting of: a polyolefin-based resin, an acrylic resin, a polyamide resin, an acrylonitrile-butadiene-styrene copolymer, polystyrene, polyvinyl chloride, polybutylene terephthalate, polyethylene terephthalate, polycarbonate, polyether ether ketone, and polyphenyl sulfide.

5. The method for manufacturing an LCP extruded film according to claim 1, wherein the resin composition B further comprises an inorganic filler.

6. The method for manufacturing an LCP extruded film according to claim 1, wherein the resin composition A, the resin composition B, and the resin composition C are co-extruded from a T-die.

7. The method for manufacturing an LCP extruded film according to claim 1, wherein the LCP extruded film obtained has a coefficient of linear thermal expansion in a TD direction, of 55 ppm/K or less.

8. The method for manufacturing an LCP extruded film according to claim 1, wherein the LCP extruded film obtained is subjected to heating and pressurizing treatment under a condition of 200 to 360° C.

9. The method for manufacturing an LCP extruded film according to claim 1, wherein the LCP extruded film obtained does not comprise any skin layer that is peelable by a tape in an adhesiveness test by a cross-cutting method according to JIS K5600-5-6, on the film surface.

10. A method for manufacturing an LCP extruded film, the method comprising:
    a step of respectively preparing a resin composition A for a first surface layer comprising a thermoplastic resin, a resin composition B for an intermediate layer comprising a thermoplastic liquid crystal polymer, and a resin composition C of a second surface layer comprising a thermoplastic resin,
    a step of co-extruding the resin composition A, the resin composition B and the resin composition C in conditions of a shear stress of 40 kPa or less and a drawdown ratio of 3.5 or less, from a two-kind three layer extruder, to form a two-kind three layer film having the first surface layer, the intermediate layer, and the second surface layer at least in the listed order, and
    a step of removing the first and second surface layers from the two-kind three layer film to obtain an LCP extruded film having a thickness of 15 µm or more and 300 µm or less, wherein a degree of orientation $\alpha 1(\%)$ of a film surface S1 exposed and a degree of orientation $\alpha 2(\%)$ of a film surface S2 exposed by etching treatment in a thickness direction of the film surface S1 and located at a depth of 5 µm from the film surface S1 satisfy a relationship of $-4.0 \leq \{(\alpha 2 - \alpha 1)/\alpha 1\} \times 100 \leq 0.0$, and coefficients of linear thermal expansion in a MD direction and a TD direction at 23 to 200° C. as measured by a TMA method according to JIS K7197 are each within a range of −30 to 55 ppm/K.

11. The method for manufacturing an LCP extruded film according to claim 10, wherein the thermoplastic liquid crystal polymer comprises a wholly aromatic polyester resin.

12. The method for manufacturing an LCP extruded film according to claim 10, wherein the thermoplastic resin comprises one selected from the group consisting of: a polyolefin-based resin, an acrylic resin, a polyamide resin, an acrylonitrile-butadiene-styrene copolymer, polystyrene, polyvinyl chloride, polybutylene terephthalate, polyethylene terephthalate, polycarbonate, polyether ether ketone, and polyphenyl sulfide.

13. The method for manufacturing an LCP extruded film according to claim 10, wherein the resin composition B further comprises an inorganic filler.

14. The method for manufacturing an LCP extruded film according to claim 10, wherein the resin composition A, the resin composition B, and the resin composition C are co-extruded from a T-die.

15. The method for manufacturing an LCP extruded film according to claim 10, wherein the LCP extruded film is obtained which has a coefficient of linear thermal expansion in a TD direction, of 55 ppm/K or less.

16. The method for manufacturing an LCP extruded film according to claim 10, wherein the LCP extruded film obtained is subjected to heating and pressurizing treatment under a condition of 200 to 360° C.

17. The method for manufacturing an LCP extruded film according to claim 10, wherein the LCP extruded film obtained does not comprise any skin layer that is peelable by a tape in an adhesiveness test by a cross-cutting method according to JIS K5600-5-6, on the film surface S1.

* * * * *